US012612105B2

(12) United States Patent　　　(10) Patent No.: US 12,612,105 B2
Liu et al.　　　(45) Date of Patent: Apr. 28, 2026

(54) VEHICLE AND VEHICLE STEERING CONTROL SYSTEM AND METHOD

(71) Applicant: BYD COMPANY LIMITED, Shenzhen (CN)

(72) Inventors: Xiaofei Liu, Shenzhen (CN); Bo Fan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 106 days.

(21) Appl. No.: 18/664,016

(22) Filed: May 14, 2024

(65) Prior Publication Data

US 2024/0300578 A1　　Sep. 12, 2024

Related U.S. Application Data

(63) Continuation of application No. 17/256,221, filed as application No. PCT/CN2019/093563 on Jun. 28, 2019, now abandoned.

(30) Foreign Application Priority Data

Jun. 29, 2018　(CN) .......................... 201810713021.6

(51) Int. Cl.
　B62D 15/02　　(2006.01)
　B60W 50/02　　(2012.01)
　　　(Continued)

(52) U.S. Cl.
　CPC ..... B62D 15/0215 (2013.01); B60W 50/0205 (2013.01); B60W 60/0015 (2020.02);
　　　(Continued)

(58) Field of Classification Search
　CPC .. B62D 15/0215; B62D 5/0409; B62D 5/046; B62D 1/04; B62D 1/22; B62D 9/00;
　　　(Continued)

(56) References Cited

U.S. PATENT DOCUMENTS

| 9,989,565 B2 | 6/2018 | Kakinuma et al. |
| 11,188,074 B1 | 11/2021 | Benavidez et al. |
| | (Continued) | |

FOREIGN PATENT DOCUMENTS

| CN | 101184662 A | 5/2008 |
| CN | 203094176 U | 7/2013 |
| | (Continued) | |

OTHER PUBLICATIONS

The World Intellectual Property Organization (WIPO) International Search Report for PCT/CN2019/093563 Aug. 9, 2019 6 Pages.

*Primary Examiner* — Esvinder Singh
(74) *Attorney, Agent, or Firm* — Wenye Tan

(57)　　　ABSTRACT

A vehicle steering method is provided for a vehicle having a plurality of steering wheels operated by a plurality of users. The method includes obtaining steering information from the plurality of steering wheels of the plurality of users; obtaining priority information of the steering wheels of the corresponding plurality of users; and in response to a user of a steering wheel with a highest priority operates to steer the vehicle, reading the steering information of the steering wheel with the highest priority.

12 Claims, 19 Drawing Sheets

(51) Int. Cl.
    *B60W 60/00*     (2020.01)
    *B62D 1/04*     (2006.01)
    *B62D 5/04*     (2006.01)

(52) U.S. Cl.
    CPC ........... *B62D 5/0409* (2013.01); *B62D 5/046*
        (2013.01); *B62D 1/04* (2013.01)

(58) Field of Classification Search
    CPC ...... B62D 5/003; B62D 6/007; B62D 15/025;
        B62D 6/008; B62D 5/0463; B60W
        50/0205; B60W 60/0015; B60W 2710/20
    See application file for complete search history.

(56) References Cited

U.S. PATENT DOCUMENTS

| | | | |
|---|---|---|---|
| 2009/0288904 A1* | 11/2009 | Chang | B62D 7/159 |
| | | | 180/402 |
| 2015/0014086 A1 | 1/2015 | Eisenbarth | |
| 2017/0096164 A1 | 4/2017 | Sun et al. | |
| 2017/0142470 A1* | 5/2017 | Tsuchida | H04N 21/454 |
| 2017/0166221 A1* | 6/2017 | Osterman | A63G 31/00 |
| 2017/0174257 A1 | 6/2017 | Düring et al. | |
| 2017/0203788 A1 | 7/2017 | Heo | |
| 2017/0274931 A1 | 9/2017 | Yang et al. | |
| 2018/0141584 A1 | 5/2018 | El Aile et al. | |
| 2018/0182261 A1* | 6/2018 | Naouri | G09B 19/167 |
| 2018/0224847 A1 | 8/2018 | El Aile | |
| 2018/0229767 A1 | 8/2018 | James | |

| | | | |
|---|---|---|---|
| 2019/0092389 A1* | 3/2019 | McGill | B62D 1/22 |
| 2019/0168807 A1* | 6/2019 | Polmans | B62D 5/0484 |
| 2020/0004240 A1 | 1/2020 | Biehler et al. | |
| 2021/0146943 A1 | 5/2021 | Oniwa et al. | |
| 2021/0331736 A1* | 10/2021 | Zientek | B62D 15/0215 |

FOREIGN PATENT DOCUMENTS

| | | | |
|---|---|---|---|
| CN | 103646578 A | 3/2014 | |
| CN | 104890726 A | 9/2015 | |
| CN | 105163994 A | 12/2015 | |
| CN | 106013871 A | 10/2016 | |
| CN | 106184352 A | 12/2016 | |
| CN | 106347449 A | 1/2017 | |
| CN | 106828590 A | 6/2017 | |
| CN | 106915385 A | 7/2017 | |
| CN | 106985903 A | 7/2017 | |
| CN | 107031357 A | 8/2017 | |
| CN | 107223103 A | 9/2017 | |
| CN | 107479550 A | 12/2017 | |
| CN | 107696915 A | 2/2018 | |
| CN | 107735306 A | 2/2018 | |
| CN | 107738691 A | 2/2018 | |
| CN | 206954218 U | 2/2018 | |
| CN | 207257752 U | 4/2018 | |
| CN | 207274769 U | 4/2018 | |
| CN | 207496765 U | 6/2018 | |
| DE | 4203867 A1 | 8/1993 | |
| EP | 1527977 A2 | 5/2005 | |
| JP | 2017035979 A | 2/2017 | |

* cited by examiner

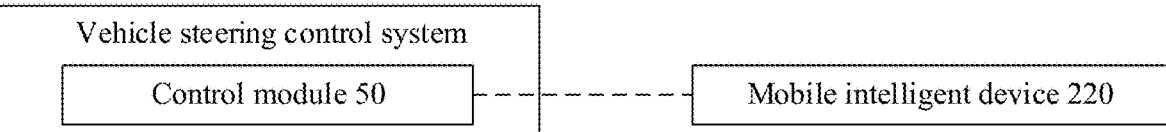
FIG. 10
Vehicle 1000
Vehicle steering control
system 1100
FIG. 11
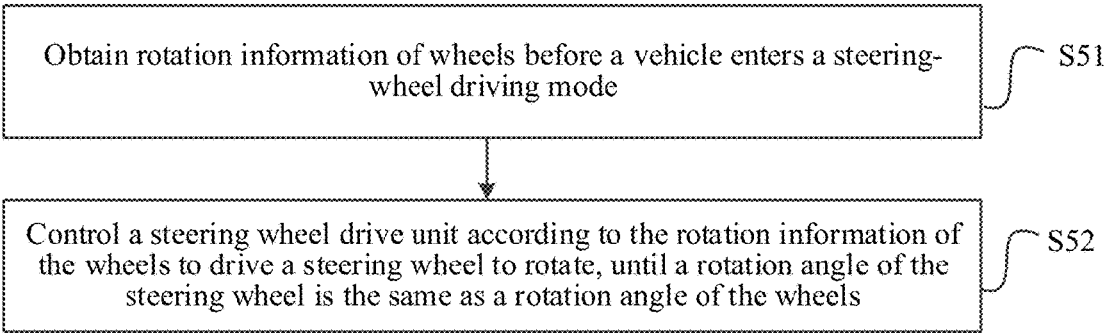
FIG. 12

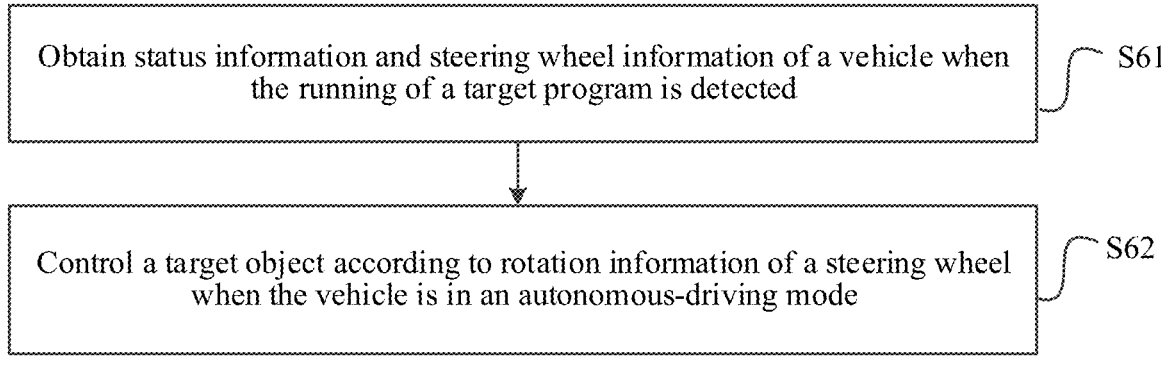

Obtain status information and steering wheel information of a vehicle when the running of a target program is detected — S61

Control a target object according to rotation information of a steering wheel when the vehicle is in an autonomous-driving mode — S62

FIG. 14

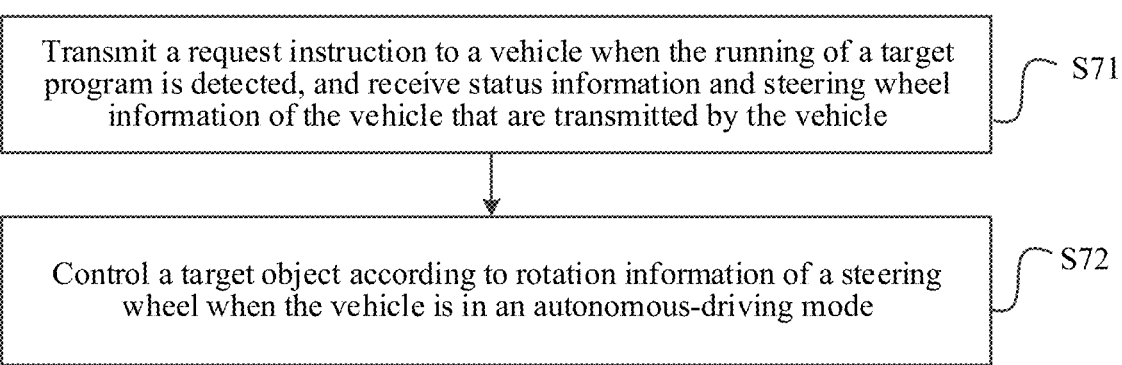

Transmit a request instruction to a vehicle when the running of a target program is detected, and receive status information and steering wheel information of the vehicle that are transmitted by the vehicle — S71

Control a target object according to rotation information of a steering wheel when the vehicle is in an autonomous-driving mode — S72

FIG. 15

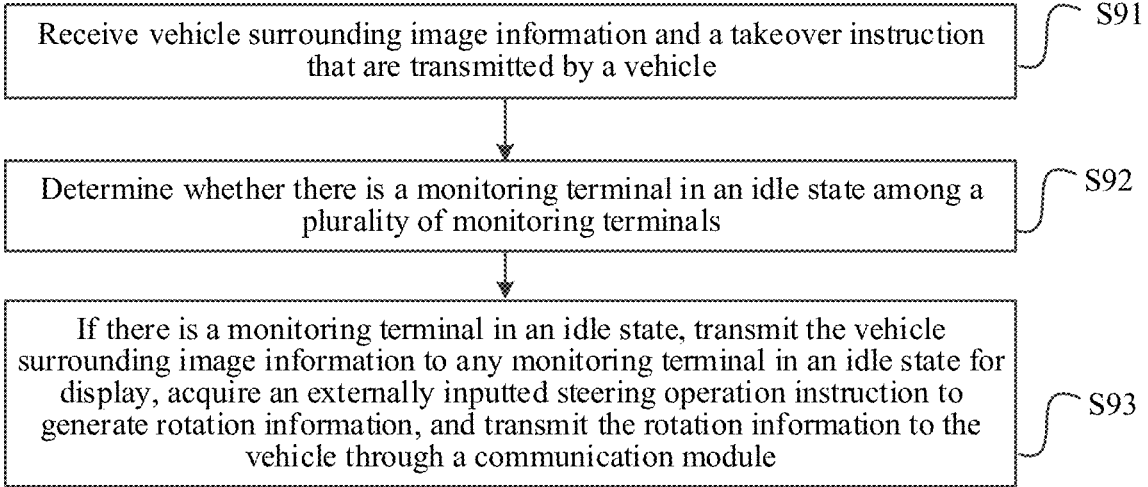

Receive vehicle surrounding image information and a takeover instruction that are transmitted by a vehicle    S91

Determine whether there is a monitoring terminal in an idle state among a plurality of monitoring terminals    S92

If there is a monitoring terminal in an idle state, transmit the vehicle surrounding image information to any monitoring terminal in an idle state for display, acquire an externally inputted steering operation instruction to generate rotation information, and transmit the rotation information to the vehicle through a communication module    S93

FIG. 19

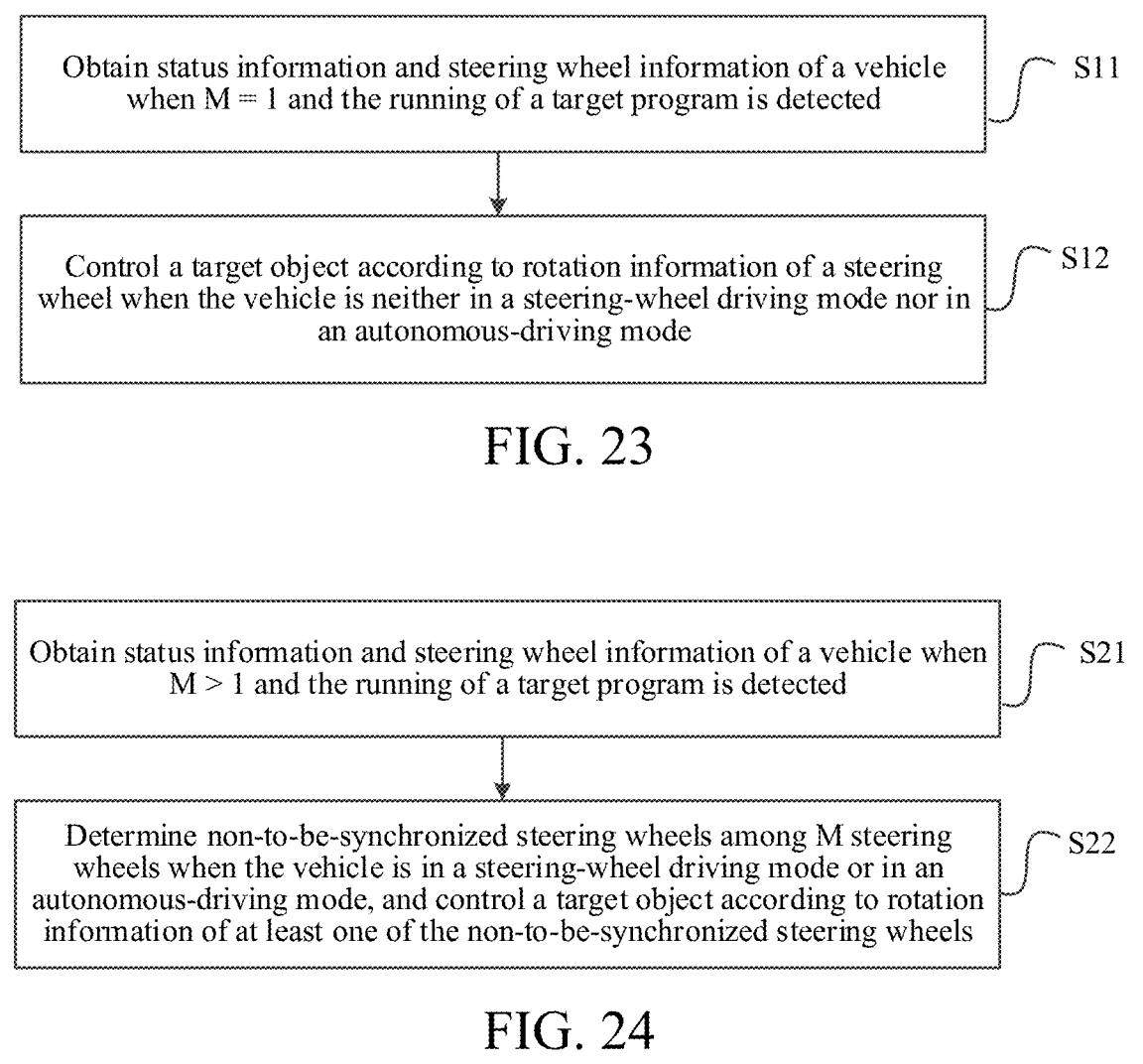

Obtain status information and steering wheel information of a vehicle when M = 1 and the running of a target program is detected          ⌒ S11

Control a target object according to rotation information of a steering wheel when the vehicle is neither in a steering-wheel driving mode nor in an autonomous-driving mode          ⌒ S12

FIG. 23

Obtain status information and steering wheel information of a vehicle when M > 1 and the running of a target program is detected          ⌒ S21

Determine non-to-be-synchronized steering wheels among M steering wheels when the vehicle is in a steering-wheel driving mode or in an autonomous-driving mode, and control a target object according to rotation information of at least one of the non-to-be-synchronized steering wheels          ⌒ S22

FIG. 24

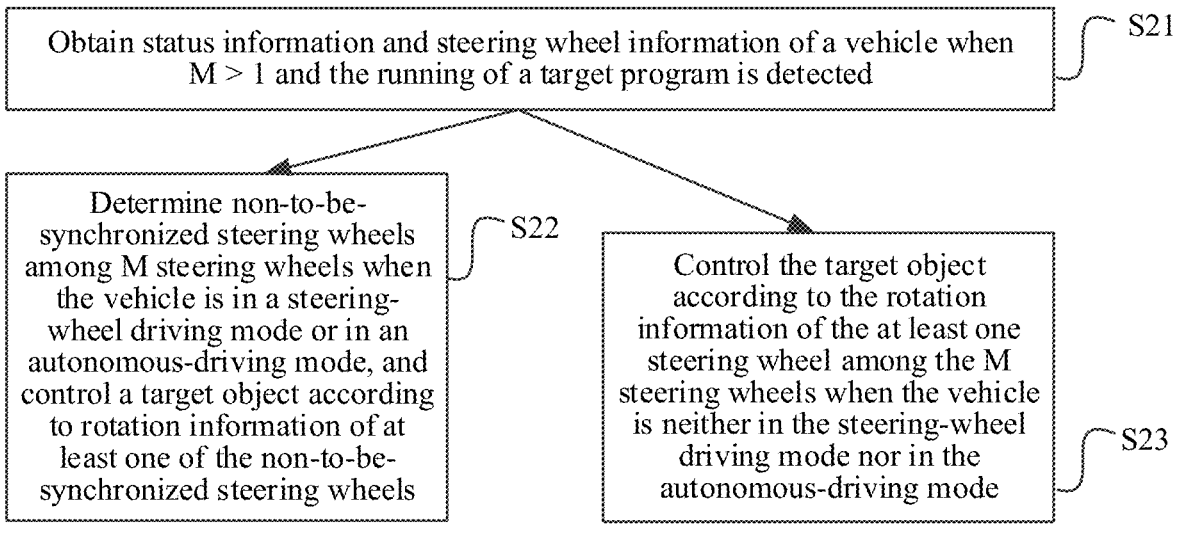

Obtain status information and steering wheel information of a vehicle when M > 1 and the running of a target program is detected ⌒ S21

Determine non-to-be-synchronized steering wheels among M steering wheels when the vehicle is in a steering-wheel driving mode or in an autonomous-driving mode, and control a target object according to rotation information of at least one of the non-to-be-synchronized steering wheels ⌒ S22

Control the target object according to the rotation information of the at least one steering wheel among the M steering wheels when the vehicle is neither in the steering-wheel driving mode nor in the autonomous-driving mode ⌒ S23

FIG. 25

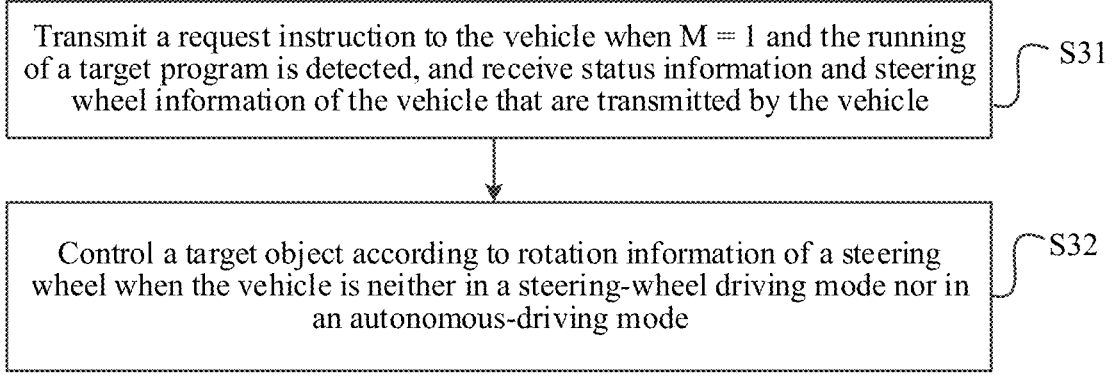

Transmit a request instruction to the vehicle when M = 1 and the running of a target program is detected, and receive status information and steering wheel information of the vehicle that are transmitted by the vehicle ⌒ S31

Control a target object according to rotation information of a steering wheel when the vehicle is neither in a steering-wheel driving mode nor in an autonomous-driving mode ⌒ S32

FIG. 26

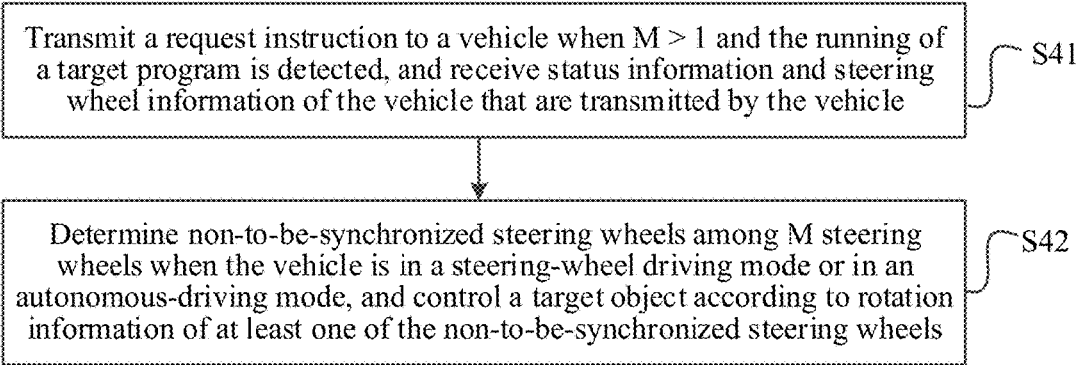

Transmit a request instruction to a vehicle when M > 1 and the running of a target program is detected, and receive status information and steering wheel information of the vehicle that are transmitted by the vehicle — S41

Determine non-to-be-synchronized steering wheels among M steering wheels when the vehicle is in a steering-wheel driving mode or in an autonomous-driving mode, and control a target object according to rotation information of at least one of the non-to-be-synchronized steering wheels — S42

FIG. 27

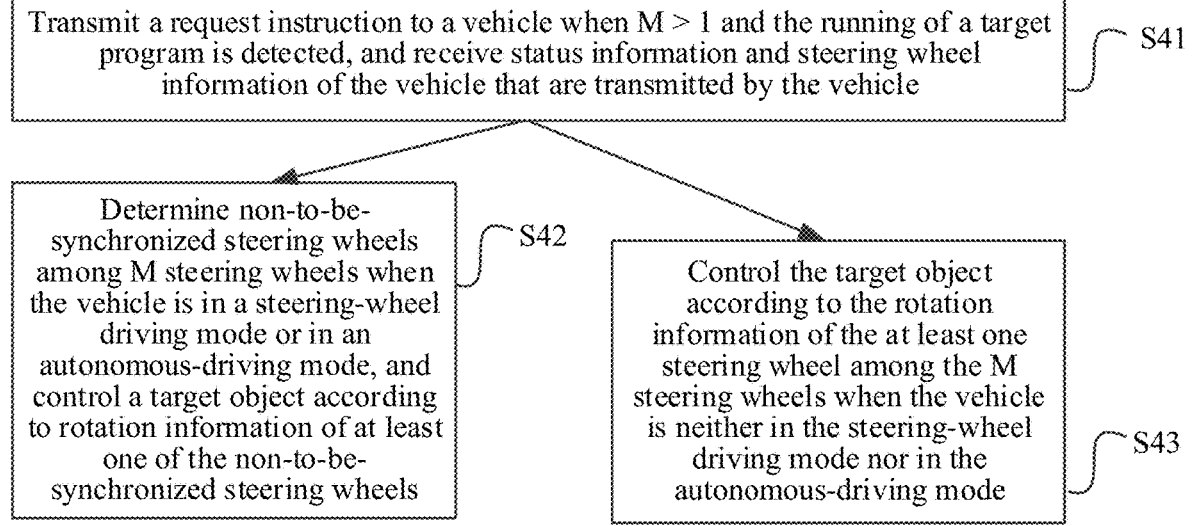

Transmit a request instruction to a vehicle when M > 1 and the running of a target program is detected, and receive status information and steering wheel information of the vehicle that are transmitted by the vehicle — S41

Determine non-to-be-synchronized steering wheels among M steering wheels when the vehicle is in a steering-wheel driving mode or in an autonomous-driving mode, and control a target object according to rotation information of at least one of the non-to-be-synchronized steering wheels — S42

Control the target object according to the rotation information of the at least one steering wheel among the M steering wheels when the vehicle is neither in the steering-wheel driving mode nor in the autonomous-driving mode — S43

FIG. 28

VEHICLE AND VEHICLE STEERING CONTROL SYSTEM AND METHOD

CROSS-REFERENCE TO RELATED APPLICATIONS

This application is a continuation application of U.S. patent application Ser. No. 17/256,221, filed on Dec. 27, 2020, which is a national phase entry under 35 U.S.C. § 371 of International Application No. PCT/CN2019/093563, filed on Jun. 28, 2019, which claims priority to Chinese Patent Application No 201810713021.6 filed by the BYD Co., Ltd. on Jun. 29, 2018, and entitled VEHICLE AND STEERING CONTROL SYSTEM AND METHOD FOR VEHICLE, the entire content of all of which is incorporated herein by reference in its entirety.

FIELD

The present disclosure relates to the technical field of vehicle technology, and in particular, to a vehicle steering control system, a vehicle, and a vehicle steering control method.

BACKGROUND

In the related art, vehicle steering technologies may include hydraulic power steering and electric power steering (EPS). The EPS may include the following three types according to structure: column EPS (C-EPS), pinion EPS or pin EPS (P-EPS), and rack EPS (R-EPS). In the C-EPS, an assist motor directly applies an assist force to a steering column. In the P-EPS, a motor applies a force to a rack through a pinion. That is, a steering column and the motor are coupled to the rack in parallel in the same mechanism (for example, a ball screw or a recirculating ball). In the R-EPS, a motor directly applies an assist force to a rack.

However, the inventor of this disclosure finds and realizes that the problem in the related art is that in all related steering technologies, a mechanical structure is required for connection, and a steering wheel cannot be used to perform other operations.

SUMMARY

The present disclosure is to at least resolve one of the technical problems in the related art to some extent. In view of this, a first objective of the present disclosure is to provide a vehicle steering control system that can transmit a steering intention of a driver through a wired signal or a wireless signal, to further implement steering control without a mechanical mechanism, so that it is convenient to freely arrange the position of a steering wheel, and a plurality of steering wheels can be arranged. When the vehicle needs to be taken over by a driver, it can be ensured that a rotation angle of the steering wheel is the same as a rotation angle of wheels, so as to ensure that the driver can accurately determine the moving direction of the vehicle and prevent the vehicle from danger.

A second objective of the present disclosure is to provide a vehicle. A third objective of the present disclosure is to provide a vehicle steering control method.

To achieve the foregoing objectives, an embodiment of a first aspect of the present disclosure provides a vehicle steering control system, including: a steering wheel; a steering wheel steering angle sensor, the steering wheel steering angle sensor being configured to acquire rotation information of the steering wheel; a steering wheel drive unit, the steering wheel drive unit being connected to the steering wheel, the steering wheel drive unit being configured to drive the steering wheel to rotate; a steering mechanism, the steering mechanism being configured to drive wheels of the vehicle to rotate; a wheel steering angle sensor, the wheel steering angle sensor being configured to detect rotation information of the wheels; and a control module, the control module being electrically connected to the steering mechanism, the wheel steering angle sensor, the steering wheel steering angle sensor, and the steering wheel drive unit separately, the control module being configured to: obtain the rotation information of the wheels before the vehicle enters a steering-wheel driving mode, and control the steering wheel drive unit according to the rotation information of the wheels to drive the steering wheel to rotate, until a rotation angle of the steering wheel is the same as a rotation angle of the wheels.

According to the vehicle steering control system provided by this embodiment of the present disclosure, the control module is electrically connected to the steering mechanism, the wheel steering angle sensor, the steering wheel steering angle sensor, and the steering wheel drive unit separately, and the control module is configured to: obtain the rotation information of the wheels before the vehicle enters a steering-wheel driving mode, and control the steering wheel drive unit according to the rotation information of the wheels to drive the steering wheel to rotate, until the rotation angle of the steering wheel is the same as the rotation angle of the wheels. Therefore, a steering intention of a driver can be transmitted through a wired signal or a wireless signal, to further implement steering control without a mechanical mechanism, so that it is convenient to freely arrange the position of a steering wheel, and a plurality of steering wheels can be arranged. When the vehicle needs to be taken over by a driver, it can be ensured that the rotation angle of the steering wheel is the same as the rotation angle of the wheels, so as to ensure that the driver can accurately determine the moving direction of the vehicle and prevent the vehicle from danger.

In order to achieve the foregoing objectives, an embodiment of a second aspect of the present disclosure provides a vehicle, including the foregoing vehicle steering control system.

According to the vehicle provide in this embodiment of the present disclosure, through the foregoing vehicle steering control system, a steering intention of a driver can be transmitted through a wired signal or a wireless signal, to further implement steering control without a mechanical mechanism, so that it is convenient to freely arrange the position of a steering wheel, and a plurality of steering wheels can be arranged. When the vehicle needs to be taken over by a driver, it can be ensured that the rotation angle of the steering wheel is the same as the rotation angle of the wheels, so as to ensure that the driver can accurately determine the moving direction of the vehicle and prevent the vehicle from danger.

In order to achieve the foregoing objectives, an embodiment of a third aspect of the present disclosure provides a vehicle steering control method. A vehicle control system includes a steering wheel, a steering wheel drive unit, and a steering mechanism, where the steering wheel drive unit is connected to the steering wheel, the steering wheel drive unit is configured to drive the steering wheel to rotate, and the steering mechanism is configured to drive the wheels of the vehicle to rotate. The method includes the following steps: obtaining rotation information of the wheels before the vehicle enters a steering-wheel driving mode; and controlling the steering wheel drive unit according to the rotation information of the wheels to drive the steering wheel to rotate, until a rotation angle of the steering wheel is the same as a rotation angle of the wheels.

According to the vehicle steering control method provided by this embodiment of the present disclosure, before the vehicle enters the steering-wheel driving mode, the rotation information of the wheels is obtained, and the steering wheel drive unit is controlled according to the rotation information of the wheels to drive the steering wheel to rotate, until the rotation angle of the steering wheel is the same as the rotation angle of the wheels. Therefore, when the vehicle needs to be taken over by a driver, it can be ensured that the rotation angle of the steering wheel is the same as the rotation angle of the wheels, so as to ensure that the driver can accurately determine the moving direction of the vehicle and prevent the vehicle from danger.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings.

FIG. 10 is a schematic diagram of connection between the vehicle steering control system and the mobile intelligent device according to another embodiment of the present disclosure;

FIG. 11 is a schematic block diagram of a vehicle according to an embodiment of the present disclosure;

FIG. 12 is a flowchart of a vehicle steering control method according to an embodiment of the present disclosure;

FIG. 14 is a flowchart of a method for controlling an in-vehicle terminal device according to an embodiment of the present disclosure;

FIG. 15 is a flowchart of a method for controlling the mobile intelligent device according to an embodiment of the present disclosure;

FIG. 19 is a flowchart of a vehicle steering control method applicable to a server according to an embodiment of the present disclosure;

FIG. 23 is a flowchart of a method for controlling an in-vehicle terminal device according to an embodiment of the present disclosure;

FIG. 24 is a flowchart of the method for controlling the in-vehicle terminal device according to another embodiment of the present disclosure;

FIG. 25 is a flowchart of the method for controlling the in-vehicle terminal device according to still another embodiment of the present disclosure;

FIG. 26 is a flowchart of a method for controlling the mobile intelligent device according to an embodiment of the present disclosure;

FIG. 27 is a flowchart of the method for controlling the mobile intelligent device according to another embodiment of the present disclosure; and FIG. 28 is a flowchart of the method for controlling the mobile intelligent device according to still another embodiment of the present disclosure

DETAILED DESCRIPTION

The following describes in detail embodiments of the present disclosure. Examples of the embodiments are shown in the accompanying drawings, where reference signs that are the same or similar from beginning to end represent same or similar components or components that have same or similar functions. The embodiments described below with reference to the accompanying drawings are exemplary, aiming to explain the present disclosure, but cannot be understood as a limitation on the present disclosure.

The vehicle steering control system of the embodiments of the present disclosure is described below with reference to the accompanying drawings.

Figure 1:
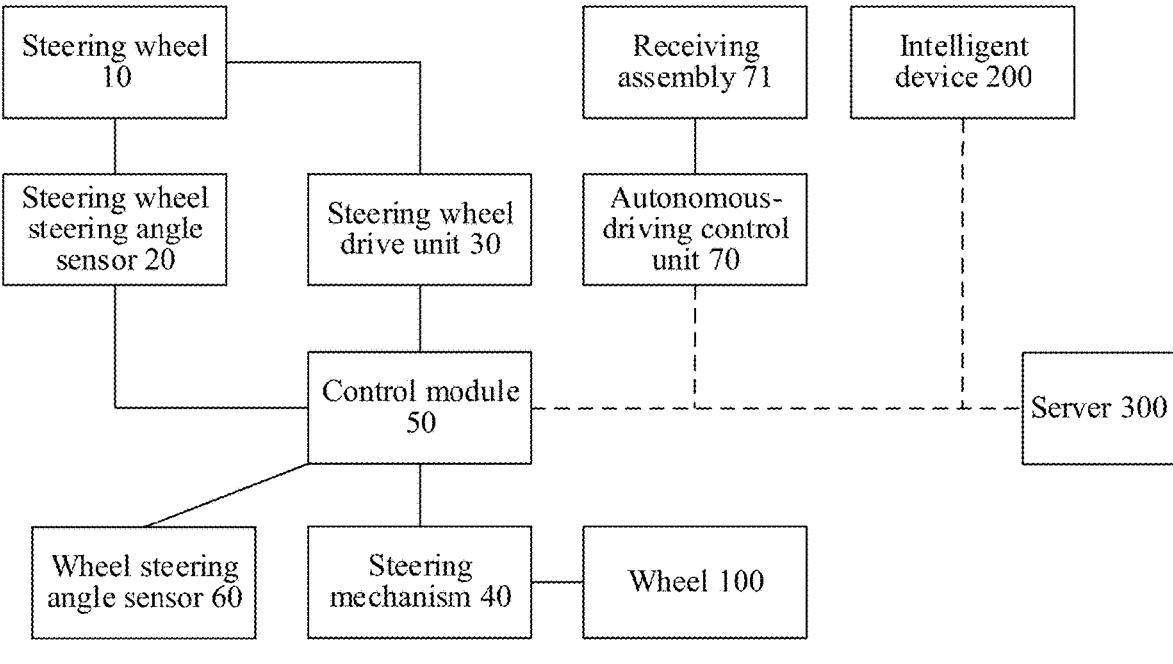
FIG. 1 is a schematic block diagram of a vehicle steering control system according to an embodiment of the present disclosure.
Figure 4:
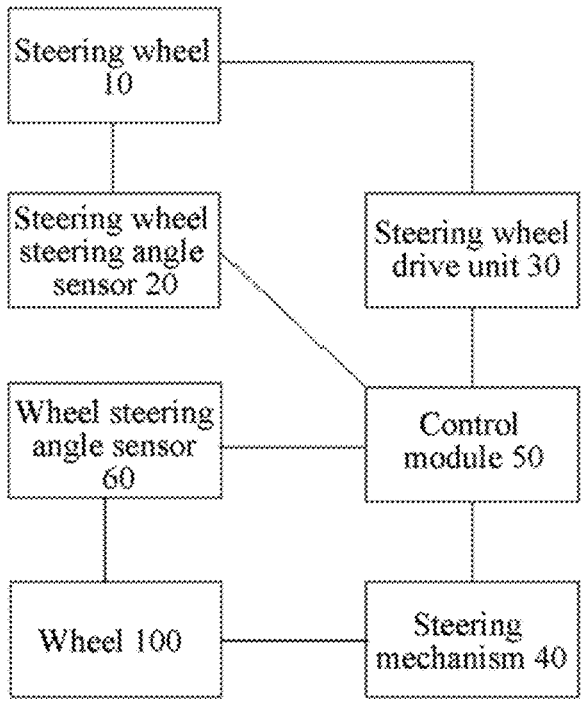
FIG. 4 is a schematic block diagram of the vehicle steering control system according to another embodiment of the present disclosure.

FIG. 1 is a schematic block diagram of a vehicle control system according to an embodiment of the present disclosure. As shown in FIG. 1 and FIG. 4, the vehicle steering control system includes a steering wheel 10, a steering wheel steering angle sensor 20, a steering wheel drive unit 30, a steering mechanism 40, and a control module 50.

The steering wheel 10 is an apparatus for a driver to determine the moving direction of a vehicle. That is, the steering wheel 10 is rotated under the operation of the driver or a passenger. Specifically, when there is one steering wheel, the steering wheel may be arranged at the position of the driver. When there are a plurality of steering wheels, the steering wheels may be arranged at the position of the driver and another position such as the position of a co-driver.

The steering wheel steering angle sensor 20 may be connected to the steering wheel 10. Specifically, the steering wheel 10 may be connected to the steering wheel steering angle sensor 20 by a steering column. The steering wheel steering angle sensor 20 is configured to acquire rotation information of the steering wheel 10, for example, a rotation angle and rotation speed of the steering wheel 10. It can be understood that the steering wheel steering angle sensor 20 may only acquire the rotation angle of the steering wheel 10 but not the rotation speed of the steering wheel 10. There- fore, when rotating according to the rotation angle of the steering wheel 10, wheels follow the rotation angle of the steering wheel 10 in real time. The rotation speed of the wheels can be basically the same as that of the steering wheel. That is, when the rotation speed of the steering wheel is high, the rotation speed of the wheels naturally increases accordingly to follow the rotation angle of the steering wheel.

The steering wheel drive unit 30 is connected to the steering wheel 10, and the steering wheel drive unit 30 is configured to drive the steering wheel 10 to rotate and apply steering torque to the steering wheel 10. That is, the steering wheel drive unit 30 may drive the steering wheel 10 under control of the control module 50 to rotate, to keep the rotation angle of the steering wheel the same as the rotation angle of the wheels, and the steering wheel drive unit 30 may further apply the steering torque to the steering wheel 10 when the steering wheel 10 is operated by the driver, so as to provide reverse torque to the steering wheel 10 to ensure the handling comfort of the driver. Specifically, when the steering wheel 10 is rotated clockwise under the operation (turning) of the driver, the steering wheel drive unit 30 applies counterclockwise torque to the steering wheel 10. When the steering wheel 10 is rotated counterclockwise under the operation of the driver, the steering wheel drive unit 30 applies clockwise torque to the steering wheel 10.

As shown in FIG. 2, FIG. 3, FIG. 5, and FIG. 6, the steering wheel drive unit 30 may include a steering wheel drive motor 31. The steering wheel drive motor 31 may be connected to the steering wheel 10 by a steering column. The steering wheel drive motor 31 may drive the steering wheel 10 under the control of the control module 50 to rotate, or apply steering torque to the corresponding steering wheel 10, thereby ensuring the handling comfort of the driver.

The steering mechanism 40 is connected, for example, mechanically connected, to wheels 100 of the vehicle, and the steering mechanism 40 is configured to drive the wheels 100 of the vehicle to rotate. It can be understood that the steering mechanism 40 may drive a pair of front wheels or a pair of rear wheels of the vehicle to rotate, or the steering mechanism 40 may drive a pair of front wheels and a pair of rear wheels of the vehicle to rotate simultaneously.

As shown in FIG. 2, FIG. 3, FIG. 5, and FIG. 6, the steering mechanism 40 may include a steering gear 41 and a steering motor 42 such as an EPS motor. The steering gear 41 is connected to the wheels 100. The steering motor 42 may be connected to the steering gear 41. A steering motor

51 may drive the steering gear 41 such as a steering rack under the control of the control module 50 to implement steering. Specifically, the control module 50 may control the steering motor 42 to rotate to drive the steering rack to move laterally to implement the steering of the wheels.

The control module 50 may be electrically connected to the steering mechanism 40 such as the steering motor 42, the steering wheel drive unit 30, and the steering wheel steering angle sensor 20 separately. That is, the control module 50 may receive, through the electrical connection with the steering wheel steering angle sensor 20, rotation information of the steering wheel 10 acquired by the steering wheel steering angle sensor 20. The control module 50 controls the steering mechanism 40 through the electrical connection with the steering mechanism 40. The control module 50 controls the steering wheel drive unit 30 through the elec- trical connection with the steering wheel drive unit 30.

It can be understood that when the steering wheel 10 rotates under the operation of the driver, the control module 50 may obtain the rotation information of the steering wheel 10, and control the steering mechanism 40 according to the rotation information of the steering wheel 10, and may also control the steering wheel drive unit 30 to make the steering wheel drive unit 30 apply steering torque to the steering wheel 10.

As shown in FIG. 2 and FIG. 4 to FIG. 6, the vehicle control system may further include a wheel steering angle sensor 60. The wheel steering angle sensor 60 is configured to detect rotation information of the wheels 100, for example, the rotation angle and rotation speed of the wheels 100. The control module 50 may also be electrically con- nected to the wheel steering angle sensor 60. The control module 50 may receive, through the electrical connection with the wheel steering angle sensor 60, the rotation infor- mation of the wheels 100 acquired by the wheel steering angle sensor 60. The control module 50 may control the steering mechanism 40 and the steering wheel drive unit 30 according to the rotation information of the wheels 100 and the rotation information of the steering wheel 10.

It can be understood that in the process of controlling the steering mechanism 40 according to the rotation information of the steering wheel 10, the control module 50 may obtain the rotation information of the wheels 100 and determine whether the rotation information of the wheels 100 is the same as the rotation information of the steering wheel 10, that is, whether the rotation angle of the wheels 100 is the same as the rotation angle of the steering wheel 10, and if yes, the steering mechanism 40 is controlled to stop driving, or if not, the steering mechanism 40 is controlled to continue driving until the rotation information of the wheels 100 is the same as the rotation information of the steering wheel 10.

Figure 2:
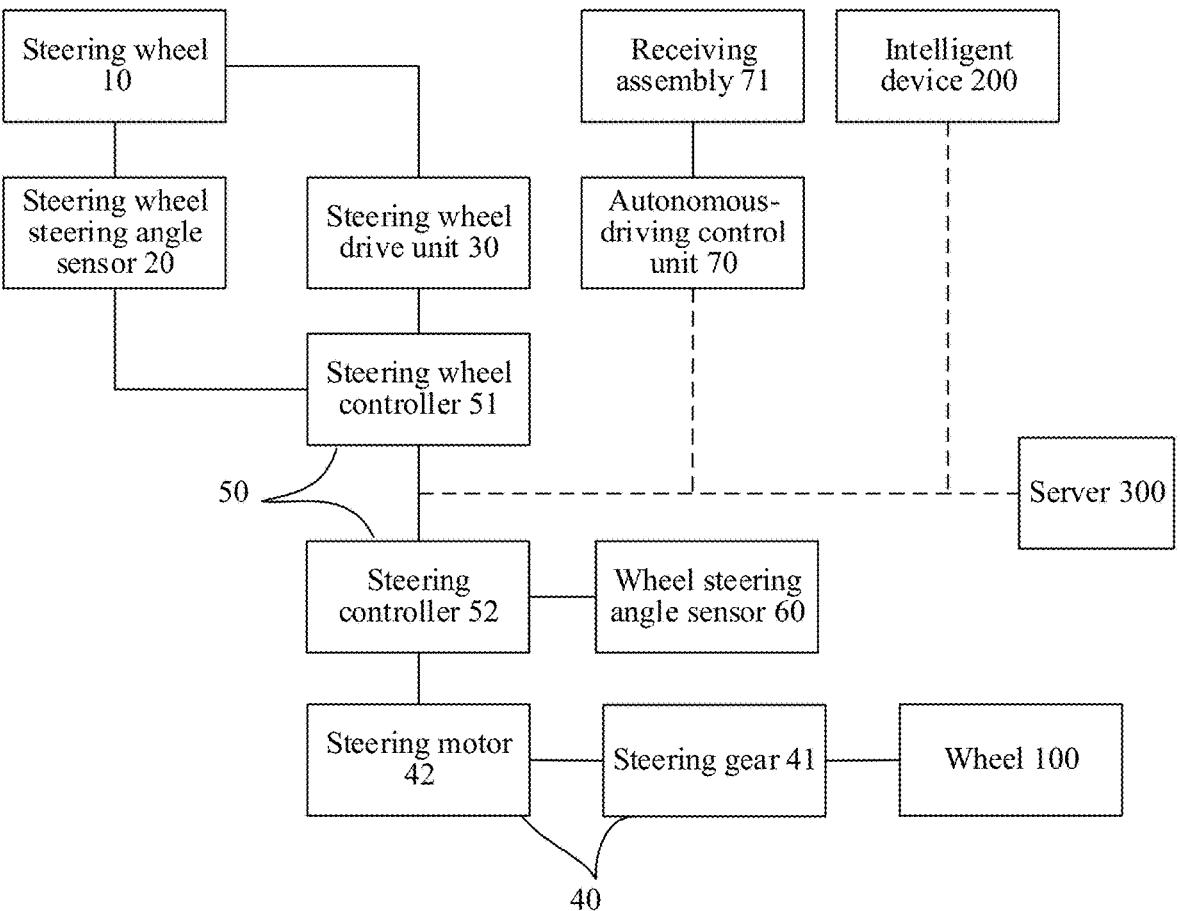
FIG. 2 is a schematic block diagram of the vehicle steering control system according to another embodiment of the present disclosure.
Figure 5:
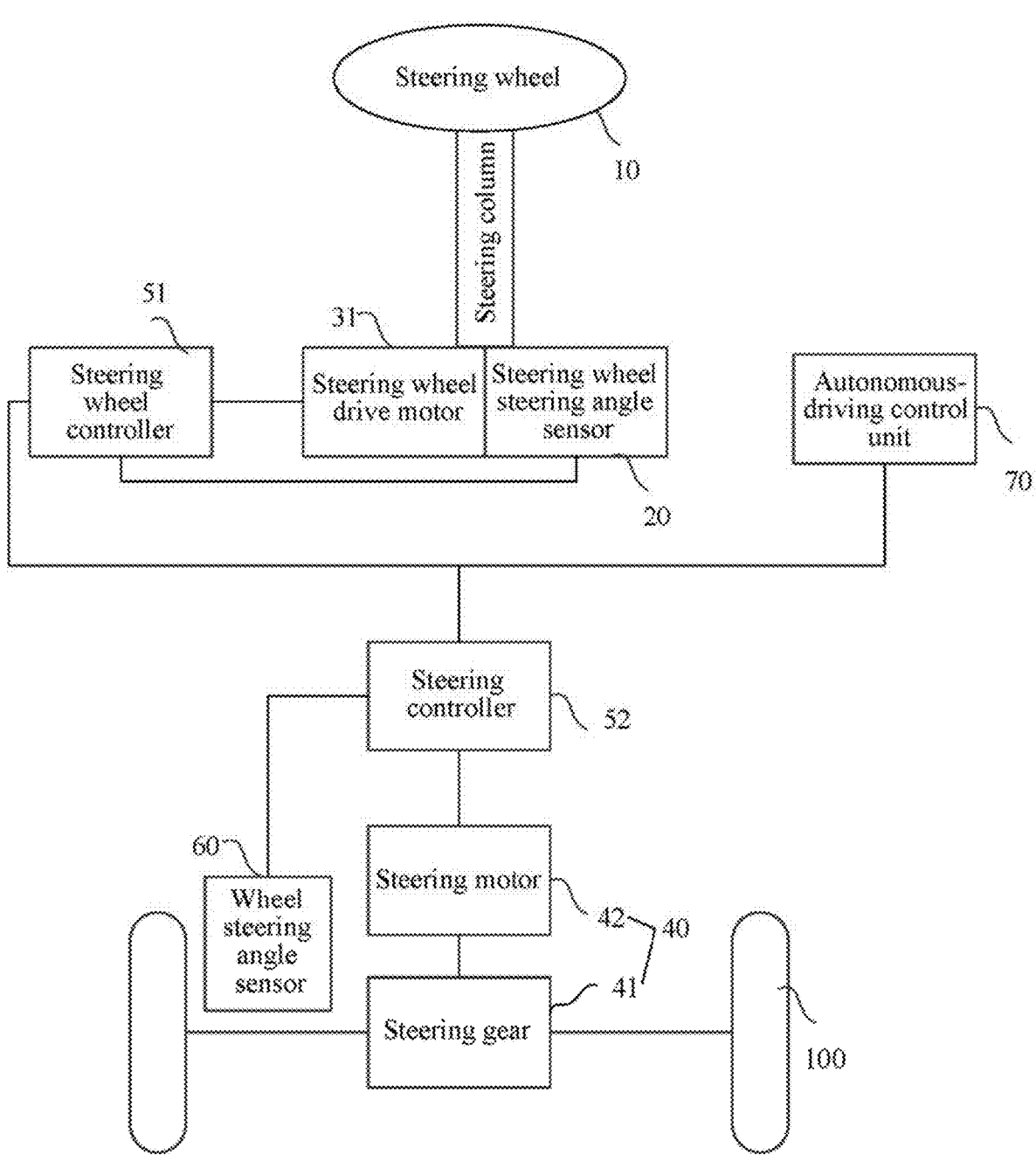
FIG. 5 is a structural schematic diagram of the vehicle steering control system according to another embodiment of the present disclosure.
Figure 6:
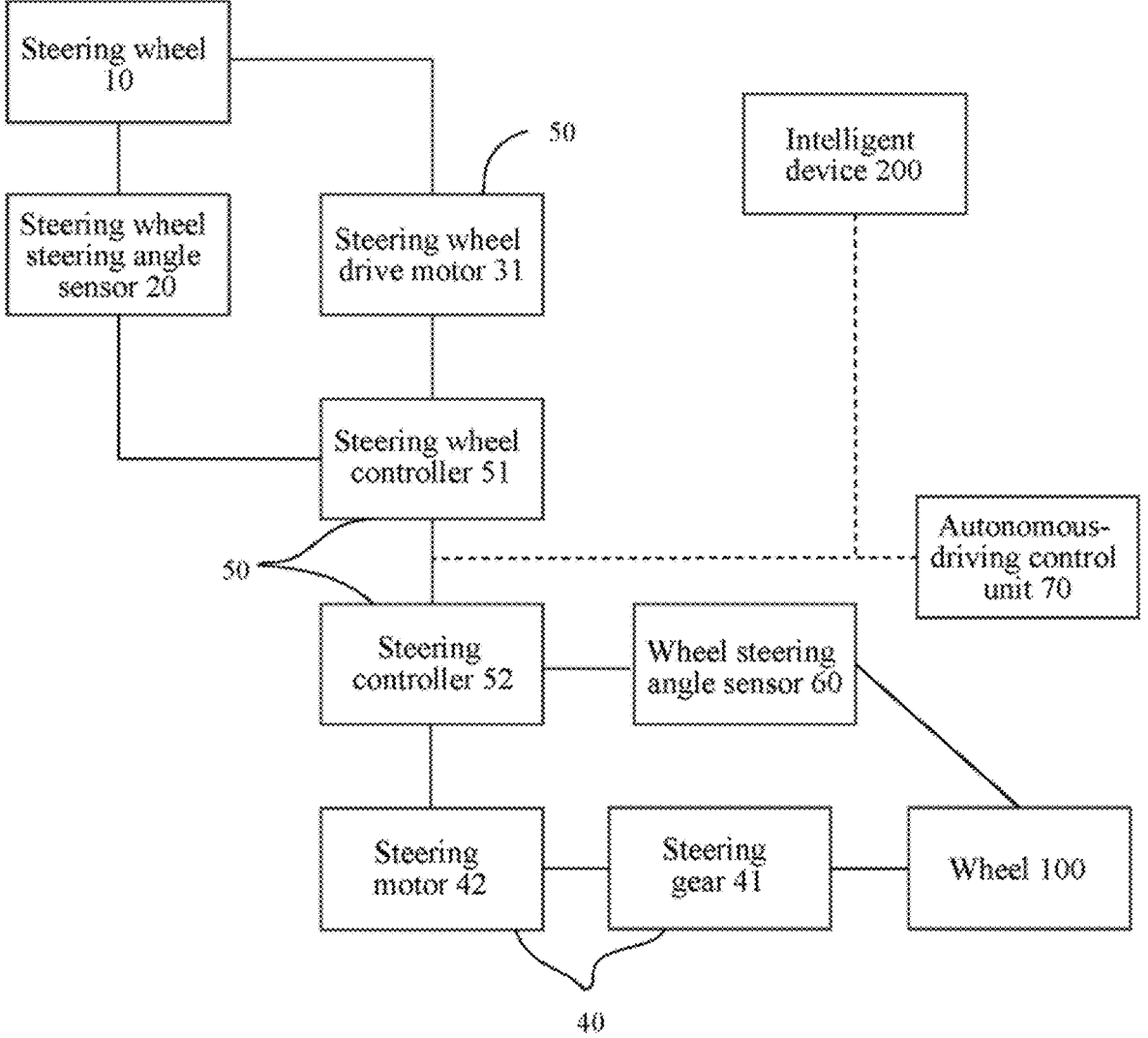
FIG. 6 is a schematic block diagram of the vehicle steering control system according to another embodiment of the present disclosure.

According to an embodiment of the present disclosure, as shown in FIG. 2, FIG. 5, and FIG. 6, the control module 50 may include a steering wheel controller 51 and a steering controller 52. The steering wheel controller 51 is electrically connected to the steering wheel drive unit 30 and the steering wheel steering angle sensor 20. The steering con- troller 52 is electrically connected to the steering mechanism 40 such as the steering motor 42 and the wheel steering angle sensor 60. The steering wheel controller 51 commu- nicates with the steering controller 52. Specifically, the steering controller 52 may be an EPS electronic control unit.

It can be understood that the steering wheel controller 51 may control the steering wheel drive unit 30, and the steering controller 52 may control the steering mechanism 40. The steering wheel controller 51 may transmit the rotation information of the steering wheel 10 to the steering controller 52, and the steering controller 52 may transmit the rotation information of the wheels 100 to the steering wheel controller 51.

The steering wheel controller 51 may communicate with the steering controller 52 in a wired communication manner or a wireless communication manner. More specifically, the wired communication manner may be a controller area network (CAN) bus, a Media Oriented Systems Transport (MOST) bus or the like, and the wireless communication manner may be Wi-Fi, Bluetooth or the like.

Therefore, a rigid connection between the steering wheel and the steering gear at the bottom is eliminated, and a wired signal or a wireless signal is used in place of a mechanical structure to transmit a steering intention of the driver of the vehicle. For example, the steering wheel controller 51 may be connected to the steering controller 52 by a CAN bus. The CAN bus is a twisted pair and configured to transmit digital signals.

In some embodiments, as shown in FIG. 1 to FIG. 3, FIG. 5, and FIG. 6, the control module 50 further communicates with at least one of an autonomous-driving control unit 70, an intelligent device 200, and a server 300. The control module 50 may communicate with the autonomous-driving control unit 70 to receive information transmitted by the autonomous-driving control unit 70. The control module 50 may communicate with the intelligent device 200 to receive information transmitted by the intelligent device 200 or transmit information to the intelligent device 200. The control module 50 may communicate with the server 300 to receive information transmitted by the server 300 or transmit information to the server 300.

The autonomous-driving control unit 70 is configured to control the steering, acceleration and deceleration, lights, windshield wipers, and the like of the vehicle. The intelligent device 200 may be an in-vehicle intelligent device such as an in-vehicle display terminal or a mobile intelligent device such as a mobile phone, a tablet computer or an unmanned aerial vehicle. The in-vehicle display terminal, that is, an in-vehicle pad, is responsible for a multimedia function of the vehicle and may be fixed or removable on the vehicle.

Figure 3:
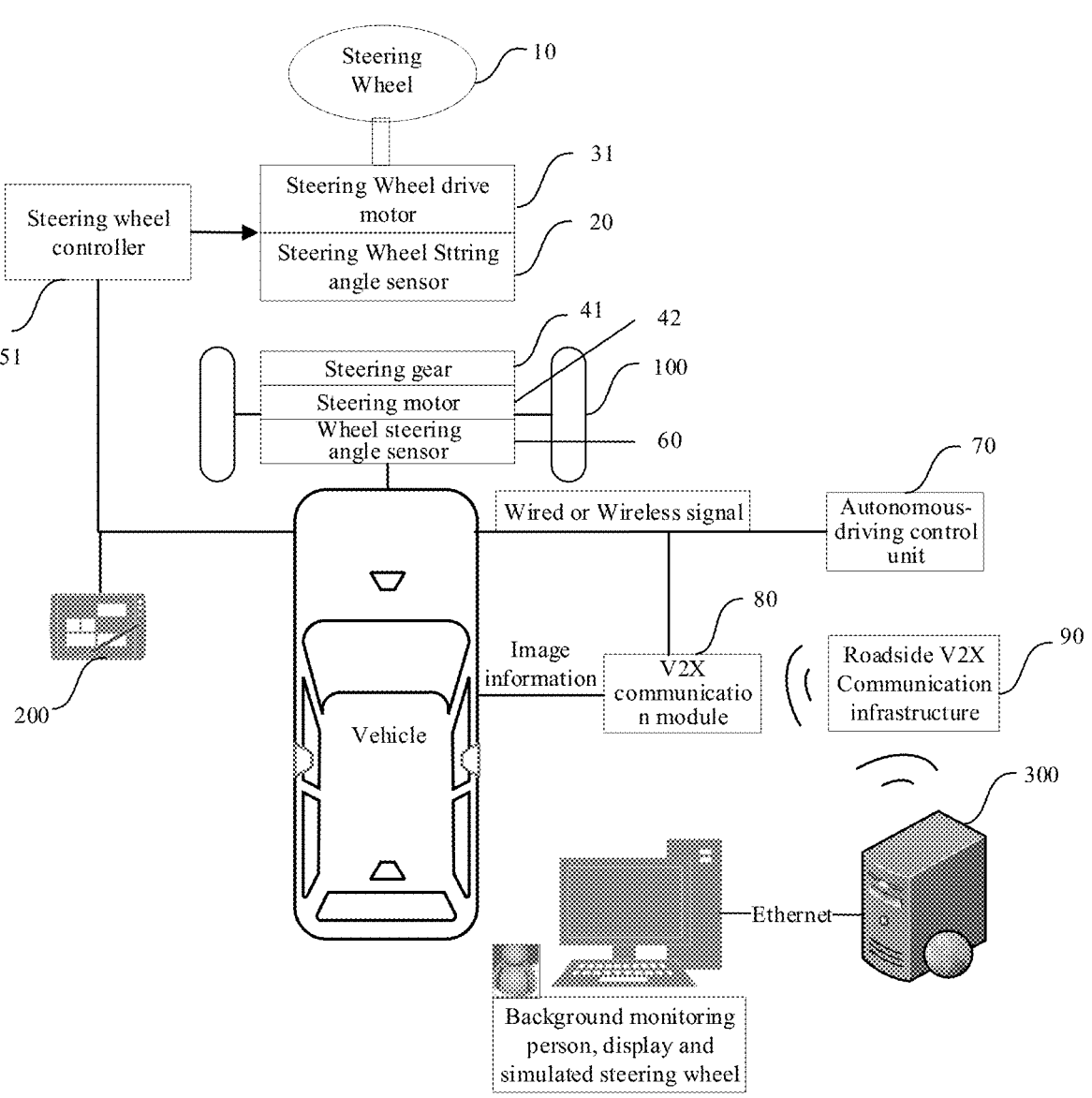
FIG. 3 is a schematic block diagram of the vehicle steering control system according to another embodiment of the present disclosure.

In some embodiments, as shown in FIG. 3, the control module 50 may communicate with the server 300 through an in-vehicle communication module such as a V2X communication module 80. More specifically, the V2X communication module 80 may communicate with the server 300 through a roadside V2X communication infrastructure 90. In addition, when the intelligent device 200 is an in-vehicle device such as an in-vehicle display terminal, the control module 50 may communicate with the intelligent device 200 in a wired or wireless manner. When the intelligent device 200 is not an in-vehicle device, and is, for example, a mobile terminal or an unmanned aerial vehicle, the control module 50 may communicate with the intelligent device 200 in a wireless manner.

It should be noted that, in some embodiments of the present disclosure, the steering controller 52 may communicate with the steering wheel controller 51, and the steering controller 52 may communicate with the autonomous-driving control unit 70, the intelligent device 200, and the server 300. In other embodiments of the present disclosure, when the intelligent device 200 is an in-vehicle intelligent device, and the in-vehicle intelligent device, the steering controller 52, and the steering wheel controller 51 are all connected to the communication bus of the vehicle (to perform wired communication), the steering controller 52 may communicate with the autonomous-driving control unit 70, the intelligent device 200, and the server 300, and the steering wheel controller 51 may also directly communicate with the in-vehicle intelligent device.

It should be noted that in some embodiments of the present disclosure, there may be one or more steering wheels 10. That is, there may be M steering wheels 10, M being a positive integer. The vehicle steering control system is described below by using an example in which a quantity of the steering wheel 10 is M.

Figure 7:
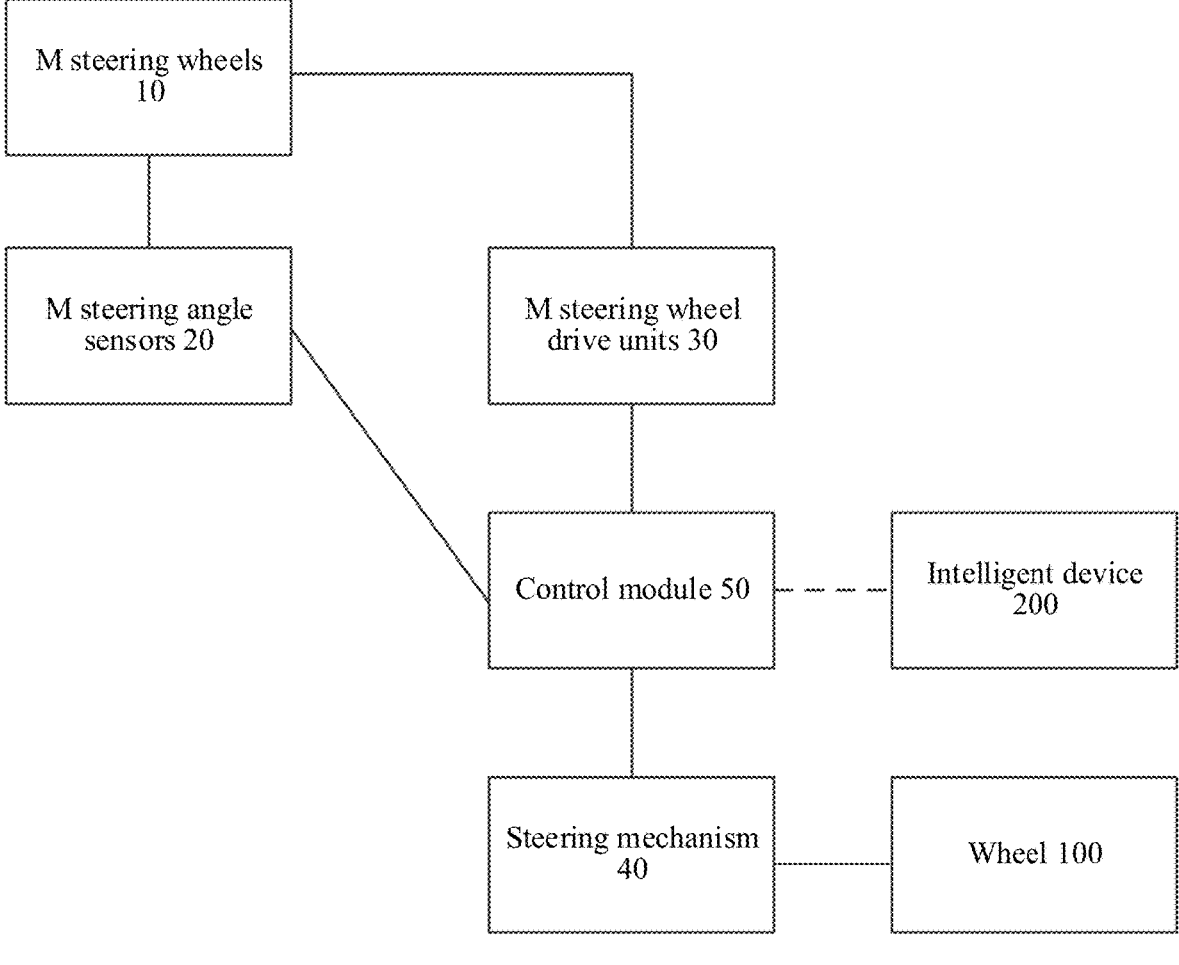
FIG. 7 is a schematic block diagram of the vehicle steering control system according to still another embodiment of the present disclosure.

FIG. 7 is a schematic block diagram of a vehicle steering control system according to an embodiment of the present disclosure. As shown in FIG. 7, the vehicle control system includes M steering wheels 10, M steering wheel steering angle sensors 20, M steering wheel drive units 30, a steering mechanism 40, and a steering control unit 50. M is a positive integer.

Each steering wheel 10 is an apparatus for the driver to determine the moving direction of the vehicle. That is, each steering wheel 10 is rotated under the operation of the driver or a passenger. Specifically, when there is one steering wheel, that is, when M is 1, the steering wheel may be arranged at the position of the driver; and when there are a plurality of steering wheels, that is, when M is greater than 1, the steering wheels may be arranged at the position of the driver and another position such as the position of the co-driver.

The M steering wheel steering angle sensors 20 may be correspondingly connected to the M steering wheels 10. Specifically, each steering wheel 10 may be connected to a corresponding steering wheel steering angle sensor 20 by a steering column or each steering wheel steering angle sensor 20 may be integrated in a corresponding steering wheel 10. Each steering wheel steering angle sensor 20 is configured to acquire rotation information of the corresponding steering wheel 10 such as the rotation angle and the rotation speed of the steering wheel 10.

Each steering wheel drive unit 30 is connected to a corresponding steering wheel 10, and each steering wheel drive unit 30 is configured to drive the corresponding steering wheel 10 to rotate and apply steering torque to the corresponding steering wheel 10. That is, each steering wheel drive unit 30 may drive the corresponding steering wheel 10 under the control of the control module 50 to rotate, to keep the rotation angle of at least one steering wheel the same as that of the wheels, and each steering wheel drive unit 30 may further apply the steering torque to the corresponding steering wheel 10 when the corresponding steering wheel 10 is operated by the driver, so as to provide reverse torque to the steering wheel 10 to ensure the handling comfort of the driver. That is, when the steering wheel 10 is rotated clockwise under the operation (turning) of the driver, the steering wheel drive unit 30 applies counterclockwise torque to the steering wheel 10. When the steering wheel 10 is rotated counterclockwise under the operation of the driver, the steering wheel drive unit 30 applies clockwise torque to the steering wheel 10.

Figure 8:
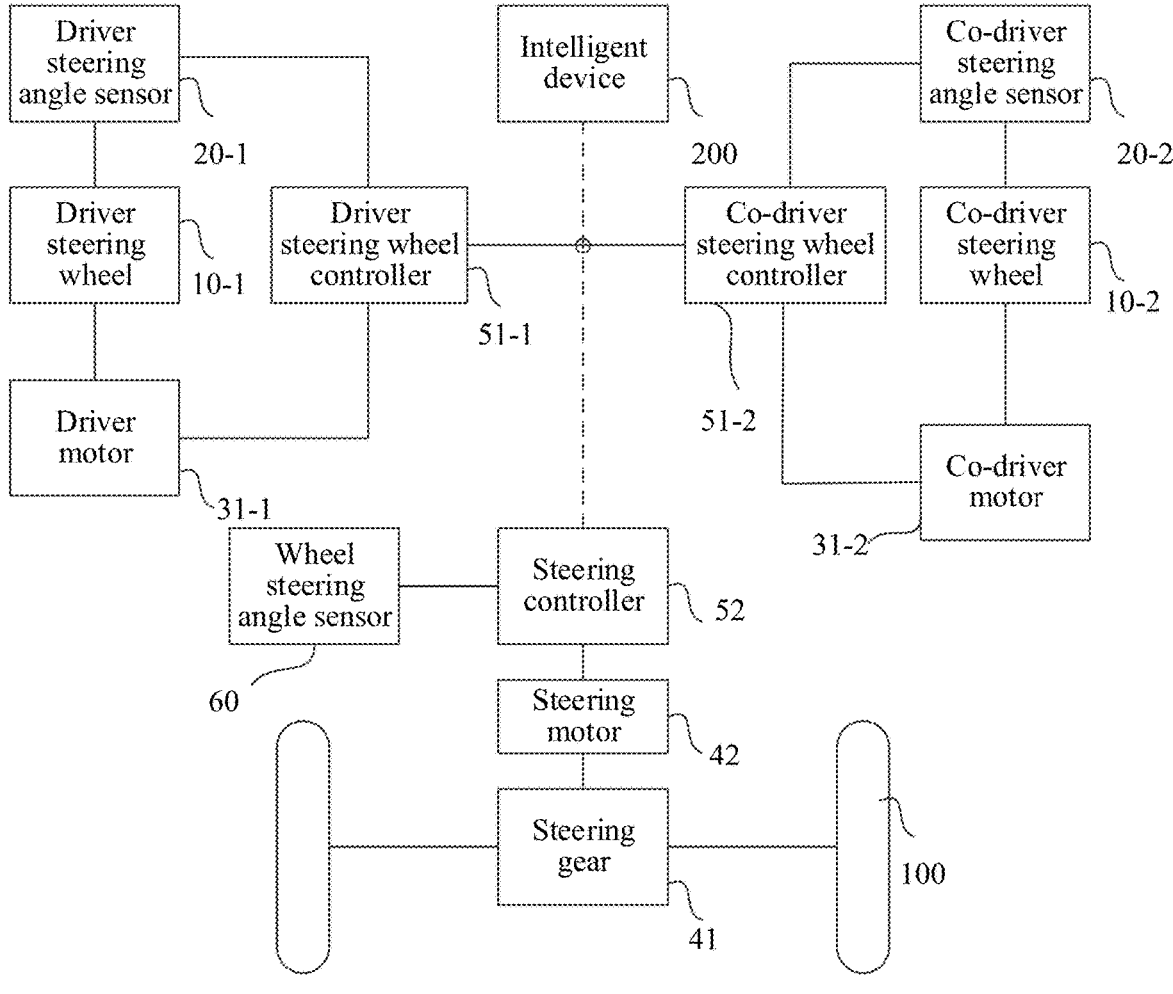
FIG. 8 is a schematic block diagram of the vehicle steering control system according to still another specific embodiment of the present disclosure.

As shown in FIG. 8, each steering wheel drive unit 30 may include steering wheel drive motors 31. Each steering wheel drive motor 31 may be connected to the corresponding steering wheel 10 by a steering column. Each steering wheel drive motor 31 may apply steering torque to the corresponding steering wheel 10 under the control of the control module 50, thereby ensuring the handling comfort of the driver.

The steering mechanism 40 is connected, for example, mechanically connected, to wheels 100 of the vehicle, and the steering mechanism 40 is configured to drive the wheels

100 of the vehicle to rotate. It can be understood that the steering mechanism 40 may drive a pair of front wheels or a pair of rear wheels of the vehicle to rotate, or the steering mechanism 40 may drive a pair of front wheels and a pair of rear wheels of the vehicle to rotate simultaneously.

As shown in FIG. 8, the steering mechanism 40 may include a steering gear 41 and a steering motor 42 such as an EPS motor. The steering gear 41 is connected to the wheels 100. The steering motor 42 may be connected to the steering gear 41. A steering motor 42 may drive the steering gear 41 such as a steering rack under the control of the control module 50 to implement steering. Specifically, the control module 50 may control the steering motor 42 to rotate to drive the steering rack to move laterally to implement the steering of the wheels.

The control module 50 may be electrically connected to the steering mechanism 40 such as the steering motor 42, the M steering wheel drive units 30, and the M steering wheel steering angle sensors 20 separately. That is, the control module 50 may separately receive, through the electrical connection with the M steering wheel steering angle sensors 20, rotation information of the steering wheels 10 acquired by the M steering wheel steering angle sensors 20, the control module 50 controls the steering mechanism 40 through the electrical connection with the steering mechanism 40, and the control module 50 separately controls the M steering wheel drive units 30 through the electrical connection with the M steering wheel drive units 30.

It can be understood that when any steering wheel 10 rotates under the operation of the driver, the control module 50 may obtain the rotation information of the steering wheel 10, and control the steering mechanism 40 according to the rotation information of the steering wheel 10, and may also control the steering wheel drive unit 30 corresponding to the steering wheel 10 to make the steering wheel drive unit 30 apply steering torque to the steering wheel 10.

As shown in FIG. 8, the vehicle control system may further include a wheel steering angle sensor 60. The wheel steering angle sensor 60 is configured to detect rotation information of the wheels 100, for example, the rotation angle and rotation speed of the wheels 100. The control module 50 may also be electrically connected to the wheel steering angle sensor 60. The control module 50 may receive, through the electrical connection with the wheel steering angle sensor 60, the rotation information of the wheels 100 acquired by the wheel steering angle sensor 60. The control module 50 controls the steering mechanism 40 and the M steering wheel drive units 30 according to the rotation information of the wheels 100 and the rotation information of the M steering wheels 10.

It can be understood that in the process of controlling the steering mechanism 40 according to the rotation information of any steering wheel 10, the control module 50 may obtain the rotation information of the wheels 100 and determine whether the rotation information of the wheels 100 is the same as the rotation information of the steering wheel 10, that is, whether the rotation angle of the wheels 100 is the same as the rotation angle of the steering wheel 10, and if yes, the steering mechanism 40 is controlled to stop driving, or if not, the steering mechanism 40 is controlled to continue driving until the rotation information of the wheels 100 is the same as the rotation information of the steering wheel 10.

According to an embodiment of the present disclosure, as shown in FIG. 8, the control module 50 may include M steering wheel controllers 51 and a steering controller 52. Each steering wheel controller 51 is electrically connected to a corresponding steering wheel drive unit 30 and the steering wheel steering angle sensor 20. The steering controller 52 is electrically connected to the steering mechanism 40 such as the steering motor 42 and the wheel steering angle sensor 60. The M steering wheel controllers 51 communicate with the steering controller 52. Specifically, the steering controller 52 may be an EPS electronic control unit.

It can be understood that each steering wheel controller 51 may control the corresponding steering wheel drive unit 30, and the steering controller 52 may control the steering mechanism 40. The M steering wheel controllers 51 may transmit the rotation information of the steering wheels 10 to the steering controller 52, and the steering controller 52 may transmit the rotation information of the wheels 100 to at least one of the M steering wheel controllers 51.

The steering controller 52 may communicate with the M steering wheel controllers 51 in a wired communication manner or a wireless communication manner. More specifically, the wired communication manner may be a CAN bus, a MOST bus or the like, and the wireless communication manner may be Wi-Fi, Bluetooth or the like. Therefore, a rigid connection between the steering wheel and the steering gear at the bottom is eliminated, and a wired signal or a wireless signal is used in place of a mechanical structure to transmit a steering intention of the driver of the vehicle. For example, the M steering wheel controllers 51 may be connected to the steering controller 52 by a CAN bus. The CAN bus is a twisted pair, and configured to transmit digital signals.

In some embodiments, as shown in FIG. 7 and FIG. 8, the control module 50 further communicates with an intelligent device 200. The control module 50 may communicate with the intelligent device 200 to receive information transmitted by the intelligent device 200 or transmit information to the intelligent device 200.

The intelligent device 200 may be an in-vehicle intelligent device such as an in-vehicle display screen, or a mobile intelligent device such as a mobile phone, a tablet computer, or an unmanned aerial vehicle. The in-vehicle display screen, that is, the in-vehicle pad, is responsible for a multimedia function of the vehicle and may be fixed or removable on the vehicle. In addition, when the intelligent device 200 is an in-vehicle device such as an in-vehicle display terminal, the control module 50 may communicate with the intelligent device 200 in a wired or wireless manner. When the intelligent device 200 is not an in-vehicle device, and is, for example, a mobile terminal or an unmanned aerial vehicle, the control module 50 may communicate with the intelligent device 200 in a wireless manner.

It should be noted that the steering controller 52 may communicate with the steering wheel controller 51, and the steering controller 52 may communicate with the intelligent device 200. In other embodiments of the present disclosure, when the intelligent device 200 is an in-vehicle intelligent device, and the in-vehicle intelligent device, the steering controller 52, and the steering wheel controller 51 are all connected to the communication bus of the vehicle (e.g., to perform wired communication), the steering wheel controller 51 may also directly communicate with the in-vehicle intelligent device.

Embodiment 1

Based on the vehicle steering control system in the embodiments shown in FIG. 4 to FIG. 6, the present disclosure provides a vehicle, a vehicle steering control system and method, an in-vehicle intelligent device and a control method thereof, and a mobile intelligent device and a control method thereof.

According to an embodiment of the present disclosure, a control module 50 is configured to: obtain rotation information of wheels 100 before the vehicle enters a steering-wheel driving mode, and control a steering wheel drive unit 30 according to the rotation information of the wheels 100 to drive a steering wheel 10 to rotate, until a rotation angle of the steering wheel 10 is the same as a rotation angle of the wheels.

The control module 50 includes a steering wheel controller 51 and a steering controller 52. The steering wheel controller 51 communicates with the steering controller 52. The steering controller 52 is configured to: obtain the rotation information of the wheels 100 before the vehicle enters the steering-wheel driving mode, and transmit the rotation information of the wheels 100 to the steering wheel controller 51. The steering wheel controller 51 controls the steering wheel drive unit 30 according to the rotation information of the wheels 100 to drive the steering wheel 10 to rotate, until the rotation angle of the steering wheel 10 is the same as the rotation angle of the wheels 100.

It should be noted that the steering-wheel driving mode may be that a driver controls the moving direction of the vehicle by operating the steering wheel. That is, in the steering-wheel driving mode, the steering controller 52 controls the rotation angle of the wheels 100 according to the rotation angle of the steering wheel.

It can be understood that when the vehicle is not in the steering-wheel driving mode, the rotation angle of the steering wheel 10 and the rotation angle of the wheels 100 may be the same or may be not the same.

Before the vehicle enters the steering-wheel driving mode, for example, when the vehicle is started or when the vehicle exits an autonomous-driving mode, the steering controller 52 may transmit the rotation information of the wheels 100 to the steering wheel controller 51, and the steering wheel controller 51 may control the steering wheel 10 according to the received rotation information of the wheels 100 to make the rotation angle of the steering wheel 10 the same as the rotation angle of the wheels 100, that is, make the rotation angle of the steering wheel 10 correspond to the rotation angle of the wheels 100, thereby keeping the rotation angle of the steering wheel 10 the same as that of the wheels 100.

Therefore, in some embodiments, when the vehicle is started, the steering wheel controller 51 may control the steering wheel 10 according to the received rotation information of the wheels 100, thereby ensuring that the rotation angle of the steering wheel 10 is the same as the rotation angle of the wheels 100. Moreover, when the vehicle is in an autonomous-driving state, if the vehicle needs to be taken over by the driver, the steering wheel controller 51 may control the steering wheel 10 according to the received rotation information of the wheels 100 to rotate, until the rotation angle of the steering wheel is the same as the rotation angle of the wheels 100, to ensure that the rotation angle of the steering wheel 10 is the same as the rotation angle of the wheels 100, thereby ensuring that the driver can accurately determine the moving direction of the vehicle, preventing the vehicle from danger, and effectively reminding the driver to drive, that is, when finding that the steering wheel rotates, the driver may determine that the autonomous driving requires manual intervention.

According to an embodiment of the present disclosure, as shown in FIG. 6, the control module 50 such as the steering controller 52 may communicate with an autonomous-driving control unit 70 of the vehicle. When the autonomous-driving control unit 70 of the vehicle receives an autonomous-driving exit instruction of the driver through a receiving assembly 71 such as an autonomous-driving mode exit button, there is a failure in the autonomous-driving control unit 70, or a driving environment of the vehicle does not meet an autonomous driving condition, the autonomous-driving control unit 70 controls the vehicle to switch from the autonomous-driving mode to the steering-wheel driving mode.

It can be understood that the autonomous-driving control unit 70 may control the vehicle to perform autonomous driving, for example, may control the steering, acceleration and deceleration, lights, windshield wipers, and the like of the vehicle. In the autonomous-driving mode, the autonomous-driving control unit 70 automatically controls the driving of the vehicle without the driver operating the steering wheel 10.

Specifically, when the vehicle is in the autonomous-driving mode, the autonomous-driving control unit 70 may monitor whether the autonomous-driving exit instruction of the driver is received. If the autonomous-driving exit instruction of the driver is received, that is, the driver presses the autonomous-driving exit button, the driver wants to actively take over the vehicle. In this case, the autonomous-driving control unit 70 controls the vehicle to exit the autonomous-driving mode, the steering controller 52 transmits the rotation information of the wheels 100 to the steering wheel controller 51, and the steering wheel controller 51 controls the steering wheel 10 according to the rotation information of the wheels 100 to make the rotation angle of the steering wheel 10 the same as the rotation angle of the wheels 100.

The autonomous-driving control unit 70 may also determine whether there is a failure therein. If there is a failure in the autonomous-driving control unit 70 such as an autonomous-driving sensor failure, the autonomous-driving control unit 70 determines that the driver needs to take over the vehicle. In this case, the autonomous-driving control unit 70 controls the vehicle to exit the autonomous-driving mode, the steering controller 52 transmits the rotation information of the wheels 100 to the steering wheel controller 51, and the steering wheel controller 51 controls the steering wheel 10 according to the rotation information of the wheels 100 to make the rotation angle of the steering wheel 10 the same as the rotation angle of the wheels 100.

The autonomous-driving control unit 70 may also monitor a surrounding environment of the vehicle to determine whether the driving environment of the vehicle meets an autonomous driving condition. If the driving environment of the vehicle does not meet the autonomous driving condition, that is, a vehicle surrounding environment is complex (for example, the vehicle is in a residential area), the autonomous-driving control unit 70 determines that the driver needs to take over the vehicle. In this case, the autonomous-driving control unit 70 controls the vehicle to exit the autonomous-driving mode, the steering controller 52 transmits the rotation information of the wheels 100 to the steering wheel controller 51, and the steering wheel controller 51 controls the steering wheel 10 according to the rotation information of the wheels 100 to make the rotation angle of the steering wheel 10 the same as the rotation angle of the wheels 100.

Therefore, in a case that the driver wants to actively take over the vehicle or the autonomous-driving control unit 70 determines that the driver needs to take over the vehicle, the steering wheel may be controlled to rotate to make the rotation angle of the steering wheel the same as the rotation angle of the vehicle, to facilitate the takeover by the driver.

In some embodiments of the present disclosure, when the steering wheel 10 is not controlled, that is, the steering wheel 10 is not operated by the driver and the steering wheel 10 does not need to be synchronized with the wheels, the steering wheel 10 may be accommodated in an accommodating cavity to provide more space in the cockpit.

According to an embodiment of the present disclosure, the steering controller 52 is configured to: receive rotation information transmitted by the autonomous-driving control unit 70 when the vehicle is in the autonomous-driving mode, and control a steering mechanism 40 according to the rotation information transmitted by the autonomous-driving control unit 70, so that the steering mechanism 40 drives, according to the rotation information transmitted by the autonomous-driving control unit 70, the wheels 100 of the vehicle to rotate.

When the vehicle is in the autonomous-driving mode, the autonomous-driving control unit 70 may transmit rotation information such as a rotation angle to the steering controller 52, and the steering controller 52 may control a steering motor 42 according to the rotation information transmitted by the autonomous-driving control unit 70 to make the steering motor 42 drive the wheels 100 through the steering gear 41 to rotate to a corresponding angle.

The steering controller 52 may receive the rotation information transmitted by the autonomous-driving control unit 70, and drive the steering motor 42 according to the rotation information to rotate. In addition, the steering controller 52 also monitors the rotation information of the wheels 100 through a wheel steering angle sensor 60, and stops driving the steering motor 42 when it is detected that the wheels 100 is rotated to an angle anticipated by the autonomous-driving control unit 70.

Therefore, when the vehicle is in the autonomous-driving mode, the steering controller 52 controls the rotation of the wheels 100 according to the rotation information from the autonomous-driving control unit 70 without a steering wheel, and the steering wheel drive unit 30 may not control the steering wheel to rotate.

According to an embodiment of the present disclosure, the control module 50 such as the steering wheel controller 51 communicates with the in-vehicle intelligent device through a communication bus of the vehicle, for example, a CAN. The in-vehicle intelligent device obtains status information and steering wheel information of the vehicle when the in-vehicle intelligent device detects the running of a target program of the in-vehicle intelligent device, and controls a target object of the in-vehicle intelligent device according to rotation information of the steering wheel 10 when the vehicle is in the autonomous-driving mode.

It can be understood that the status information of the vehicle may include a driving mode of the vehicle, for example, a steering-wheel driving mode, an autonomous-driving mode or a parking state of the vehicle. The steering wheel information may include rotation information of the steering wheel, a use status of the steering wheel, mark information of the steering wheel, and the like.

It should be noted that the in-vehicle intelligent device may obtain the status information and steering wheel information of the vehicle together, or the in-vehicle intelligent device may first obtain the status information of the vehicle, and then obtain the steering wheel information when it is determined that the vehicle is not in the steering-wheel driving mode. In addition, the target program may be an application such as a game program installed on the in-vehicle intelligent device. The target object may be a virtual object such as a virtual steering wheel or a virtual vehicle displayed on the in-vehicle intelligent device, or the target object may be a physical object such as the in-vehicle intelligent device itself or a rotating part of the in-vehicle intelligent device.

The in-vehicle intelligent device may control the running of the target program according to an instruction of a user, and the user may operate the steering wheel after the target program starts to run. The steering wheel controller 51 reads the rotation angle and rotation speed of the steering wheel 10, and transmits the rotation angle and rotation speed of the steering wheel 10 to the communication bus. After the in-vehicle intelligent device detects the running of the target program, the in-vehicle intelligent device may directly read the information through the communication bus of the vehicle. For example, the in-vehicle intelligent device may first read the status information of the vehicle through the communication bus to determine an operating mode, actively read the rotation information of the steering wheel 10 through the communication bus when the vehicle is in the autonomous-driving mode, and control the target object according to the rotation information of the steering wheel 10. In another example, the in-vehicle intelligent device may first read the status information of the vehicle and the rotation information of the steering wheel 10 through the communication bus, determine the operating mode according to the status information of the vehicle, and control the target object according to the rotation information of the steering wheel 10 when the vehicle is in the autonomous-driving mode.

It can be understood that when the vehicle is in the autonomous-driving mode and the running of the target program is detected, the in-vehicle intelligent device may display reminder information to prompt the user to operate the steering wheel.

In addition, in some other embodiments, after the vehicle is in the autonomous-driving mode, the in-vehicle intelligent device may also determine a use status of the steering wheel. If the steering wheel is in use, for example, remotely controlling another device, the target object may be no longer controlled according to the rotation information of the steering wheel 10. If the steering wheel is not in use, the target object is controlled according to the rotation information of the steering wheel 10.

In some embodiments of the present disclosure, the target program may be a game program such as a sim racing game, and the target object may be a simulated object such as a simulated racing car in the game. For example, when the target program is a sim racing game, the user may trigger the sim racing game to run and operate the steering wheel. The steering wheel controller 51 reads the rotation angle and rotation speed of the steering wheel 10, and transmits the rotation angle and rotation speed of the steering wheel 10 to the communication bus. When the vehicle is in the autonomous-driving mode and the running of the target program is detected, the in-vehicle intelligent device may directly read the rotation information of the steering wheel 10 through the communication bus, process the rotation information of the steering wheel 10 to obtain rotation information (including a rotation angle, a rotation speed or a rotation angle and a rotation speed) of the target object, and then perform steering control on the target object according to the rotation information of the target object. For example, a simulated racing car in the sim racing game may rotate according to the obtained rotation angle and rotation speed of the target object.

Therefore, the in-vehicle intelligent device is remotely controlled by using a physical steering wheel, to ensure normal driving and also provide a passenger with entertainment.

In some embodiments, the control module 50 such as the steering controller 52 may perform wireless communication with the mobile intelligent device. When the mobile intelligent device detects the running of a target program of the mobile intelligent device, the mobile intelligent device transmits a request instruction to the control module 50, that is, the steering controller 52, and receives the status information and the steering wheel information of the vehicle that are transmitted by the control module 50. When the vehicle is in the autonomous-driving mode, the mobile intelligent device controls a target object of the mobile intelligent device according to the rotation information of the steering wheel 10.

It should be noted that the mobile intelligent device may be an intelligent device that is not mounted on the vehicle. After receiving the request instruction, the steering controller 52 may transmit the status information and the steering wheel information of the vehicle to the mobile intelligent device together. Alternatively, the steering controller 52 may transmit the status information of the vehicle to the mobile intelligent device after receiving the request instruction. The mobile intelligent device may transmit a control request to the steering controller 52 when the mobile intelligent device determines that the vehicle is in the autonomous-driving mode. The steering controller 52 then obtains the steering wheel information according to the control request, and transmits the steering wheel information to the mobile intelligent device in real time. The mobile intelligent device may control the target object according to the rotation information of the steering wheel 10.

It can be understood that the target program may be an application such as a game program or a remote-control program installed on the mobile intelligent device. The target object may be a virtual object such as a virtual steering wheel or a virtual vehicle displayed on the mobile intelligent device, or the target object may be a physical object, such as the mobile intelligent device itself or a rotating part (for example, a rotating part of an unmanned aerial vehicle) of the mobile intelligent device.

The mobile intelligent device may control the running of the target program according to an instruction of a user, and the user may operate the steering wheel after the target program starts to run. The steering wheel controller 51 reads the rotation angle and rotation speed of the steering wheel 10, and transmits the rotation angle and rotation speed of the steering wheel 10 to the steering controller 52. After the mobile intelligent device detects that the target program is running, the mobile intelligent device may transmit a request instruction to the steering controller 52, and the steering controller 52 feeds back information to the mobile intelligent device after receiving the request instruction. For example, the steering controller 52 may transmit the status information of the vehicle to the mobile intelligent device, and the mobile intelligent device may determine the operating mode according to the status information of the vehicle, and then transmit a control request to the steering controller 52 when the vehicle is in the autonomous-driving mode. The steering controller 52 then obtains the steering wheel information according to the control request, and transmits the steering wheel information to the mobile intelligent device in real time. The mobile intelligent device may control the target object according to the rotation information of the steering wheel 10. In another example, after receiving the request instruction, the steering controller 52 may transmit the status information of the vehicle and the rotation information of the steering wheel 10 to the mobile intelligent device together, and the mobile intelligent device then determines the operating mode according to the status information of the vehicle, and controls the target object according to the rotation information of the steering wheel 10 when the vehicle is in the autonomous-driving mode.

It can be understood that when the vehicle is in the autonomous-driving mode and the running of the target program is detected, the mobile intelligent device may display reminder information to prompt the user to operate the steering wheel.

In addition, in some other embodiments, after the vehicle enters the autonomous-driving mode, the mobile intelligent device may also determine a use status of the steering wheel. If the steering wheel is in use, for example, is remotely controlling another device, the target object is no longer controlled according to the rotation information of the steering wheel 10. If the steering wheel is not in use, the target object is controlled according to the rotation information of the steering wheel 10.

In some embodiments of the present disclosure, the target program may be a game program such as a sim racing game, and the target object may be a simulated object such as a simulated racing car in the game. Alternatively, the target program may be an unmanned-aerial-vehicle remote control program, and the target object may be an unmanned aerial vehicle. For example, when the target program is an unmanned-aerial-vehicle remote control program, the user may trigger the unmanned-aerial-vehicle remote control program to run and operate the steering wheel. The steering wheel controller 51 reads the rotation angle and rotation speed of the steering wheel 10 and transmits the rotation angle and rotation speed of the steering wheel 10 to the steering controller 52, and the steering controller 52 transmits the rotation angle and rotation speed of the steering wheel 10 to the unmanned aerial vehicle in real time. When the vehicle is in the autonomous-driving mode and the running of the target program is detected, the unmanned aerial vehicle may process the rotation information of the steering wheel 10 to obtain rotation information (including a rotation angle, a rotation speed or a rotation angle and a rotation speed) of the target object. Steering control may then be performed on the unmanned aerial vehicle according to the rotation information of the target object, so that the unmanned aerial vehicle is remotely controlled.

Therefore, the mobile intelligent device is remotely controlled by using the physical steering wheel of the vehicle, to ensure normal driving and also provide a passenger with entertainment.

It should be noted that the wheels 100 of the vehicle may not rotate with the rotation of the steering wheel when the vehicle is in the autonomous-driving mode. When the vehicle is in the steering-wheel driving mode, the in-vehicle intelligent device or the mobile device may automatically exit the target program and stop controlling the target object according to the rotation information of the steering wheel 10. The in-vehicle intelligent device or the mobile device determines, according to the status information of the vehicle transmitted by the control module 50 in real time, that the vehicle enters the steering-wheel driving mode. According to an embodiment of the present disclosure, the steering controller 52 is configured to: obtain the rotation information of the steering wheel 10 after the vehicle enters the steering-wheel driving mode, and control the steering mechanism 40 according to the rotation information of the steering wheel 10, so that the steering mechanism 40 drives the wheels 100 of the vehicle according to the rotation information of the steering wheel 10 to rotate. At the same time, the steering wheel controller 51 controls the steering wheel drive unit 30 to apply steering torque to the steering wheel 10.

That is, when the driver operates the steering wheel 10, the steering wheel controller 51 may transmit the rotation information of the steering wheel 10 to the steering controller 52, and the steering controller 52 controls the steering mechanism 40 according to the received rotation information, to make the wheels 100 rotate to a corresponding angle.

The steering controller 52 may receive the rotation information of the steering wheel 10 transmitted by the steering wheel controller 51, and drive the steering motor 42 according to the rotation information of the steering wheel 10 to operate. In addition, the steering controller 52 also monitors the rotation information such as the rotation angle of the wheels 100 through the wheel steering angle sensor 60. When it is detected that the wheels 100 are rotated to the rotation angle of the steering wheel 10, the driving of the steering motor 42 is stopped, to ensure that the angle of the wheels is the same as that of the steering wheel in real time.

It can be understood that the steering wheel controller 51 may acquire the rotation information of the steering wheel 10 through a steering wheel steering angle sensor 20 to determine a steering intention of the driver. The steering wheel drive unit 30 may simulate the steering torque, to provide the driver with a relatively comfortable steering force. The steering controller 52 may receive the rotation information of the steering wheel 10 transmitted by the steering wheel controller 51 and determine whether the vehicle is in the steering-wheel driving mode. When the vehicle is in the steering-wheel driving mode, the steering controller 52 drives the steering mechanism 40 according to the rotation information of the steering wheel 10 to implement the steering. When the steering wheel 10 enters a preset operating mode and the vehicle is not in the steering-wheel driving mode, the steering controller 52 may obtain a steering angle and steering speed of the steering wheel 10, and transmit the steering angle and steering speed of the steering wheel to the intelligent device 200 in a wired or wireless manner, or the intelligent device 200 may directly perform determination, and actively acquire the rotation information of the steering wheel 10 after it is determined that the steering wheel enters the preset operating mode and the vehicle is not in the steering-wheel driving mode.

Therefore, when the driver drives the vehicle, the rotation angle of the steering wheel 10 may be kept the same as the rotation angle of the wheels 100.

As described above, in this embodiment of the present disclosure, after the vehicle is powered on, the steering controller 52 may determine whether the vehicle is successfully started. If the vehicle fails to start, the steering controller 52 does not receive the rotation information from the steering wheel drive unit 30 or the autonomous-driving control unit 70 and the angle of the wheels 100 remains unchanged. In this case, the in-vehicle intelligent device may determine whether the running of the target program is detected. If the target program is detected, the in-vehicle intelligent device reads the rotation angle and rotation speed of the steering wheel 10, and controls the target object according to the rotation angle and rotation speed of the steering wheel 10. Alternatively, the mobile intelligent device may determine whether the running of the target program is detected. If the target program is detected, the mobile intelligent device transmits a request instruction to the steering controller 52, receives the rotation angle and rotation speed of the steering wheel 10 transmitted by the steering controller 52, and controls the target object according to the rotation angle and rotation speed of the steering wheel 10.

If the vehicle is successfully started, the steering controller 52 further determines whether the vehicle is in the autonomous-driving mode. If the vehicle is not in the autonomous-driving mode and is in a steering wheel control mode, the steering controller 52 receives the rotation information of the steering wheel transmitted by the steering wheel drive unit 30, drives the steering motor 42, and at the same time monitors the rotation information of the wheels 100 through the wheel steering angle sensor 60, to keep the angle of the wheels 100 the same as the angle of the steering wheel 10 and respond to a steering request of the driver in real time.

If the vehicle is in the autonomous-driving mode, the steering controller 52 receives the rotation information transmitted by the autonomous-driving control unit 70, drives the steering motor 42 according to the rotation information transmitted by the autonomous-driving control unit 70, and at the same time monitors the rotation information of the wheels 100 through the wheel steering angle sensor 60, to keep the angle of the wheels 100 consistent with a requirement of the autonomous-driving control unit 70. In this case, the in-vehicle intelligent device may determine whether the running of the target program is detected. If the target program is detected, the in-vehicle intelligent device reads the rotation angle and rotation speed of the steering wheel 10, and controls the target object according to the rotation angle and rotation speed of the steering wheel 10. Alternatively, the mobile intelligent device may determine whether the running of the target program is detected. If the target program is detected, the mobile intelligent device transmits a request instruction to the steering controller 52, receives the rotation angle and rotation speed of the steering wheel 10 transmitted by the steering controller 52, and controls the target object according to the rotation angle and rotation speed of the steering wheel 10.

During the autonomous-driving mode of the vehicle, the autonomous-driving control unit 70 determines whether an exit instruction of the driver is received, or, the autonomous-driving control unit 70 determines whether there is a failure in the autonomous-driving control unit or whether the driving environment does not meet an autonomous driving operation condition. If the exit instruction of the driver is received, or there is a failure in the autonomous-driving control unit 70, or the driving environment does not meet the autonomous driving condition, the steering controller 52 transmits the rotation information of the wheels 100 to the steering wheel controller 51, and the steering wheel controller 51 determines whether the rotation angle of the steering wheel 10 is the same as the rotation angle of the wheels 100. If yes, the steering wheel controller 51 notifies the steering controller 52 that the synchronization is successful, and if not, the steering wheel controller 51 controls the steering wheel drive unit 30 according to the rotation information of the wheels to drive the steering wheel 10 to rotate, and monitors the rotation information of the steering wheel through the steering wheel steering angle sensor 20, so that the angle of the steering wheel 10 is rotated to an angle the same as that of the wheels 100.

Therefore, the steering control system of this embodiment of the present disclosure can implement steering control. When the vehicle is in a parking state or the vehicle is in an autonomous-driving state, rotation information of the steering wheel does not need to be the same as that of the wheels. In this case, the steering wheel may be used for other operations, for example, used as a remote control for a racing game and for controlling an unmanned aerial vehicle. When a user operates the vehicle or the autonomous-driving state is exited, an angle of the steering wheel needs to be the same as that of the wheels. Therefore, in some embodiments, the system may be used as a remote control system, and may also to be used as a driving system through synchronization with the wheels when the driver operates the vehicle.

In summary, according to the vehicle control system provided by this embodiment of the present disclosure, the control module is electrically connected to the steering mechanism, the wheel steering angle sensor, the steering wheel steering angle sensor, and the steering wheel drive unit separately, and the control module obtains the rotation information of the wheels before the vehicle enters a steering-wheel driving mode, and controls the steering wheel drive unit according to the rotation information of the wheels to drive the steering wheel to rotate, until the rotation angle of the steering wheel is the same as the rotation angle of the wheels. Therefore, a steering intention of the driver can be transmitted through a wired signal or a wireless signal, to further implement steering control without a mechanical mechanism, so that it is convenient to freely arrange the position of a steering wheel, and a plurality of steering wheels can be arranged. When the vehicle needs to be taken over by a driver, it can be ensured that the rotation angle of the steering wheel is the same as the rotation angle of the wheels, so as to ensure that the driver can accurately determine the moving direction of the vehicle and prevent the vehicle from danger.

Figure 9:
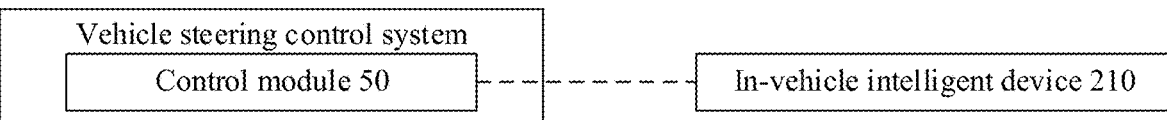
FIG. 9 is a schematic diagram of connection between the vehicle steering control system and an in-vehicle intelligent device according to an embodiment of the present disclosure.

As shown in FIG. 9, the control module 50 communicates with an in-vehicle intelligent device 210 through the communication bus of the vehicle. The in-vehicle intelligent device 210 obtains status information and steering wheel information of the vehicle when the running of a target program of the in-vehicle intelligent device 210 is detected, and controls a target object of the in-vehicle intelligent device 210 according to the rotation information of the steering wheel when the vehicle is in the autonomous-driving mode.

As shown in FIG. 10, the control module performs wireless communication with a mobile intelligent device 220. When detecting the running of a target program of the mobile intelligent device 220, the mobile intelligent device 220 transmits a request instruction to the control module 50, and receives the status information and the steering wheel information of the vehicle that are transmitted by the control module 50. When the vehicle is in the autonomous-driving mode, the mobile intelligent device 220 controls a target object of the mobile intelligent device according to the rotation information of the steering wheel.

FIG. 11 is a schematic block diagram of a vehicle according to an embodiment of the present disclosure.

As shown in FIG. 11, a vehicle 1000 according to an embodiment of the present disclosure includes a vehicle steering control system 1100 in the foregoing embodiment.

According to the vehicle provide in this embodiment of the present disclosure, through the foregoing vehicle steering control system, a steering intention of a driver can be transmitted through a wired signal or a wireless signal, to further implement steering control without a mechanical mechanism, so that it is convenient to freely arrange the position of a steering wheel, and a plurality of steering wheels can be arranged. When the vehicle needs to be taken over by a driver, it can be ensured that the rotation angle of the steering wheel is the same as the rotation angle of the wheels, so as to ensure that the driver can accurately determine the moving direction of the vehicle and prevent the vehicle from danger.

Corresponding to the vehicle control system in the foregoing embodiment, a vehicle steering control method is further provided in this embodiment of the present disclosure.

FIG. 12 is a flowchart of a vehicle steering control method according to an embodiment of the present disclosure. The vehicle control system includes a steering wheel, a steering wheel drive unit, and a steering mechanism. The steering wheel drive unit is connected to the steering wheel. The steering wheel drive unit is configured to drive the steering wheel to rotate. The steering mechanism is configured to drive wheels of the vehicle to rotate.

As shown in FIG. 12, the vehicle control method provided in this embodiment of the present disclosure includes the following steps.

S51: Obtain rotation information of wheels before a vehicle enters a steering-wheel driving mode.

S52: Control a steering wheel drive unit according to the rotation information of the wheels to drive a steering wheel to rotate, until a rotation angle of the steering wheel is the same as a rotation angle of the wheels.

According to an embodiment of the present disclosure, the controlling the steering wheel drive unit according to the rotation information of the wheels to drive the steering wheel to rotate, until the rotation angle of the steering wheel is the same as the rotation angle of the wheels includes: obtaining the rotation information of the wheels before the vehicle enters the steering-wheel driving mode; transmitting the rotation information of the wheels to a steering wheel controller; and controlling, by the steering wheel controller, the steering wheel drive unit according to the rotation information of the wheels to drive the steering wheel to rotate, until the rotation angle of the steering wheel is the same as the rotation angle of the wheels.

According to an embodiment of the present disclosure, there are a plurality of steering wheels and a plurality of steering wheel drive units corresponding to the steering wheels one by one, and each steering wheel drive unit is configured to drive a steering wheel corresponding to the steering wheel drive unit to rotate. The obtaining the rotation information of the wheels before the vehicle enters the steering-wheel driving mode, and controlling the steering wheel drive unit according to the rotation information of the wheels to drive the steering wheel to rotate, until the rotation angle of the steering wheel is the same as the rotation angle of the wheels includes: obtaining the rotation information of the wheels before the vehicle enters the steering-wheel driving mode; and controlling a steering wheel drive unit of a to-be-controlled vehicle according to the rotation information of the wheels to drive a steering wheel of the to-be-controlled vehicle to rotate, until the rotation angle of the steering wheel of the to-be-controlled vehicle is the same as the rotation angle of the wheels.

According to an embodiment of the present disclosure, there are a plurality of steering wheels and a plurality of steering wheel drive units corresponding to the steering wheels one by one, each steering wheel drive unit is configured to drive a steering wheel corresponding to the steering wheel drive unit to rotate, and at least one steering wheel drive unit is controlled according to the obtained rotation information of the wheels to drive the steering wheel to rotate until the rotation angle of the at least one steering wheel is the same as the rotation angle of the wheels.

According to an embodiment of the present disclosure, when an autonomous-driving control unit of the vehicle receives an autonomous-driving exit instruction of a driver through a receiving assembly, there is a failure in the autonomous-driving control unit, or a driving environment of the vehicle does not meet an autonomous driving condition, the autonomous-driving control unit controls the vehicle to switch from an autonomous-driving mode to the steering-wheel driving mode.

According to an embodiment of the present disclosure, before the vehicle enters the steering-wheel driving mode, it is further determined whether the vehicle is successfully started. If the vehicle is not successfully started, receiving of an angle control signal from the steering wheel drive unit or the autonomous-driving control unit is skipped, and the rotation angle of the wheels is controlled to remain unchanged.

According to an embodiment of the present disclosure, the vehicle control method further includes: receiving, when the vehicle is in the autonomous-driving mode, rotation information transmitted by the autonomous-driving control unit; and controlling the steering mechanism according to the rotation information transmitted by the autonomous-driving control unit, so that the steering mechanism drives, according to the rotation information transmitted by the autonomous-driving control unit, the wheels of the vehicle to rotate.

According to an embodiment of the present disclosure, the vehicle control method further includes: obtaining the rotation information of the steering wheel after the vehicle enters the steering-wheel driving mode, and controlling the steering mechanism according to the rotation information of the steering wheel, so that the steering mechanism drives the wheels of the vehicle according to the rotation information of the steering wheel to rotate. According to an embodiment of the present disclosure, when the steering wheel is operated by the driver, steering torque is applied to the steering wheel through the steering wheel drive unit.

Figure 13:
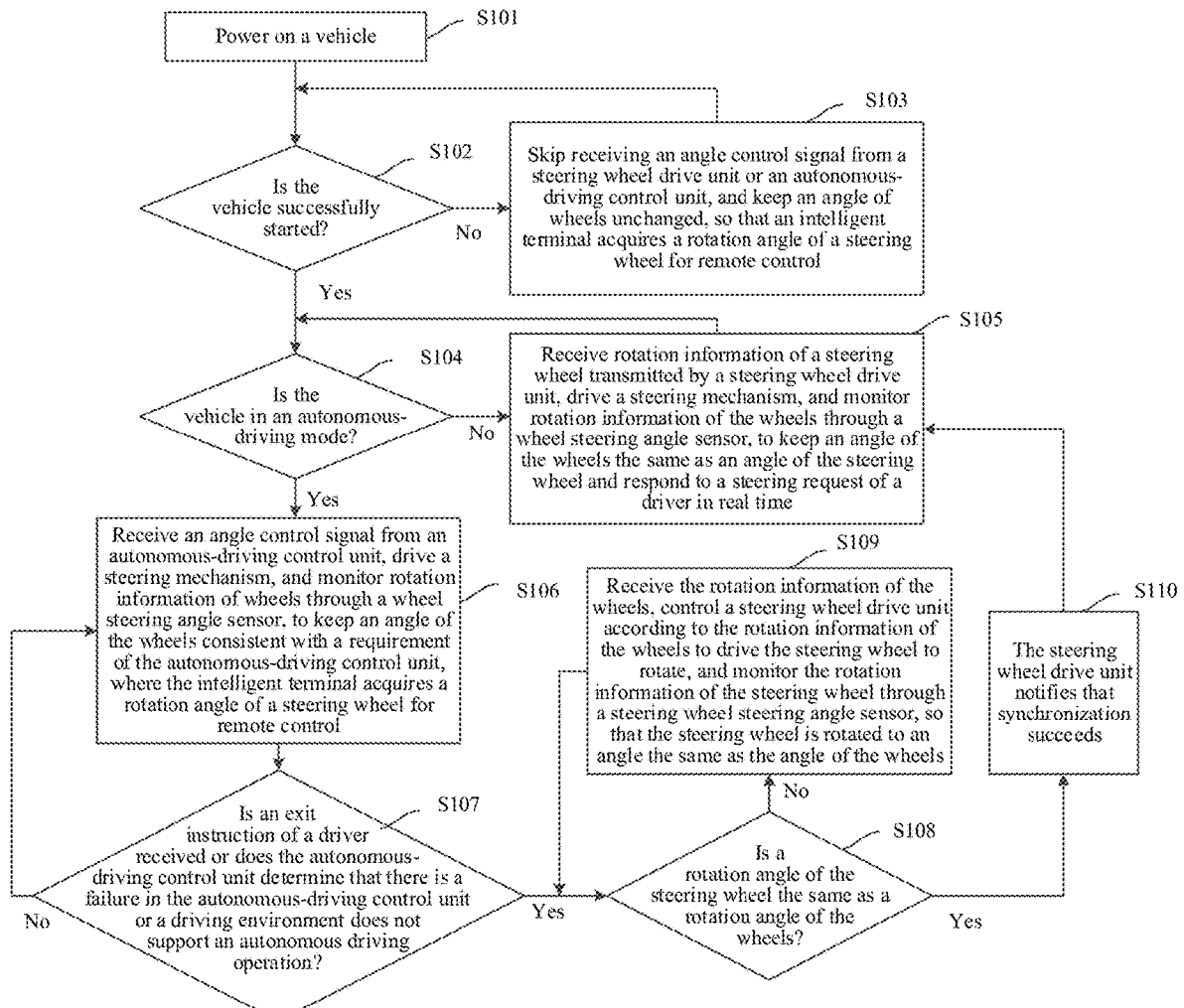
FIG. 13 is a flowchart of the vehicle steering control method according to another embodiment of the present disclosure.

Specifically, as shown in FIG. 13, the vehicle steering control method provided in this embodiment of the present disclosure includes the following steps.

S101: Power on a vehicle.

S102: Determine whether the vehicle is successfully started.

If yes, step S104 is performed, or if not, step S103 is performed.

S103: Skip receiving an angle control signal from a steering wheel drive unit or an autonomous-driving control unit, and keep an angle of wheels unchanged. In this case, an in-vehicle intelligent device may determine whether it is detected that a target program is running. If the target program is detected, the in-vehicle intelligent device reads the rotation angle and rotation speed of the steering wheel, and controls a target object according to the rotation angle and rotation speed of the steering wheel. Alternatively, a mobile intelligent device may determine whether it is detected that a target program is running. If the target program is detected, the mobile intelligent device transmits a request instruction to the steering controller, receives the rotation angle and rotation speed of the steering wheel that are transmitted by the steering controller, and controls a target object according to the rotation angle and rotation speed of the steering wheel, where the process returns to step S102.

S104: Determine whether the vehicle is in an autonomous-driving mode.

If yes, step S106 is performed, or if not, step S105 is performed.

S105: Receive rotation information of a steering wheel transmitted by a steering wheel drive unit, drive a steering mechanism, and monitor rotation information of wheels through a wheel steering angle sensor, to keep an angle of the wheels the same as an angle of the steering wheel and respond to a steering request of a driver in real time, where the process returns to step S104.

S106: Receive a rotation information transmitted by an autonomous-driving control unit, drive a steering mechanism according to the rotation information transmitted by the autonomous-driving control unit, and monitor rotation information of wheels through a wheel steering angle sensor, to keep an angle of the wheels consistent with a requirement of the autonomous-driving control unit. In this case, an in-vehicle intelligent device may determine whether it is detected that a target program is running. If the target program is detected, the in-vehicle intelligent device reads the rotation angle and rotation speed of the steering wheel, and controls a target object according to the rotation angle and rotation speed of the steering wheel. Alternatively, the mobile intelligent device may determine whether the running of the target program is detected. If the target program is detected, the mobile intelligent device transmits a request instruction to the steering controller, receives the rotation angle and rotation speed of the steering wheel that are transmitted by the steering controller, and controls the target object according to the rotation angle and rotation speed of the steering wheel.

S107: The autonomous-driving control unit determines whether an exit instruction of a driver is received, whether there is a failure in the autonomous-driving control unit, or whether a driving environment does not support an autonomous driving operation condition.

If yes, step S108 is performed, or if not, step S106 is performed.

S108: The steering wheel drive unit determines whether a rotation angle of the steering wheel is the same as a rotation angle of the wheels.

If yes, step S110 is performed, or if not, step S109 is performed.

S109: Receive the rotation information of the wheels, control a steering wheel drive unit according to the rotation information of the wheels to drive the steering wheel to rotate, and monitor the rotation information of the steering wheel through a steering wheel steering angle sensor, so that the steering wheel is rotated to an angle the same as the angle of the wheels, where the process returns to step S108.

S110: The steering wheel drive unit notifies that synchronization succeeds, where the process returns to step S105.

According to an embodiment of the present disclosure, as shown in FIG. 11, the in-vehicle intelligent device communicates with the vehicle through a communication bus of the vehicle.

S61: Obtain status information and steering wheel information of the vehicle when the running of the target program of the in-vehicle intelligent device is detected.

S62: Control the target object of the in-vehicle intelligent device according to the rotation information of the steering wheel when the vehicle is in the autonomous-driving mode.

According to an embodiment of the present disclosure, as shown in FIG. 12, the mobile intelligent device performs wireless communication with the vehicle.

S71: Transmit a request instruction to the vehicle when the running of the target program of the mobile intelligent device is detected, and receive the status information and steering wheel information of the vehicle that are transmitted by the vehicle.

S72: Control the target object of the mobile intelligent device according to the rotation information of the steering wheel when the vehicle is in the autonomous-driving mode.

In summary, according to the vehicle steering control method provided in this embodiment of the present disclosure, before the vehicle enters the steering-wheel driving mode, the rotation information of the wheels is obtained, and the steering wheel drive unit is controlled according to the rotation information of the wheels to drive the steering wheel to rotate, until the rotation angle of the steering wheel is the same as the rotation angle of the wheels. Therefore, when the vehicle needs to be taken over by a driver, it can be ensured that the rotation angle of the steering wheel is the same as the rotation angle of the wheels, so as to ensure that the driver can accurately determine the moving direction of the vehicle and prevent the vehicle from danger.

Based on the foregoing embodiments, the present disclosure further provides a non-transitory computer-readable storage medium, storing a computer program thereon, the program, when being executed by a processor, implementing the vehicle control method described in the foregoing embodiments.

Embodiment 2

Based on the vehicle steering control system in the embodiments of FIG. 1 to FIG. 3, the present disclosure provides a vehicle, a vehicle steering control system and method, and a server.

According to an embodiment of the present disclosure, the control module 50 is electrically connected to the steering mechanism 40, the steering wheel drive unit 30, and the steering wheel steering angle sensor 20. The control module 50 further communicates with an intelligent direction control apparatus to receive at least one piece of rotation information transmitted by the intelligent direction control apparatus. The control module 50 is configured to control the steering mechanism 40 according to at least one piece of the rotation information of the steering wheel 10 and the rotation information transmitted by the intelligent direction control apparatus. The intelligent direction control apparatus includes at least one of an autonomous-driving control unit 70, an intelligent device 200, and a server 300.

The control module 50 further communicates with at least one of the autonomous-driving control unit 70, the intelligent device 200, and the server 300 to receive at least one piece of the rotation information transmitted by the autonomous-driving control unit 70, the rotation information transmitted by the intelligent device 200, and the rotation information transmitted by the server 300. The control module 50 is configured to control the steering mechanism 40 according to at least one piece of the rotation information of the steering wheel 10, the rotation information transmitted by the autonomous-driving control unit 70, the rotation information transmitted by the intelligent device 200, and the rotation information transmitted by the server 30.

Specifically, the control module 50 such as a steering controller 52 may receive the rotation information transmitted by the autonomous-driving control unit 70, the rotation information of the steering wheel 10 transmitted by a steering wheel controller 51, and the rotation information transmitted by the intelligent device 200, and may receive, through an in-vehicle communication module, the rotation information transmitted by the server 300. Furthermore, the steering controller 52 may control the steering mechanism 40 according to at least one piece of the rotation information of the steering wheel 10, the rotation information transmitted by the autonomous-driving control unit 70, the rotation information transmitted by the intelligent device 200, and the rotation information transmitted by the server 30, thereby implementing the control of vehicle steering in various manners by using a redundant design, and ensuring the driving safety of the vehicle.

In some embodiments, the control module 50 such as the steering controller 52 is configured to control, when the vehicle is in an autonomous-driving mode, the steering mechanism 40 according to the rotation information transmitted by the autonomous-driving control unit 70, so that the steering mechanism 40 drives, according to the rotation information transmitted by the autonomous-driving control unit 70, wheels 100 of the vehicle to rotate, and controls, when the vehicle has an autonomous-driving failure, the steering mechanism 40 according to at least one piece of the rotation information of the steering wheel 10, the rotation information transmitted by the intelligent device 200, and the rotation information transmitted by the server 300.

When the vehicle is in the autonomous-driving mode, the autonomous-driving control unit 70 may transmit rotation information such as a rotation angle to the steering controller 52, and the steering controller 52 may control a steering motor 42 according to the rotation information transmitted by the autonomous-driving control unit 70 to make the steering motor 42 drive the wheels 100 through the steering gear 41 to rotate to a corresponding angle.

The steering controller 52 may receive the rotation information transmitted by the autonomous-driving control unit 70, and drive the steering motor 42 according to the rotation information to rotate. In addition, the steering controller 52 also monitors the rotation information of the wheels 100 through a wheel steering angle sensor 60, and stops driving the steering motor 42 when it is detected that the wheels 100 is rotated to an angle anticipated by the autonomous-driving control unit 70.

Therefore, when the vehicle is in the autonomous-driving mode, the steering controller 52 controls the rotation of the wheels 100 according to the rotation information from the autonomous-driving control unit 70 without a steering wheel, and the steering wheel drive unit 30 may not control the steering wheel to rotate.

It should be noted that when the autonomous-driving control unit 70 determines that the sensor encounters a failure or the autonomous-driving control unit 70 encounters a failure, it is determined that the vehicle has an autonomous-driving failure, that is, the autonomous-driving control unit 70 is disabled. If the steering controller 52 has not received a control message of the autonomous-driving control unit 70 within a preset time, the steering controller 52 determines that the autonomous-driving control unit 70 encounters a failure.

According to an embodiment of the present disclosure, when an autonomous-driving failure occurs in the vehicle, the steering mechanism 40 may be controlled in a preset priority order and according to the rotation information of the steering wheel 10, the rotation information transmitted by the intelligent device 200, or the rotation information transmitted by the server 300. The priority of the steering wheel 10 is higher than that of the intelligent device 200, and the priority of the intelligent device 200 is higher than that of the server 300.

Therefore, after the autonomous-driving control unit encounters a failure, various solutions may be provided to implement steering control of a vehicle, thereby ensuring the vehicle safety during driving. For example, the vehicle may be controlled through a steering wheel in the front of the driver's seat, the vehicle may be controlled through the intelligent device 200 such as an in-vehicle intelligent device, and the vehicle may be remotely controlled through the server 300. For example, the vehicle may be remotely controlled by a monitoring person.

In an embodiment of the present disclosure, after the vehicle has an autonomous-driving failure, the control module 50 is further configured to: obtain the rotation information of the wheels 100, and control the steering wheel drive unit 30 according to the rotation information of the wheels 100 to drive the steering wheel 10 to rotate, until a rotation angle of the steering wheel 10 is the same as a rotation angle of the wheels.

The control module 50 includes the steering wheel controller 51 and the steering controller 52. The steering wheel controller 51 communicates with the steering controller 52. The steering controller 52 is configured to: obtain the rotation information of the wheels 100 after the vehicle has an autonomous-driving failure, and transmit the rotation information of the wheels 100 to the steering wheel controller 51. The steering wheel controller 51 controls the steering wheel drive unit 30 according to the rotation information of the wheels 100 to drive the steering wheel 10 to rotate, until the rotation angle of the steering wheel 10 is the same as the rotation angle of the wheels 100.

Therefore, it can be ensured that the driver can accurately determine the moving direction of the vehicle, so as to prevent the vehicle from danger, and effectively remind the driver to drive, that is, when finding that the steering wheel rotates, the driver may determine that the autonomous driving requires manual intervention.

According to a specific embodiment of the present disclosure, after the vehicle has an autonomous-driving failure, the control module 50 is configured to: receive the rotation information of the steering wheel 10 after receiving a steering wheel control instruction, and control the steering mechanism 40 according to the rotation information of the steering wheel 10.

It can be understood that the priority of the rotation information of the steering wheel 10 is higher than that of the rotation information transmitted by the intelligent device 200 and that of the rotation information transmitted by the server 300. Furthermore, when the rotation information of the steering wheel 10 is received, even if the rotation information transmitted by the intelligent device 200 and the rotation information transmitted by the server 300 are received, the steering mechanism 40 is also controlled according to the rotation information of the steering wheel 10.

When the autonomous-driving control unit 70 or its sensor encounters a failure, the driver in the driver's seat may control the vehicle through a steering wheel 10. In this case, the vehicle enters a steering wheel control mode. The steering wheel 10 rotates under the driver's operation and the steering controller 52 acquires the rotation information of the steering wheel 10 and controls the steering mechanism 40 according to the rotation information of the steering wheel 10, so that the steering mechanism 40 drives the wheels 100 of the vehicle according to the rotation information of the steering wheel 10 to rotate. At the same time, the steering wheel controller 51 controls the steering wheel drive unit 30 to apply steering torque to the steering wheel 10.

Specifically, when the autonomous-driving control unit 70 or its sensor encounters a failure, the steering controller 52 may determine whether the steering wheel control instruction is received. For example, when the steering wheel 10 rotates under the operation of the driver, it is determined that the steering wheel control instruction is received, or when a takeover button on the steering wheel 10 is triggered, it is determined that the steering wheel control instruction is received. After receiving the steering wheel control instruction, the vehicle enters the steering wheel control mode. In this case, the driver controls the vehicle through the steering wheel 10. The steering wheel controller 51 may transmit the rotation information of the steering wheel 10 to the steering controller 52, and the steering controller 52 controls the steering mechanism 40 according to the received rotation information, so that the wheels 100 are rotated to a corresponding angle.

The steering controller 52 may receive the rotation information of the steering wheel 10 transmitted by the steering wheel controller 51, and drive the steering motor 42 according to the rotation information of the steering wheel 10 to operate. At the same time, the steering controller 52 also monitors the rotation information such as the rotation angle of the wheels 100 through the wheel steering angle sensor 60. When it is detected that the wheels 100 are rotated to the rotation angle of the steering wheel 10, the driving of the steering motor 42 is stopped, thereby ensuring that an angle of the wheels is the same as an angle of the steering wheel.

It can be understood that the steering wheel controller 51 may acquire the rotation information of the steering wheel 10 through a steering wheel steering angle sensor 20 to determine a steering intention of the driver. The steering wheel drive unit 30 may simulate the steering torque, to provide the driver with a relatively comfortable steering force. The steering controller 52 may receive the rotation information of the steering wheel 10 transmitted by the steering wheel controller 51, and drive the steering mechanism 40 according to the rotation information of the steering wheel 10 to implement steering.

Therefore, when an autonomous driving controller encounters a failure, the steering wheel 10 is preferentially used to control the vehicle to avoid vehicle accidents.

In some embodiments, the control module 50 such as the steering controller 52 is configured to: receive, when the steering wheel control instruction is not received and the intelligent-device control instruction is received, the rotation information transmitted by the intelligent device 200; and control the steering mechanism 40 according to the rotation information transmitted by the intelligent device 200.

It can be understood that the priority of the rotation information transmitted by the intelligent device 200 is higher than that of the rotation information transmitted by the server 300. Furthermore, when the rotation information of the steering wheel 10 is not received and the rotation information transmitted by the intelligent device 200 is received, even if the rotation information transmitted by the server 300 is received, the steering mechanism 40 is also controlled according to the rotation information transmitted by the intelligent device 200.

When the autonomous-driving control unit 70 or its sensor encounters a failure, if the driver cannot take over the steering wheel in time, the vehicle may be controlled through the intelligent device 200. In this case, the intelligent device 200 may receive a steering operation instruction, generate rotation information according to the steering operation instruction, and transmit the rotation information to the steering controller 52. The steering controller 52 obtains the rotation information transmitted by the intelligent device 200 and controls the steering mechanism 40 according to the rotation information transmitted by the intelligent device 200, so that the steering mechanism 40 drives, according to the rotation information transmitted by the intelligent device 200, the wheels 100 of the vehicle to rotate.

Specifically, when the autonomous-driving control unit 70 or its sensor encounters a failure, the steering controller 52, after determining that the steering wheel control instruction is not received, further determines whether an intelligent-terminal control instruction is received, for example, determines that the intelligent-terminal control instruction is received when the intelligent terminal receives a rotation operation instruction from a driver, or determines that the intelligent-terminal control instruction is received when the takeover button on the intelligent terminal is triggered. After receiving the intelligent-terminal control instruction, the driver performs steering control through the intelligent device 200. The intelligent device 200 may transmit the rotation information to the steering controller 52. The steering controller 52 controls the steering mechanism 40 according to the rotation information transmitted by the intelligent device 200, so that the wheels 100 are rotated to a corresponding angle. The steering controller 52 may receive the rotation information of the steering wheel 10 transmitted by the intelligent device 200, and drive, according to the rotation information transmitted by the intelligent device 200, the steering motor 42 to operate. At the same time, the steering controller 52 also monitors the rotation information such as the rotation angle of the wheels 100 through the wheel steering angle sensor 60. When it is detected that the wheels 100 are rotated to a rotation angle provided by the intelligent device 200, the driving of the steering motor 42 is stopped, thereby ensuring that an angle of the wheels is the same as the rotation angle provided by the intelligent device 200.

It can be understood that the intelligent device 200 may display a virtual steering wheel, and the driver may input the steering operation instruction through the virtual steering wheel. The intelligent device 200 may generate rotation information such as a rotation angle of the virtual steering wheel according to the steering operation instruction, and transmit the rotation information to the steering controller 52. The steering controller 52 may receive the rotation information of the virtual steering wheel transmitted by the intelligent device 200, and drive the steering mechanism 40 according to the rotation information of the virtual steering wheel to implement steering, so that a rotation angle of the virtual steering wheel is the same as the rotation angle of the wheels.

Therefore, when the autonomous driving controller encounters a failure and the driver is too late to take over the steering wheel, the vehicle is controlled through the intelligent device 200. For example, the vehicle is controlled through the virtual steering wheel in the intelligent terminal 200, to avoid vehicle accidents and ensure the vehicle safety during driving.

It should be noted that after the vehicle has an autonomous-driving failure, the control module 50 such as the steering controller 52 may also obtain the rotation information such as the rotation angle of the wheels 100 and transmit the rotation information of the wheels 100 to the intelligent terminal 200 to prompt the rotation angle of the wheels 100. For example, when the intelligent device 200 displays the virtual steering wheel, the intelligent device 200 may control the virtual steering wheel according to the rotation information of the wheels 100 to rotate, until the rotation angle of the virtual steering wheel is the same as the rotation angle of the wheels.

Therefore, it can be ensured that the driver can accurately determine the moving direction of the vehicle, so as to prevent the vehicle from danger.

In some embodiments, the control module 50 such as the steering controller 52 is configured to obtain vehicle surrounding image information when the steering wheel control instruction is not received and the intelligent-device control instruction is not received, transmit the vehicle surrounding image information and the takeover instruction to the server 300, and when the rotation information transmitted by the server 300 is received, control the steering mechanism 40 according to the rotation information transmitted by the server 300.

It can be understood that when the steering wheel control instruction is not received and the intelligent-device control instruction is not received, the server 300 may be requested to take over the control of the vehicle. In this case, the steering mechanism 40 may be controlled according to the rotation information transmitted by the server 300.

When the autonomous-driving control unit 70 or its sensor encounters a failure, if the driver cannot take over the steering wheel in time and cannot control the vehicle through the intelligent device 200, at this time, the steering controller 52 may acquire the vehicle surrounding image information through an in-vehicle camera, and transmit the vehicle surrounding image information to the server 300 together with the takeover instruction. The server 300 may receive an externally inputted steering operation instruction to generate rotation information or directly generate rotation information according to the vehicle surrounding image information. The server 300 then transmits the generated rotation information to the steering controller 52. The steering controller 52 receives the rotation information transmitted by the server 300, and controls the steering mechanism 40 according to the rotation information transmitted by the server 300, so that the steering mechanism 40 drives, according to the rotation information transmitted by the server 300, the wheels 100 of the vehicle to rotate.

Specifically, when steering control is performed on the vehicle by the server 300, the server 300 may transmit the rotation information to the steering controller 52, and the steering controller 52 controls the steering mechanism 40 according to the rotation information transmitted by the server 300, so that the wheels 100 are rotated to a corresponding angle. The steering controller 52 may receive the rotation information of the steering wheel 10 transmitted by the server 300, and drive, according to the rotation information transmitted by the server 300, the steering motor 42 to operate. At the same time, the steering controller 52 also monitors the rotation information such as the rotation angle of the wheels 100 through the wheel steering angle sensor 60. When it is detected that the wheels 100 are rotated to a rotation angle provided by the server 300, the driving of the steering motor 42 is stopped, thereby ensuring that the angle of the wheels is the same as the rotation angle provided by the server 300.

It can be understood that a plurality of in-vehicle cameras of the vehicle may be arranged around the vehicle body to acquire vehicle surrounding image information (which may be video information). The plurality of in-vehicle cameras may be arranged in the front, on two sides, and in the rear of the vehicle body. The steering controller 52 may transmit, through a V2X communication module 80, the vehicle surrounding image information acquired by the in-vehicle cameras and the takeover instruction to the roadside V2X communication infrastructure 90. The roadside V2X communication infrastructure 90 transmits the vehicle surrounding image information and the takeover instruction to the server 300 in a 4G or 5G communication manner.

In an embodiment, the server 300 may push the image information to a monitoring terminal of a background monitoring person in real time. The background monitoring person obtains the vehicle surrounding image information through an interface of the monitoring terminal to determine a vehicle surrounding environment, and may combine the vehicle surrounding environment and input the steering operation instruction through an indoor simulated steering wheel, to implement remote control of the vehicle. The server 300 acquires rotation information of the indoor simulated steering wheel in real time and remotely transmits the rotation information to the V2X communication module 80 of the vehicle. The V2X communication module 80 transmits the rotation information from the server 300 to the steering controller 52, and the steering controller 52 receives the rotation information transmitted by the server 300, and controls the steering mechanism 40 according to the rotation information transmitted by the server 300.

In another embodiment, the server 300 may analyze the image information, and calculate a vehicle driving route according to an analysis result, to obtain an optimal steering wheel control signal, that is, to generate rotation information such as a rotation angle and a rotation speed, and remotely transmit the rotation information to the V2X communication module 80 of the vehicle. The V2X communication module 80 transmits the rotation information from the server 300 to the steering controller 52. The steering controller 52 receives the rotation information transmitted by the server 300, and controls the steering mechanism 40 according to the rotation information transmitted by the server 300.

It can be understood that after receiving the takeover instruction and the vehicle surrounding image information, the server 300 may first determine whether there is a monitoring terminal in an idle state, and transmit the vehicle surrounding image information to any monitoring terminal in an idle state when there is a monitoring terminal in an idle state, to display the vehicle surrounding image information through the any monitoring terminal in an idle state.

It should be noted that after the vehicle has an autonomous-driving failure, the control module 50 such as the steering controller 52 may also obtain the rotation information such as the rotation angle of the wheels 100, and transmit the rotation information of the wheels 100 to the server 300. The server 300 remotely controls the vehicle based on the rotation information of the wheels 100. In addition, the server 300 may also control the indoor simulated steering wheel according to the rotation information of the wheels 100. That is, the server 300 may control the indoor simulated steering wheel according to the rotation information of the wheels 100 to rotate, until the rotation angle of the indoor simulated steering wheel is the same as the rotation angle of the wheels, thereby ensuring that the monitoring person can accurately determine the moving direction of the vehicle, so as to prevent the vehicle from danger.

Therefore, when the autonomous driving controller encounters a failure, and the driver is too late to take over the steering wheel and cannot control the vehicle through the intelligent device 200, the server 300 may remotely control the vehicle, thereby providing various redundancy schemes after the autonomous driving is disabled, avoiding vehicle accidents, and protecting the vehicle safety during driving to the greatest extent.

As described above, in the specific embodiment of the present disclosure, when the vehicle is powered on, the steering controller 52 may determine whether the vehicle is in an autonomous-driving mode, and if the vehicle is not in the autonomous-driving mode, the steering controller continues to determine whether the vehicle is in the autonomous-driving mode.

If the vehicle is in the autonomous-driving mode, the steering controller 52 determines whether the vehicle has an autonomous-driving failure. If the autonomous-driving control unit 70 determines that the sensor encounters a failure or the steering controller 52 determines that the autonomous-driving control unit 70 encounters a failure, that is, the steering controller 52 has not received the control message of the autonomous-driving control unit 70 within the preset time, it is determined that the vehicle has an autonomous-driving failure.

When the vehicle does not have an autonomous-driving failure, the steering controller 52 receives the rotation information transmitted by the autonomous-driving control unit 70, and controls the steering motor 42 according to the rotation information transmitted by the autonomous-driving control unit 70. At the same time, the steering controller 52 also monitors the rotation information of the wheels 100 through the wheel steering angle sensor 60. When it is detected that the wheels 100 are rotated to an anticipated rotation angle of the autonomous-driving control unit 70, the driving of the steering motor 42 is stopped.

When the vehicle has an autonomous-driving failure, the steering controller 52 obtains the rotation information of the wheels 100, and transmits the rotation information of the wheels 100 to the steering wheel controller 51. The steering wheel controller 51 receives the rotation information of the wheels 100 transmitted by the steering controller 52, monitors the rotation angle of the steering wheel 10 through the steering wheel steering angle sensor 20 at the same time, and controls the steering wheel drive unit 30 according to the rotation information of the wheels 100 to drive the steering wheel 10 to rotate, until the steering wheel 10 is rotated to an angle the same as the angle of the wheels, thereby synchronizing the angle of the steering wheel with the angle of the wheels. The steering controller 52 also transmits the rotation information of the wheels 100 to the intelligent terminal 200. The intelligent terminal 200 automatically calls a control interface of the virtual steering wheel and rotates the virtual steering wheel to an angle the same as the angle of the wheels, thereby synchronizing the angle of the virtual steering wheel of the intelligent terminal 200 with the angle of the wheels.

Next, the steering controller 52 determines whether the steering wheel control instruction is received. If the steering wheel control instruction is received, the steering controller 52 receives the rotation information of the steering wheel 10 transmitted by the steering wheel controller 51, and monitors the rotation information such as the rotation angle of the wheels 100 through the wheel steering angle sensor 60, and the steering controller 52 further drives the steering motor 42 according to the rotation information of the steering wheel 10 to operate, until the wheels 100 are rotated to an angle the same as the angle of the steering wheel 10.

If the steering controller 52 does not receive the steering wheel control instruction, the steering controller 52 further determines whether the intelligent-terminal control instruction is received. If the intelligent-terminal control instruction is received, the steering controller 52 receives the rotation information transmitted by the intelligent terminal 200 and also monitors the rotation information such as the rotation angle of the wheels 100 through the wheel steering angle sensor 60, and further drives, according to the rotation information transmitted by the intelligent terminal 200, the steering motor 42 to operate, until the wheels 100 are rotated to an angle required by the intelligent terminal 200.

If the steering controller 52 does not receive the steering wheel control instruction and the intelligent-terminal control instruction, the steering controller 52 transmits the takeover instruction and the vehicle surrounding image information to the roadside V2X communication infrastructure through the V2X communication module, and the roadside V2X communication infrastructure transmits the takeover instruction and the vehicle surrounding image information to the server 300 through 4G or 5G. The steering controller 52 determines whether to receive the rotation information from the server 300 transmitted by the V2X communication module. If yes, the steering controller 52 receives the rotation information transmitted by the server 300, and monitors the rotation information such as the rotation angle of the wheels 100 through the wheel steering angle sensor 60, and the steering controller 52 further drives, according to the rotation information transmitted by the server 300, the steering motor 42 to operate, until the wheels 100 are rotated to an angle required by the server 300.

In summary, according to the server provided by some embodiments of the present disclosure, after receiving the takeover instruction and the vehicle surrounding image information, the control module determines whether there is a monitoring terminal in an idle state, when there is a monitoring terminal in an idle state, transmits the vehicle surrounding image information to any monitoring terminal in an idle state for display, acquires the externally inputted steering operation instruction to generate the rotation information, and transmits the rotation information to the vehicle through the communication module, thereby remotely controlling the steering of the vehicle, and ensuring the vehicle safety during driving.

To implement the foregoing embodiment, the present disclosure further provides a vehicle, including the vehicle steering control system of the foregoing embodiment.

According to the vehicle provided in the embodiments of the present disclosure, through the foregoing vehicle steering control system, a rigid connection between a steering wheel and a steering mechanism is canceled, and a wired signal or a wireless signal can be used to transmit a steering intention of the driver, so that steering control can be implemented without a mechanical mechanism, so that it is convenient to freely arrange the position of the steering wheel, and the vehicle steering can be controlled in various manners, to ensure vehicle safety during driving.

Corresponding to the vehicle steering control system of the foregoing embodiment, the present disclosure provides a server.

Figure 16:
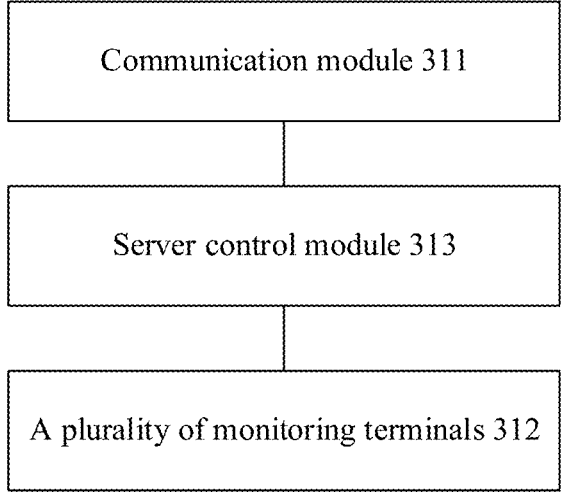
FIG. 16 is a schematic block diagram of a server according to an embodiment of the present disclosure.

FIG. 16 is a schematic block diagram of a server according to an embodiment of the present disclosure. As shown in FIG. 16, a server 300 includes a communication module 311, a plurality of monitoring terminals 312, and a server control module 313.

The communication module 311 communicates with the vehicle, and the communication module 311 is configured to receive vehicle surrounding image information and a takeover instruction that are transmitted by the vehicle. The server control module 313 is connected to the communication module 311 and the plurality of monitoring terminals 312, and the server control module 313 is configured to: determine, after receiving the takeover instruction and the vehicle surrounding image information, whether there is a monitoring terminal 312 in an idle state; transmit, when there is a monitoring terminal 312 in an idle state, the vehicle surrounding image information to any monitoring terminal 312 in an idle state for display; acquire an externally inputted steering operation instruction to generate rotation information; and transmit the rotation information to the vehicle through the communication module 311.

It can be understood that the monitoring terminal 312 in an idle state may be a monitoring terminal 312 that can be used by a monitoring person to input a steering operation instruction.

In some embodiments, the server control module 313 is further configured to: generate rotation information according to the vehicle surrounding image information when there is no monitoring terminal 312 in an idle state; and transmit the rotation information to the vehicle through the communication module 311.

When an autonomous-driving control unit of the vehicle or its sensor encounters a failure, if the vehicle does not receive a steering wheel control instruction or an intelligent-device control instruction, the vehicle acquires the vehicle surrounding image information through an in-vehicle camera, and transmits the vehicle surrounding image information and the takeover instruction to the communication module 311 together. The server control module 313 may receive the externally inputted steering operation instruction through the monitoring terminal 312 to generate rotation information or directly generate rotation information according to the vehicle surrounding image information. The server control module 313 then transmits the generated rotation information to the vehicle through the communication module 311. After receiving the rotation information transmitted by the server 300, the vehicle drives, according to the rotation information transmitted by the server 300, the wheels of the vehicle to rotate.

Specifically, the vehicle may transmit the vehicle surrounding image information acquired by the in-vehicle camera and the takeover instruction to the roadside V2X communication infrastructure through a V2X communication module. The roadside V2X communication infrastructure transmits the vehicle surrounding image information and the takeover instruction to the communication module 311 in a 4G or 5G communication manner.

In an embodiment, the server control module 313 may push the image information to the monitoring terminal 312 of a background monitoring person in real time. The background monitoring person obtains the vehicle surrounding image information through an interface of the monitoring terminal 312 to determine a vehicle surrounding environment, and may combine the vehicle surrounding environment and input the steering operation instruction through an indoor simulated steering wheel, to implement remote control of the vehicle. The server control module 313 may acquire the rotation information of the indoor simulated steering wheel in real time and remotely transmit the rotation information to the vehicle. The vehicle drives, according to the rotation information transmitted by the server 300, the wheels of the vehicle to rotate.

In another embodiment, the server control module 313 may analyze the image information, and calculate a vehicle driving route according to an analysis result, to obtain an optimal steering wheel control signal, that is, to generate rotation information such as a rotation angle and a rotation speed, and remotely transmit the rotation information to the vehicle. The vehicle drives, according to the rotation information transmitted by the server 300, the wheels of the vehicle to rotate.

It can be understood that after the communication module 311 receives the takeover instruction and the vehicle surrounding image information, the server control module 313 may first determine whether there is a monitoring terminal 312 in an idle state, and transmit the vehicle surrounding image information to any monitoring terminal 312 in an idle state when there is a monitoring terminal 312 in an idle state, to display the vehicle surrounding image information through the any monitoring terminal 312 in an idle state.

It should be noted that when the vehicle has an autonomous-driving failure, the vehicle may also obtain the rotation information such as the rotation angle of the wheels, and transmit the rotation information of the wheels to the communication module 311 of the server 300. The server control module 313 remotely controls the vehicle based on the rotation information of the wheels. In addition, the server control module 313 may also control the indoor simulated steering wheel according to the rotation information of the wheels. That is, the server control module 313 may control the indoor simulated steering wheel according to the rotation information of the wheels to rotate, until a rotation angle of the indoor simulated steering wheel is the same as the rotation angle of the wheels, thereby ensuring that the monitoring person can accurately determine the moving direction of the vehicle, so as to prevent the vehicle from danger.

Therefore, when an autonomous driving controller encounters a failure, the vehicle may be remotely controlled through the server, to avoid vehicle accidents and protect vehicle safety during driving to the greatest extent.

As described above, in the specific embodiment of the present disclosure, the server works normally, and the server control module 313 determines whether the takeover instruction from the vehicle and the real-time vehicle surrounding image information are received. If the takeover instruction from the vehicle and the real-time vehicle surrounding image information are received, it is determined whether there is a free monitoring person, that is, whether there is a monitoring terminal 312 in an idle state. If there is a monitoring terminal 312 in an idle state, the server control module pushes in real time the vehicle surrounding image information such as video information to any monitoring terminal 312 in an idle state, and acquires in real time the steering operation instruction inputted by the monitoring person through the simulated steering wheel, and transmits the steering operation instruction to the vehicle remotely. If there is no monitoring terminal 312 in an idle state, the server control module analyzes current road conditions according to the vehicle surrounding image information and calculates a vehicle driving route, thereby generating corresponding rotation information and transmitting the corresponding rotation information to the vehicle.

In summary, according to the server provided by this embodiment of the present disclosure, after receiving the takeover instruction and the vehicle surrounding image information, the server control module determines whether there is a monitoring terminal in an idle state, when there is a monitoring terminal in an idle state, transmits the vehicle surrounding image information to any monitoring terminal in an idle state for display, acquires the externally inputted steering operation instruction to generate the rotation information, and transmits the rotation information to the vehicle through the communication module, thereby remotely controlling the steering of the vehicle, and ensuring the vehicle safety during driving.

Corresponding to the vehicle steering control system of the foregoing embodiment, the present disclosure provides a vehicle steering control method.

Figure 17:
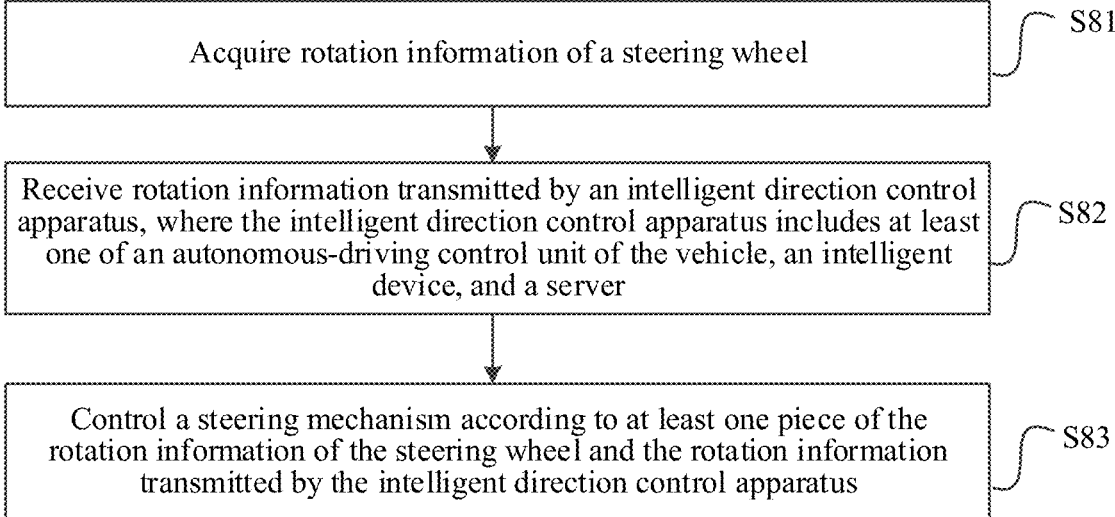
FIG. 17 is a flowchart of the vehicle steering control method applicable to a vehicle according to an embodiment of the present disclosure.

FIG. 17 is a flowchart of a vehicle steering control method according to an embodiment of the present disclosure. The method is applicable to a vehicle. A vehicle steering control system includes a steering wheel, a steering wheel drive unit, and a steering mechanism. The steering mechanism is configured to drive wheels of the vehicle to rotate.

As shown in FIG. 17, the vehicle steering control method in this embodiment of the present disclosure includes the following steps.

S81: Acquire rotation information of the steering wheel.

S82: Receive rotation information transmitted by an intelligent direction control apparatus, where the intelligent direction control apparatus includes at least one of an autonomous-driving control unit, an intelligent device, and a server of the vehicle.

S83: Control the steering mechanism according to at least one piece of the rotation information of the steering wheel and the rotation information transmitted by the intelligent direction control apparatus.

According to an embodiment of the present disclosure, the controlling the steering mechanism according to at least one piece of the rotation information of the steering wheel, the rotation information transmitted by the autonomous-driving control unit, the rotation information transmitted by the intelligent device, and the rotation information transmitted by the server includes: controlling, when the vehicle is in an autonomous-driving mode, the steering mechanism according to the rotation information transmitted by the autonomous-driving control unit, and controlling, when the vehicle has an autonomous-driving failure, the steering mechanism according to at least one piece of the rotation information of the steering wheel, the rotation information transmitted by the intelligent device, and the rotation information transmitted by the server.

According to an embodiment of the present disclosure, the controlling the steering mechanism according to at least one piece of the rotation information of the steering wheel, the rotation information transmitted by the intelligent device, and the rotation information transmitted by the server includes: controlling the steering mechanism in a preset priority order and according to the rotation information of the steering wheel, the rotation information transmitted by the intelligent device, or the rotation information transmitted by the server. The preset priority order is that the priority of the steering wheel is higher than that of the intelligent device, and the priority of the intelligent device is higher than that of the server.

According to an embodiment of the present disclosure, the controlling the steering mechanism in a preset priority order and according to the rotation information of the steering wheel, the rotation information transmitted by the intelligent device, or the rotation information transmitted by the server includes: receiving the rotation information of the steering wheel after the steering wheel control instruction is received; controlling the steering mechanism according to the rotation information of the steering wheel; receiving, when the steering wheel control instruction is not received and the intelligent-terminal control instruction is received, the rotation information transmitted by the intelligent device; and controlling the steering mechanism according to the rotation information transmitted by the intelligent device.

According to an embodiment of the present disclosure, the controlling the steering mechanism according to at least one piece of the rotation information of the steering wheel, the rotation information transmitted by the intelligent device or the rotation information transmitted by the server includes: obtaining the vehicle surrounding image information when the steering wheel control instruction is not received and the intelligent-device control instruction is not received; transmitting the vehicle surrounding image information and the takeover instruction to the server; and controlling, when the rotation information transmitted by the server is received, the steering mechanism according to the rotation information transmitted by the server.

Figure 18:
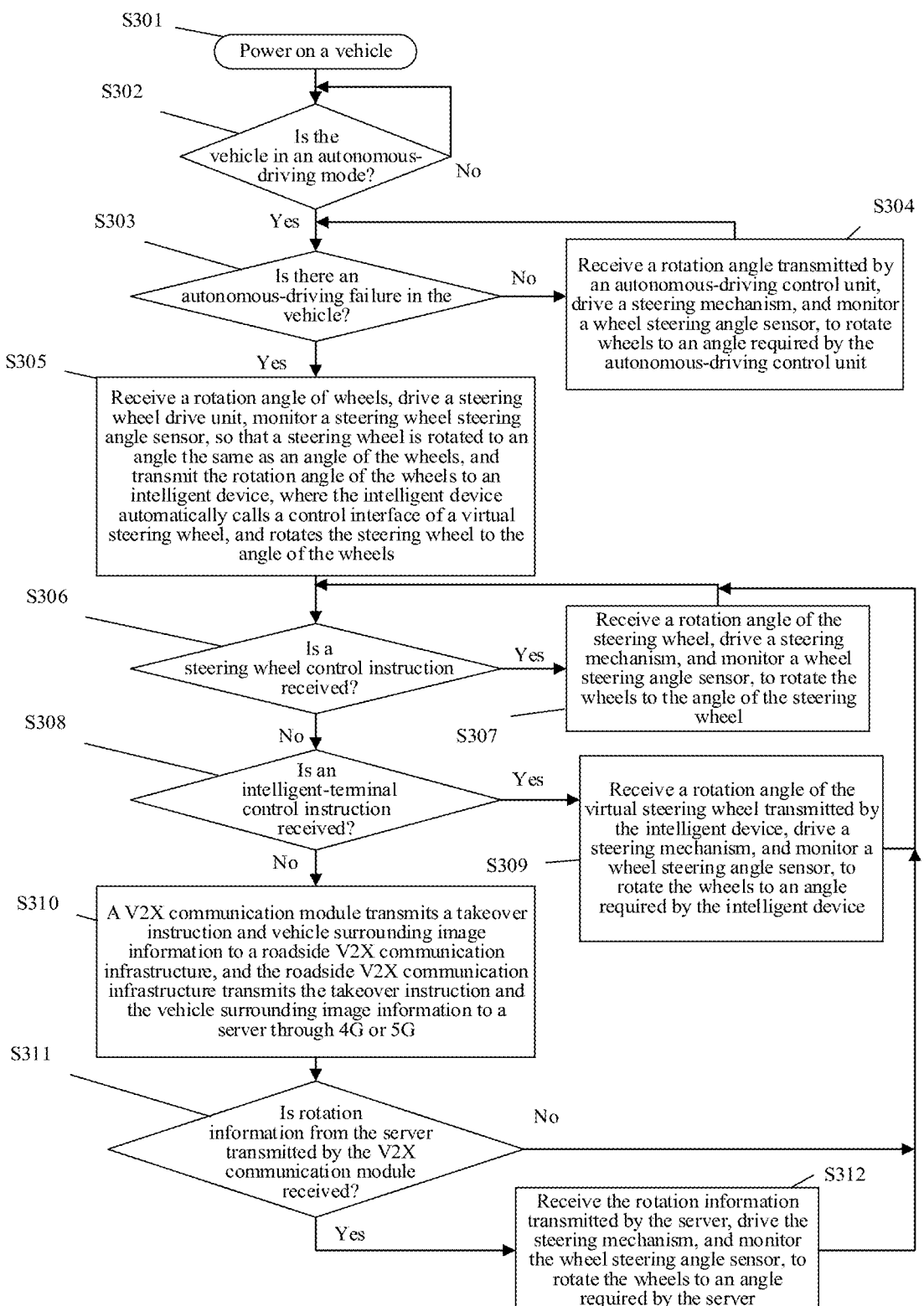
FIG. 18 is a flowchart of the vehicle steering control method applicable to a vehicle according to another embodiment of the present disclosure.

Specifically, as shown in FIG. 18, the vehicle steering control method includes the following steps.

S301: Power on a vehicle.

S302: Determine whether the vehicle is in the autonomous-driving mode.

If yes, step S303 is performed, or if not, step S302 continues to be performed.

S303: Determine whether the vehicle has the autonomous-driving failure, where when the autonomous-driving control unit determines that the sensor encounters a failure, or the autonomous-driving control unit encounters a failure, that is, when a control message of the autonomous-driving control unit has not been received within a preset time, it is determined that the vehicle has the autonomous-driving failure.

If yes, step S305 is performed, or if not, perform step S304.

S304: Receive the rotation information transmitted by the autonomous-driving control unit, control the steering mechanism according to the rotation information transmitted by the autonomous-driving control unit, and monitor rotation information such as a rotation angle of the wheels through a wheel steering angle sensor at the same time, so that the monitored wheels are rotated to an anticipated rotation angle of the autonomous-driving control unit.

S305: Obtain the rotation information of the wheels, control the steering wheel drive unit according to the rotation information of the wheels to drive the steering wheel to rotate, and monitor a rotation angle of the steering wheel through a steering wheel steering angle sensor, until the steering wheel is rotated to an angle the same as the angle of the wheels. The rotation information of the wheels is also transmitted to an intelligent terminal. The intelligent terminal automatically calls a control interface of a virtual steering wheel, and rotates the virtual steering wheel to an angle the same as the angle of the wheels.

S306: Determine whether the steering wheel control instruction is received.

If yes, step S307 is performed, or if not, step S308 is performed.

S307: Receive the rotation information of the steering wheel, monitor the rotation information such as the rotation angle of the wheels through the wheel steering angle sensor at the same time, and drive the steering mechanism according to the rotation information of the steering wheel to operate, until the wheels are rotated to an angle the same as the angle of the steering wheel.

S308: Determine whether the intelligent-terminal control instruction is received.

If yes, step S309 is performed, or if not, step S310 is performed.

S309: Receive the rotation information transmitted by the intelligent terminal, monitor the rotation information such as the rotation angle of the wheels through the wheel steering angle sensor at the same time, and further drive, according to the rotation information transmitted by the intelligent terminal, the steering mechanism to operate, until the wheels are rotated to an angle required by the intelligent terminal.

S310: A V2X communication module transmits the takeover instruction and the vehicle surrounding image information to a roadside V2X communication infrastructure, and the roadside V2X communication infrastructure transmits the takeover instruction and the vehicle surrounding image information to the server through 4G or 5G.

S311: Determine whether to receive rotation information from the server transmitted by the V2X communication module.

If yes, step S312 is performed, or if not, the process returns to step S306.

S312: Receive the rotation information transmitted by the server, and monitor the rotation information such as the rotation angle of the wheels through the wheel steering angle sensor at the same time, and further drive, according to the rotation information transmitted by the server, the steering mechanism to operate, until the wheels are rotated to an angle required by the server.

In summary, according to the vehicle steering control method provided in the embodiments of the present disclosure, the steering mechanism is controlled according to at least one piece of the rotation information of the steering wheel, the rotation information transmitted by the autonomous-driving control unit, the rotation information transmitted by the intelligent device, and the rotation information transmitted by the server, so that a rigid connection between the steering wheel and the steering mechanism is canceled, a wired signal or a wireless signal can be used to transmit a steering intention of the driver, and steering control can be implemented without a mechanical mechanism, so that it is convenient to freely arrange the position of the steering wheel. In addition, the vehicle steering can be controlled in various manners, to ensure vehicle safety during driving.

Corresponding to the server of the foregoing embodiment, the present disclosure provides another vehicle steering control method.

FIG. 19 is a flowchart of a vehicle steering control method according to an embodiment of the present disclosure. As shown in FIG. 19, the method is applicable to a server. The vehicle steering control method according to this embodiment of the present disclosure includes the following steps.

S91: Receive vehicle surrounding image information and a takeover instruction that are transmitted by the vehicle.

S92: Determine whether there is a monitoring terminal in an idle state among a plurality of monitoring terminals.

S93: If there is a monitoring terminal in an idle state, transmit the vehicle surrounding image information to any monitoring terminal in an idle state for display, acquire an externally inputted steering operation instruction to generate rotation information, and transmit the rotation information to the vehicle through a communication module.

According to an embodiment of the present disclosure, if there is no monitoring terminal in an idle state, the rotation information is generated according to the vehicle surrounding image information, and the rotation information is transmitted to the vehicle through the communication module.

Figure 20:
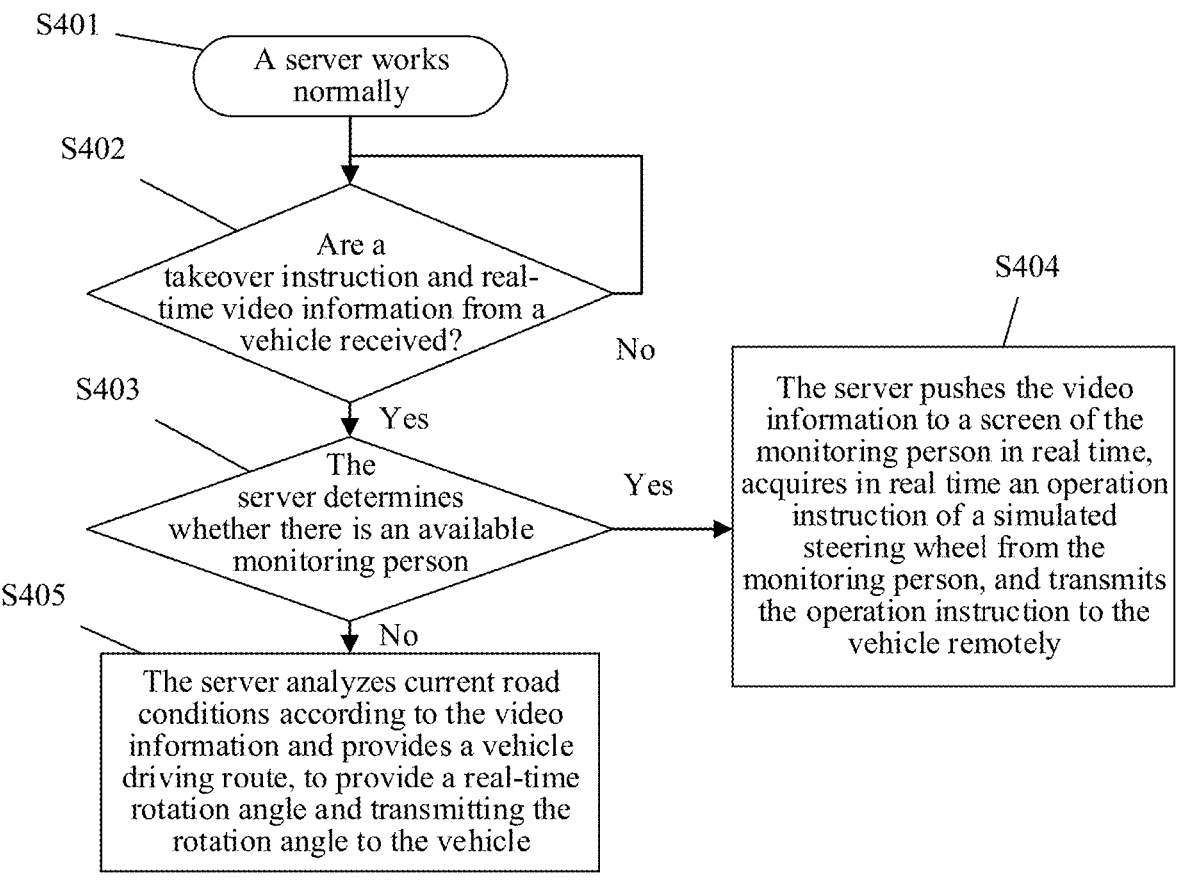
FIG. 20 is a flowchart of a vehicle steering control method applicable to a server according to an embodiment of the present disclosure.

Specifically, as shown in FIG. 20, the vehicle steering control method includes the following steps.

S401: The server works normally.

S402: The server determines whether to receive the takeover instruction from the vehicle and the real-time vehicle surrounding image information.

If yes, step S403 is performed, or if not, the process returns to step S402.

S403: The server determines whether there is a free monitoring person, that is, whether there is a monitoring terminal in an idle state.

If yes, step S404 is performed, or if not, the process returns to step S405.

S404: The server pushes in real time the vehicle surrounding image information such as video information to any monitoring terminal that is in an idle state, that is, a display screen of a spare monitoring person, acquires in real time the steering operation instruction inputted by the monitoring person through the simulated steering wheel, and transmits the steering operation instruction to the vehicle remotely.

S405: The server analyzes current road conditions according to the vehicle surrounding image information and calculates a vehicle driving route, thereby generating corresponding rotation information and transmitting the corresponding rotation information to the vehicle.

In summary, according to the vehicle steering control method provided in the embodiments of the present disclosure, after the takeover instruction and the vehicle surrounding image information are received, it is determined whether there is a monitoring terminal in an idle state, and when there is a monitoring terminal in an idle state, the vehicle surrounding image information is transmitted to any monitoring terminal in an idle state for display, the externally inputted steering operation instruction is acquired to generate the rotation information, and the rotation information is transmitted to the vehicle through the communication module, thereby remotely controlling the steering of the vehicle, and ensuring the vehicle safety during driving.

Based on the foregoing vehicle steering control method applicable to a vehicle, this embodiment of the present disclosure further provides a non-transitory computer-readable storage medium, storing a computer program thereon, the program, when being executed by a processor, implementing the vehicle steering control method described in the foregoing embodiments.

Based on the foregoing vehicle steering control method applicable to a server, this embodiment of the present disclosure further provides a non-transitory computer-readable storage medium, storing a computer program thereon, the program, when being executed by a processor, implementing the vehicle steering control method described in the foregoing embodiments.

Based on the foregoing vehicle steering control method applicable to a server, this embodiment of the present disclosure further provides a non-transitory computer-readable storage medium, storing a computer program thereon, the program, when being executed by a processor, implementing the vehicle steering control method described in the foregoing embodiments.

Embodiment 3

Based on the vehicle steering control system in the embodiments shown in FIG. 7 to FIG. 8, the present disclosure provides a vehicle, a vehicle steering control system and method, an in-vehicle intelligent device and a control method thereof, and a mobile intelligent device and a control method thereof.

According to an embodiment of the present disclosure, there are a plurality of steering wheels and a plurality of steering wheel drive units corresponding to the steering wheels one by one, each steering wheel drive unit is configured to drive a steering wheel corresponding to the steering wheel drive unit to rotate, and a control module controls at least one steering wheel drive unit according to obtained rotation information of wheels to drive the steering wheel to rotate, until a rotation angle of at least one steering wheel is the same as a rotation angle of the wheels.

A control module 50 is electrically connected to a steering mechanism 40, a wheel steering angle sensor 60, M steering wheel steering angle sensors 20, and M steering wheel drive units 30 separately. The control module 50 is configured to: obtain rotation information of the M steering wheels 10 and rotation information of wheels 100, and control at least one steering wheel according to the rotation information of the M steering wheels 10 and the rotation information of the wheels 100, so that the at least one steering wheel is kept synchronized with the wheels 100.

The control module 50 may control at least one corresponding steering wheel 10 according to the received rotation information of the wheels 100 and by using at least one direction drive unit 30, so that the at least one steering wheel 10 is rotated to an angle corresponding to the wheels 100 of the vehicle, even if the rotation angle of the steering wheel 10 corresponds to the rotation angle of the wheels 100. When controlling the steering wheel 10 to rotate, the control module 50 further obtains the rotation angle of the steering wheel 10, and controls, when the rotation angle of the steering wheel 10 is the same as the rotation angle of the wheels 100, the steering wheel 10 to stop rotating.

It should be understood that the control module 50 controls at least one steering wheel in both a steering-wheel driving mode and an autonomous-driving mode, so that the at least one steering wheel is kept synchronized with the wheels 100. In other words, during a traveling process of the vehicle, it is ensured that the at least one steering wheel is kept synchronized with the wheels 100, so that the user can take over the vehicle at any time. In addition, the control module 50 may also control, when the vehicle is in the steering-wheel driving mode, the steering mechanism 40 according to rotation information of the M steering wheels 10 and the rotation information of the wheels 100, to synchronize the wheels 100 with the at least one steering wheel 10; and control, when the vehicle is in the autonomous-driving mode, the steering mechanism 40 according to rotation information transmitted by the autonomous-driving control unit 70, to synchronize the wheels 100 with the at least one steering wheel 10.

It should be noted that in the steering-wheel driving mode, a driver controls the moving direction of the vehicle by operating the steering wheel to rotate. That is, in the steering-wheel driving mode, the control module 50 controls the rotation angle of the wheels 100 according to the rotation angle of the steering wheel. In the autonomous-driving mode, the driver does not need to operate the steering wheel to rotate, and the autonomous-driving control unit automatically controls the moving direction of the vehicle. That is, in the autonomous-driving mode, the control module 50 may control the rotation angle of the wheels 100 according to a rotation angle transmitted by the autonomous-driving control unit. That is, when the vehicle is in the steering-wheel driving mode, the control module 50 may control the steering mechanism 40 according to the received rotation information of the steering wheel 10, so that the wheels 100 of the vehicle are rotated to a corresponding rotation angle, even if the rotation angle of the steering wheel 10 corresponds to the rotation angle of the wheels 100. When controlling the rotation angle of the wheels 100, the control module 50 further obtains the rotation angle of the wheels 100, and controls, when the rotation angle of the wheels 100 is the same as the rotation angle of the steering wheel 10, the wheels 100 to stop rotating.

The control module 50 may include M steering wheel controllers 51 and a steering controller 52. The M steering wheel controllers 51 communicate with the steering controller 52, and each steering wheel controller 51 is configured to apply steering torque to a corresponding steering wheel 10 when the corresponding steering wheel 10 is operated. The each steering wheel controller 51 is configured to: obtain rotation information of the corresponding steering wheel 10, and transmit the rotation information of the corresponding steering wheel 10 to the steering controller 52. The steering controller 52 is configured to control at least one steering wheel 10 according to the rotation information of the M steering wheels 10 and the rotation information of the wheels 100, to synchronize the at least one steering wheel 10 with the wheels 100.

In addition, the steering controller 52 is configured to control the steering mechanism 40 according to the rotation information of the M steering wheels 10 and the rotation information of the wheels 100 when the vehicle is in the steering-wheel driving mode, to synchronize the at least one steering wheel 10 with the wheels 100. The steering controller 52 is configured to control the steering mechanism 40 according to rotation information from the autonomous-driving control unit 70 when the vehicle is in the autonomous-driving mode, to synchronize the at least one steering wheel 10 with the wheels 100.

The steering wheel controller 51 may transmit the rotation information of the steering wheel 10 to the steering controller 52, and the steering controller 52 controls the steering mechanism 40 according to the received rotation information of the steering wheel 10, so that the wheels 100 of the vehicle are rotated to a corresponding rotation angle, even if the rotation angle of the steering wheel 10 corresponds to the rotation angle of the wheels 100. When controlling the rotation angle of the wheels 100, the steering controller 52 further obtains the rotation angle of the wheels 100, and controls, when the rotation angle of the wheels 100 is the same as the rotation angle of the steering wheel 10, the wheels 100 to stop rotating.

In addition, the steering controller 52 may also transmit the rotation information of the wheels 100 to the M steering wheel controllers 51, and at least one of the M steering wheel controllers 51 may control the corresponding steering wheel drive unit 30 according to the rotation information of the wheels 100 to drive the steering wheel 10 to rotate, so that the rotation angle of at least one steering wheel 10 is the same as the angle of the wheels, thereby ensuring that the wheels are synchronized with the steering wheel and facilitating the takeover by the user.

In an embodiment of the present disclosure, M=1, the control module 50 such as the steering controller 52 is further configured to control the steering wheel 10 according to the rotation information of the steering wheel 10 and the rotation information of the wheels 100 when the vehicle is in the steering-wheel driving mode or the autonomous-driving mode, so that the steering wheel 10 is kept synchronized with the wheels 100.

The steering controller 52 may acquire the rotation information of the wheels 100 through the wheel steering angle sensor 60 and transmit the rotation information of the wheels 100 to the steering wheel controller 51. The steering wheel controller 51 may control the steering wheel drive unit 30 according to the rotation information of the wheels 100 to drive the corresponding steering wheel 10 to rotate, so that the rotation angle of the steering wheel 10 is the same as the angle of the wheels 100, thereby ensuring that the wheels are synchronized with the steering wheel and facilitating the takeover by the user.

Moreover, the control module 50 such as the steering controller 52 is further configured to control the steering mechanism 40 according to the rotation information of the steering wheel 10 and the rotation information of the wheels 100 when the vehicle is in the steering-wheel driving mode, so that the wheels 100 of the vehicle are driven according to the rotation information of the steering wheel 10 to rotate.

The steering wheel controller 51 may acquire the rotation information of the steering wheel 10 through the steering wheel steering angle sensor 20 to determine the driver's steering intention. A steering wheel drive motor 31 may simulate the steering torque, to provide the driver with a relatively comfortable steering force. The steering controller 52 may receive the rotation information of the steering wheel 10 transmitted by the steering wheel controller 51 and determine whether the vehicle is in the steering-wheel driving mode. When the vehicle is in the steering-wheel driving mode, the steering controller 52 drives the steering mechanism 40 according to the rotation information of the steering wheel 10 to implement steering.

According to an embodiment of the present disclosure, the control module 50 such as the steering wheel controller 51 communicates with the in-vehicle intelligent device through a communication bus of the vehicle, for example, a CAN. When M=1, the in-vehicle intelligent device obtains status information and steering wheel information of the vehicle when the running of a target program is detected, and controls a target object according to the rotation information of the steering wheel 10 when the vehicle is neither in the steering-wheel driving mode nor in the autonomous-driving mode.

It can be understood that the status information of the vehicle may include a driving mode of the vehicle, for example, a steering-wheel driving mode, an autonomous-driving mode or a parking state of the vehicle. The steering wheel information may include rotation information of the steering wheel, a use status of the steering wheel, mark information of the steering wheel, and the like.

It should be noted that the in-vehicle intelligent device may obtain the status information and steering wheel information of the vehicle together, or the in-vehicle intelligent device may first obtain the status information of the vehicle, and then obtain the steering wheel information when it is determined that the vehicle is neither in the steering-wheel driving mode nor in the autonomous-driving mode. In addition, the target program may be an application such as a game program installed on the in-vehicle intelligent device. The target object may be a virtual object such as a virtual steering wheel or a virtual vehicle displayed on the in-vehicle intelligent device, or the target object may be a physical object such as the in-vehicle intelligent device itself or a rotating part of the in-vehicle intelligent device.

When there is one steering wheel 10, the in-vehicle intelligent device may control the running of the target program according to an instruction of a user, and the user may operate the steering wheel after the target program starts to run. The steering wheel controller 51 reads the rotation angle and rotation speed of the steering wheel 10, and transmits the rotation angle and rotation speed of the steering wheel 10 to the communication bus. After detecting the running of the target program, the in-vehicle intelligent device may directly read the information through the communication bus of the vehicle. For example, the in-vehicle intelligent device may first read the status information of the vehicle through the communication bus to determine the operating mode, and actively read the rotation information of the steering wheel 10 through the communication bus when the vehicle is neither in the steering-wheel driving mode nor in the autonomous-driving mode, for example, is in a parking state, and control the target object according to the rotation information of the steering wheel 10, and no longer reads the rotation information of the steering wheel 10 when the vehicle is in the steering-wheel driving mode or autonomous-driving mode. In another example, the in-vehicle intelligent device may first read the status information of the vehicle and the rotation information of the steering wheel 10 through the communication bus and determine the operating mode according to the status information of the vehicle, and control the target object according to the rotation information of the steering wheel 10 when the vehicle is neither in the steering-wheel driving mode nor in the autonomous-driving mode, and may no longer control the target object according to the rotation information of the steering wheel 10 when the vehicle is in the steering-wheel driving mode or autonomous-driving mode.

It can be understood that when the vehicle is neither in the steering-wheel driving mode nor in the autonomous-driving mode and the running of the target program is detected, the in-vehicle intelligent device may display reminder information to prompt the user to operate the steering wheel. When the vehicle is in the steering-wheel driving mode or in the autonomous-driving mode, the in-vehicle intelligent device may display reminder information to prompt the user that the target object cannot be controlled through the steering wheel.

In addition, in some other embodiments, after the vehicle is not in the steering-wheel driving mode, the in-vehicle intelligent device may also determine the use status of the steering wheel. If the steering wheel is in use, for example, remotely controlling another device, the target object is no longer controlled according to the rotation information of the steering wheel 10. If the steering wheel is not in use, the target object is controlled according to the rotation information of the steering wheel 10.

In some embodiments of the present disclosure, the target program may be a game program such as a sim racing game, and the target object may be a simulated object such as a simulated racing car in the game. For example, when the target program is a sim racing game, the user may trigger the sim racing game to run and operate the steering wheel. The steering wheel controller 51 reads the rotation angle and rotation speed of the steering wheel 10, and transmits the rotation angle and rotation speed of the steering wheel 10 to the communication bus. When the vehicle is neither in the steering-wheel driving mode nor in the autonomous-driving mode and the running of the target program is detected, the in-vehicle intelligent device may directly read the rotation information of the steering wheel 10 through the communication bus, process the rotation information of the steering wheel 10 to obtain rotation information (including a rotation angle, a rotation speed or a rotation angle and a rotation speed) of the target object, and then perform steering control on the target object according to the rotation information of the target object. For example, the simulated racing car in the sim racing game may rotate according to the obtained rotation angle and rotation speed of the target object.

In other embodiments of the present disclosure, when M=1, the control module 50 such as the steering controller 52 may not control the steering wheel 10 when the vehicle is in the autonomous-driving mode, that is, the steering wheel 10 and the wheels 100 may be not kept synchronized. In this case, before controlling the target object according to the rotation information of the steering wheel 10, the in-vehicle intelligent device only needs to determine whether the vehicle is in the steering-wheel driving mode, that is, when the vehicle is not in the steering-wheel driving mode, for example, is in the autonomous-driving mode or in the parking state, the target object is controlled according to the rotation information of the steering wheel 10. It should be understood that in the autonomous-driving mode, when the steering wheel 10 and the wheels 100 may be not kept synchronized, the control method of the in-vehicle intelligent device in the autonomous-driving mode is basically the same as that of the vehicle when the vehicle is neither in the steering-wheel driving mode nor in the autonomous-driving mode in the previous embodiment, and details are not described herein again.

Therefore, the in-vehicle intelligent device is remotely controlled by using a physical steering wheel, to ensure normal driving and also provide a passenger with entertainment.

In some embodiments, the control module 50 such as the steering controller 52 may perform wireless communication with the mobile intelligent device. When detecting the running of the target program, the mobile intelligent device transmits a request instruction to the control module 50, that is, the steering controller 52, and receives the status information and the steering wheel information of the vehicle that are transmitted by the control module 50. When the vehicle is neither in the steering-wheel driving mode nor in the autonomous-driving mode, the mobile intelligent device controls the target object according to the rotation information of the steering wheel 10.

It should be noted that the mobile intelligent device may be an intelligent device that is not mounted on the vehicle. After receiving the request instruction, the steering controller 52 may transmit the status information and the steering wheel information of the vehicle to the mobile intelligent device together. Alternatively, the steering controller 52 may transmit the status information of the vehicle to the mobile intelligent device after receiving the request instruction. The mobile intelligent device may transmit a control request to the steering controller 52 when the mobile intelligent device determines that the vehicle is neither in the steering-wheel driving mode nor in the autonomous-driving mode. The steering controller 52 then obtains the steering wheel information according to the control request, and transmits the steering wheel information to the mobile intelligent device in real time, and the mobile intelligent device may control the target object according to the rotation information of the steering wheel 10.

It can be understood that the target program may be an application such as a game program or a remote-control program installed on the mobile intelligent device. The target object may be a virtual object such as a virtual steering wheel or a virtual vehicle displayed on the mobile intelligent device, or the target object may be a physical object, such as the mobile intelligent device itself or a rotating part (for example, a rotating part of an unmanned aerial vehicle) of the mobile intelligent device.

When there is one steering wheel 10, the mobile intelligent device may control the running of the target program according to the instruction of the user, and the user may operate the steering wheel after the target program starts to run. The steering wheel controller 51 reads the rotation angle and rotation speed of the steering wheel 10, and transmits the rotation angle and rotation speed of the steering wheel 10 to the steering controller 52. After the mobile intelligent device detects that the target program is running, the mobile intelligent device may transmit a request instruction to the steering controller 52, and the steering controller 52 feeds back information to the mobile intelligent device after receiving the request instruction.

For example, the steering controller 52 may transmit the status information of the vehicle to the mobile intelligent device, and the mobile intelligent device may determine the operating mode according to the status information of the vehicle, and then transmit the control request to the steering controller 52 when the vehicle is neither in the steering-wheel driving mode nor in the autonomous-driving mode, for example, in the parking state. The steering controller 52 then obtains the steering wheel information according to the control request, and transmits the steering wheel information to the mobile intelligent device in real time. The mobile intelligent device may control the target object according to the rotation information of the steering wheel 10 and may no longer transmit a control request to the steering controller 52, that is, no longer control the target object according to the rotation information of the steering wheel 10 when the vehicle is in the steering-wheel driving mode or in the autonomous-driving mode.

In another example, after receiving the request instruction, the steering controller 52 may transmit the status information of the vehicle and the rotation information of the steering wheel 10 to the mobile intelligent device together, and the mobile intelligent device then determines the operating mode according to the status information of the vehicle, controls the target object according to the rotation information of the steering wheel 10 when the vehicle is neither in the steering-wheel driving mode nor in the autonomous-driving mode, and no longer controls the target object according to the rotation information of the steering wheel 10 when the vehicle is in the steering-wheel driving mode or in the autonomous-driving mode.

It can be understood that when the vehicle is neither in the steering-wheel driving mode nor in the autonomous-driving mode and the running of the target program is detected, the mobile intelligent device can display reminder information to prompt the user to operate the steering wheel. When the mobile intelligent device is in the steering-wheel driving mode and not in the autonomous-driving mode, the mobile intelligent device can display reminder information to prompt the user that the target object cannot be controlled through the steering wheel.

In addition, in some other embodiments, after the mobile intelligent device is neither in the steering-wheel driving mode nor in the autonomous-driving mode, the mobile intelligent device may also determine the use status of the steering wheel. If the steering wheel is in use, for example, is remotely controlling another device, the target object is no longer controlled according to the rotation information of the steering wheel 10. If the steering wheel is not in use, the target object is controlled according to the rotation information of the steering wheel 10.

In some embodiments of the present disclosure, the target program may be a game program such as a sim racing game, and the target object may be a simulated object such as a simulated racing car in the game. Alternatively, the target program may be an unmanned-aerial-vehicle remote control program, and the target object may be an unmanned aerial vehicle. For example, when the target program is an unmanned-aerial-vehicle remote control program, the user may trigger the unmanned-aerial-vehicle remote control program to run and operate the steering wheel. The steering wheel controller 51 reads the rotation angle and rotation speed of the steering wheel 10 and transmits the rotation angle and rotation speed of the steering wheel 10 to the steering controller 52, and the steering controller 52 transmits the rotation angle and rotation speed of the steering wheel 10 to the unmanned aerial vehicle in real time. When the vehicle is neither in the steering-wheel driving mode nor in the autonomous-driving mode and the running of the target program is detected, the unmanned aerial vehicle may process the rotation information of the steering wheel 10 to obtain rotation information (including a rotation angle, a rotation speed or a rotation angle and a rotation speed) of the target object. Steering control is then performed on the unmanned aerial vehicle according to the rotation information of the target object, so that the unmanned aerial vehicle is remotely controlled.

Therefore, the mobile intelligent device is remotely controlled by using the physical steering wheel of the vehicle, to ensure normal driving and also provide a passenger with entertainment.

It should be noted that the wheels 100 of the vehicle may not rotate with the rotation of the steering wheel when the vehicle is neither in the steering-wheel driving mode nor in the autonomous-driving mode. Moreover, when the vehicle is in the steering-wheel driving mode or in the autonomous-driving mode, the in-vehicle intelligent device or the mobile device may automatically exit the target program and stop controlling the target object according to the rotation information of the steering wheel 10. The in-vehicle intelligent device or the mobile device determines, according to the status information of the vehicle transmitted by the control module 50 in real time, that the vehicle enters the steering-wheel driving mode or autonomous-driving mode.

In other embodiments of the present disclosure, when M=1, the control module 50 such as the steering controller 52 may not control the steering wheel 10 when the vehicle is in the autonomous-driving mode, that is, the steering wheel 10 and the wheels 100 may not be kept synchronized. In this case, before controlling the target object according to the rotation information of the steering wheel 10, that is, when the vehicle is not in the steering-wheel driving mode, for example, in the autonomous-driving mode or in the parking state, the mobile intelligent device only needs to determine whether the vehicle is in the steering-wheel driving mode, and controls the target object according to the rotation information of the steering wheel 10. It should be understood that in the autonomous-driving mode, when the steering wheel 10 and the wheels 100 is not kept synchronized, the control method of the mobile intelligent device in the autonomous-driving mode may be basically the same as that of the vehicle when the vehicle is neither in the steering-wheel driving mode nor in the autonomous-driving mode in the previous embodiment, and details are not described herein again.

As described above, when M=1, a control procedure of this embodiment of the present disclosure may be as follows.

After the vehicle is powered on, the steering controller 52 determines whether the vehicle is in a parking state. If the vehicle is not in a parking state, that is, in the steering-wheel driving mode or in the autonomous-driving mode, the steering controller 52 reads the rotation angle and rotation speed of the steering wheel 10, and drives the steering mechanism 40 to rotate according to the rotation angle and rotation speed.

If the vehicle is in a parking state, the in-vehicle intelligent device may determine whether the running of the target program is detected. If the target program is detected, the in-vehicle intelligent device reads the rotation angle and rotation speed of the steering wheel 10, and controls the target object according to the rotation angle and rotation speed of the steering wheel 10.

Alternatively, if the vehicle is in a parking state, the mobile intelligent device may determine whether the running of the target program is detected. If the target program is detected, the mobile intelligent device transmits the request instruction to the steering controller 52, receives the rotation angle and rotation speed of the steering wheel 10 that are transmitted by the steering controller 52, and controls the target object according to the rotation angle and rotation speed of the steering wheel 10.

According to another embodiment of the present disclosure, the control module 50 such as the steering controller 52 is further configured to: obtain, when the vehicle is in the steering-wheel driving mode, preset priority information to determine a priority order of the M steering wheels 10, determine a vehicle-controlling steering wheel in the M steering wheels 10 according to the priority order of the M steering wheels 10, and control the steering mechanism 40 according to rotation information of the vehicle-controlling steering wheel, so that the steering mechanism 40 drives the wheels 100 of the vehicle according to the rotation information of the vehicle-controlling steering wheel to rotate.

When M>1, the steering wheel controller 51 may acquire the rotation information of the corresponding M steering wheels 10 through the M steering wheel steering angle sensors 20 to determine the steering intention of the driver. Each steering wheel drive motor 31 may simulate steering torque, to provide the driver with a more comfortable steering force. The steering controller 52 may receive the rotation information of the steering wheel 10 transmitted by the M steering wheel controllers 51, and determine whether the vehicle is in a steering-wheel driving mode. When the vehicle is in the steering-wheel driving mode, the steering controller 52 drives the steering mechanism 40 based on the rotation information of the M steering wheels 10 and the rotation information of the wheels 100, to implement steering.

It should be understood that the preset priority information may be priority information preset at a factory or priority information set by a user. In other words, the priority order of the M steering wheels 10 may be set according to requirements of the user. A driver steering wheel and a co-driver steering wheel are used as an example. The priority of the driver steering wheel may be set higher than that of the co-driver steering wheel or vice versa. It should be understood that the priority herein is set according to a level at which the steering wheel controls the wheels, rather than a level at which the steering wheel controls another intelligent device.

It should be noted that the vehicle-controlling steering wheel is the steering wheel currently controlling the moving direction of the vehicle. In other words, the rotation angle of the wheels is at least the same as the rotation angle of the vehicle-controlling steering wheel.

According to an embodiment of the present disclosure, there are a plurality of steering wheels and a plurality of steering wheel drive units corresponding to the steering wheels one by one, and each steering wheel drive unit is configured to drive a steering wheel corresponding to the steering wheel drive unit to rotate, where the control module is configured to: obtain the rotation information of the wheels before the vehicle enters the steering-wheel driving mode, and control the steering wheel drive unit according to the rotation information of the wheels to drive the steering wheel to rotate, until the rotation angle of the steering wheel is the same as the rotation angle of the wheels, including: the control module being configured to: obtain the rotation information of the wheels before the vehicle enters the steering-wheel driving mode; and control a steering wheel drive unit of a to-be-controlled vehicle according to the rotation information of the wheels to drive a steering wheel of the to-be-controlled vehicle to rotate, until the rotation angle of the steering wheel of the to-be-controlled vehicle is the same as the rotation angle of the wheels.

For example, it is assumed that there are three steering wheels A, B, and C installed on the vehicle, and the priority of the steering wheel A is higher than the priority of the steering wheel B, and the priority of the steering wheel B is higher than the priority of the steering wheel C (in the following embodiment, refer to this order for the priority of the steering wheels A, B, and C). When it is determined that the steering wheel B is the vehicle-controlling steering wheel, the control module 50 may obtain the rotation information of the steering wheel B, and control the steering mechanism 40 according to the rotation angle of the steering wheel B until the rotation angle of the wheels 100 is the same as the rotation angle of the steering wheel B.

It should also be noted that when the control module 50 controls the wheels 100 according to the rotation information of the vehicle-controlling steering wheel, other steering wheels may or may not rotate synchronously with the wheels 100. That is, when the steering wheel B is the vehicle-controlling steering wheel, the steering wheels A and C may be kept synchronized with the rotation of the wheels 100 or may not be kept synchronized with the rotation of the wheels 100.

In a specific embodiment of the present disclosure, the control module 50 such as the steering controller 52 is configured to: determine, when determining the vehicle-controlling steering wheel, at least one to-be-operated steering wheel among the M steering wheels; and use the top-priority steering wheel in the at least one to-be-operated steering wheel as the vehicle-controlling steering wheel. That is, when one steering wheel rotates, the steering wheel is directly used as the vehicle-controlling steering wheel. That is, the steering wheel is directly configured to control the moving direction of the vehicle. When a plurality of steering wheels rotate at the same time, a high-priority steering wheel is used as the vehicle-controlling steering wheel. That is, the high-priority steering wheel is configured to control the moving direction of the vehicle.

For example, the steering wheel B and the steering wheel C are operated by a user at the same time to rotate. Because the priority of the steering wheel B is higher than the priority of the steering wheel C, the control module 50 may use the steering wheel B as the vehicle-controlling steering wheel, and control the steering mechanism 40 according to the rotation angle of the steering wheel B.

According to an embodiment of the present disclosure, the control module 50 such as the steering controller 52 is further configured to: determine, when controlling the steering mechanism 40 according to the rotation information of the vehicle-controlling steering wheel, a to-be-synchronized steering wheel among other steering wheels other than the vehicle-controlling steering wheel; and control the to-be-synchronized steering wheel according to the rotation information of the wheels 100, so as to synchronize the to-be-synchronized steering wheel with the wheels 100. A non-to-be-synchronized steering wheel may be not kept synchronized with the wheels 100.

It should be noted that the to-be-synchronized steering wheel is a steering wheel that does not currently control the moving direction of the vehicle but needs to be synchronized with the wheels.

When controlling the rotation of the wheels 100 according to the rotation information of the vehicle-controlling steering wheel, the control module 50 may also drive, according to the rotation information of the wheels 100, the to-be-synchronized steering wheel in real time to rotate, so as to synchronize the to-be-synchronized steering wheel with the wheels 100, to facilitate the takeover of the vehicle by the user. In this case, the non-to-be-synchronized steering wheel may be not kept synchronized with the wheels 100.

For example, the steering wheel B is the vehicle-controlling steering wheel, and the steering wheel A is the to-be-synchronized steering wheel. The control module 50 may control the steering mechanism 40 according to the rotation angle of the steering wheel B until the rotation angle of the wheels 100 is the same as the rotation angle of the steering wheel B. The steering wheel A may be controlled according to the rotation angle of the wheels 100 until the rotation angle of the steering wheel A is the same as the rotation angle of the wheels 100. In this case, the steering wheel C is a non-to-be-synchronized steering wheel, and may not be kept synchronized with the wheels 100.

According to another embodiment of the present disclosure, the control module 50 such as the steering controller 52 is further configured to determine, when controlling the steering mechanism 40 according to the rotation information of the vehicle-controlling steering wheel, a to-be-synchronized steering wheel among other steering wheels other than the vehicle-controlling steering wheel, and control, according to the rotation information of the wheels 100 when it is determined that the to-be-synchronized steering wheel takes over the vehicle, the to-be-synchronized steering wheel that takes over the vehicle, so as to synchronize the to-be-synchronized steering wheel that takes over the vehicle with the wheels 100.

When the control module 50 controls the rotation of the wheels 100 according to the rotation information of the vehicle-controlling steering wheel, the to-be-synchronized steering wheel may temporarily not be synchronized with the wheels 100, and when the to-be-synchronized steering wheel needs to take over the vehicle, the to-be-synchronized steering wheel that takes over the vehicle can be driven according to the rotation information of the wheels 100 to rotate, so as to synchronize the to-be-synchronized steering wheel that takes over the vehicle with the wheels 100, to facilitate the takeover of the vehicle by the user. In this case, the non-to-be-synchronized steering wheel may be not kept synchronized with the wheels 100.

It should be noted that there may be one or more to-be-synchronized steering wheels, one of the to-be-synchronized steering wheels may be selected to take over the vehicle, and the to-be-synchronized steering wheel that takes over the vehicle is synchronized with the wheels 100. Other to-be-synchronized steering wheels that does not take over the vehicle may be kept synchronized with the wheels 100 or may not be kept synchronized with the wheels 100. This is not limited in the present disclosure.

It should be understood that the control module 50 may determine, if the steering wheel with which the user controls the vehicle fails or stops controlling the vehicle, for example, when receiving a takeover exit instruction inputted by the user, that the to-be-synchronized steering wheel takes over the vehicle. Alternatively, the control module 50 may determine, when receiving a takeover instruction of any to-be-synchronized steering wheel and the priority of the to-be-synchronized steering wheel is higher than the priority of the vehicle-controlling steering wheel, that the to-be-synchronized steering wheel takes over the vehicle.

For example, the steering wheel B is the vehicle-controlling steering wheel, and the steering wheel A is the to-be-synchronized steering wheel. The control module 50 may control the steering mechanism 40 according to the rotation angle of the steering wheel B until the rotation angle of the wheels 100 is the same as the rotation angle of the steering wheel B. The steering wheel A may be not kept synchronized with the wheels 100 before a takeover instruction of the steering wheel A is received. Upon receiving the takeover instruction of the steering wheel A, the control module 50 controls the steering wheel A according to the rotation angle of the wheels 100 until the rotation angle of the steering wheel A is the same as the rotation angle of the wheels 100. After the rotation angle of the steering wheel A is the same as the rotation angle of the wheels 100, the wheels 100 are controlled according to the rotation angle of the steering wheel A. In this case, the steering wheel C is a non-to-be-synchronized steering wheel, and may be not kept synchronized with the wheels 100.

In a specific embodiment of the present disclosure, the control module 50 such as the steering controller 52 is configured to use a steering wheel with priority higher than the priority of the vehicle-controlling steering wheel among the M steering wheels as the to-be-synchronized steering wheel. Alternatively, the control module 50 is configured to use a steering wheel with priority higher than the priority of the vehicle-controlling steering wheel among the M steering wheels and a default steering wheel among the M steering wheels together as the to-be-synchronized steering wheels.

It should be noted that the default steering wheel may be a steering wheel set by default at the factory. For example, in the production setting, the default steering wheel may be the top-priority steering wheel, and may be the driver steering wheel.

When there is no default steering wheel in the M steering wheels 10, the steering wheel with priority higher than the priority of the vehicle-controlling steering wheel may be used as the to-be-synchronized steering wheel. In this case, when the control module 50 controls the rotation of the wheels 100 according to the rotation information of the vehicle-controlling steering wheel, the steering wheel with priority higher than the priority of the vehicle-controlling steering wheel may be driven according to the rotation information of the wheels 100 to rotate, so as to synchronize the steering wheel with priority higher than the priority of the vehicle-controlling steering wheel with the wheels 100. Alternatively, the steering wheel with priority higher than the priority of the vehicle-controlling steering wheel may temporarily not be synchronized with the wheels 100, and when the steering wheel with priority higher than the priority of the vehicle-controlling steering wheel needs to take over the vehicle, the steering wheel with priority higher than the priority of the vehicle-controlling steering wheel is driven according to the rotation information of the wheels 100 to rotate. In this case, a steering wheel with priority lower than the priority of the vehicle-controlling steering wheel is used as the non-to-be-synchronized steering wheel, and the non-to-be-synchronized steering wheel may not be kept synchronized with the wheels 100.

For example, the steering wheel B is the vehicle-controlling steering wheel. Because the priority of the steering wheel A is higher than the priority of the steering wheel B, the steering wheel A may be used as the to-be-synchronized steering wheel. That is, when controlling the wheels 100 according to the rotation angle of the steering wheel B, the control module 50 may also control the steering wheel A to be synchronized with the wheels. Alternatively, the steering wheel A and the wheels 100 are not kept synchronized, and the steering wheel A is controlled to be synchronized with the wheels 100 when the steering wheel A needs to take over the vehicle. In this case, the priority of the steering wheel C is lower than the priority of the steering wheel B, the steering wheel C may be used as a non-to-be-synchronized steering wheel, and the steering wheel C may not be kept synchronized with the wheels 100.

In addition, when there is a default steering wheel in the M steering wheels 10, the steering wheel with priority higher than the priority of the vehicle-controlling steering wheel and the default steering wheel may be used together as the to-be-synchronized steering wheels. It should be understood that when the priority of the default steering wheel is higher than the priority of the vehicle-controlling steering wheel, the steering wheel with priority higher than the priority of the vehicle-controlling steering wheel includes the default steering wheel. When the priority of the default steering wheel is lower than the priority of the vehicle-controlling steering wheel, in addition to using the steering wheel with priority higher than the priority of the vehicle-controlling steering wheel as the to-be-synchronized steering wheel, the default steering wheel is also used as the to-be-synchronized steering wheel.

In this case, when the control module 50 controls the rotation of the wheels 100 according to the rotation information of the vehicle-controlling steering wheel, the steering wheel with priority higher than the priority of the vehicle-controlling steering wheel and the default steering wheel may be driven according to the rotation information of the wheels 100 to rotate, so as to synchronize the steering wheel with priority higher than the priority of the vehicle-controlling steering wheel and the default steering wheel with the wheels 100. Alternatively, the steering wheel with priority higher than the priority of the vehicle-controlling steering wheel and the default steering wheel may temporarily not be synchronized with the wheels 100, and when the steering wheel with priority higher than the priority of the vehicle-controlling steering wheel or the default steering wheel needs to take over the vehicle, the steering wheel with priority higher than the priority of the vehicle-controlling steering wheel and the default steering wheel are driven according to the rotation information of the wheels 100 to rotate. In this case, the steering wheel (not including the default steering wheel) with priority lower than the priority of the vehicle-controlling steering wheel is used as the non-to-be-synchronized steering wheel, and the non-to-be-synchronized steering wheel may be not kept synchronized with the wheels 100.

For example, the steering wheel B is the vehicle-controlling steering wheel. Because the priority of the steering wheel A is higher than the priority of the steering wheel B, the steering wheel A may be used as the to-be-synchronized steering wheel, and because the steering wheel C is the default steering wheel, the steering wheel C can also be the to-be-synchronized steering wheel. That is, when controlling the wheels 100 according to the rotation angle of the steering wheel B, the control module 50 can also control the steering wheel A and the steering wheel C to be synchronized with the wheels. Alternatively, the steering wheel A and the steering wheel C are not kept synchronized with the wheels 100, and the steering wheel A and the steering wheel C are controlled to be synchronized with the wheels 100 when the steering wheel A or the steering wheel C needs to take over the vehicle.

It can be understood that after the to-be-synchronized steering wheel is synchronized with the wheels 100, the steering mechanism 40 may be controlled according to the rotation information of any to-be-synchronized steering wheel, to drive the wheels 100 to rotate.

According to an embodiment of the present disclosure, a non-to-be-synchronized steering wheel among other steering wheels other than the vehicle-controlling steering wheel is not kept synchronized with the wheels 100. That is, when the control module 50 controls the wheels 100 according to the rotation information of the vehicle-controlling steering wheel, the non-to-be-synchronized steering wheels are not kept synchronized with the wheels 100, that is, the control module 50 does not control the non-to-be-synchronized steering wheels according to the rotation information of the wheels 100 to rotate. In this case, a non-synchronized steering wheel may be used for remote control.

The control module 50 is configured to use a steering wheel with priority lower than the priority of the vehicle-controlling steering wheel among the M steering wheels as the non-to-be-synchronized steering wheel. Alternatively, the control module 50 is configured to use a steering wheel with priority lower than the priority of the vehicle-controlling steering wheel among other steering wheels other than the default steering wheel as the non-to-be-synchronized steering wheel.

That is, when there is no default steering wheel in the M steering wheels 10, the steering wheel with priority lower than the priority of the vehicle-controlling steering wheel may be used as the non-to-be-synchronized steering wheel. In this case, when controlling the rotation of the wheels 100 according to the rotation information of the vehicle-controlling steering wheel, the control module 50 may not drive the steering wheel with priority lower than the priority of the vehicle-controlling steering wheel according to the rotation information of the wheels 100 to rotate, so as not to synchronize the steering wheel with priority lower than the priority of the vehicle-controlling steering wheel with the wheels 100.

For example, when the steering wheel B is the vehicle-controlling steering wheel, the priority of the steering wheel C is lower than the priority of the steering wheel B, the steering wheel C may be used as a non-to-be-synchronized steering wheel, and the steering wheel C may not be kept synchronized with the wheels 100.

In addition, when there is a default steering wheel in the M steering wheels 10, other than the default steering wheel, the steering wheel with priority lower than the priority of the vehicle-controlling steering wheel may be used as the non-to-be-synchronized steering wheel. It should be understood that when the priority of the default steering wheel is higher than the priority of the vehicle-controlling steering wheel, the steering wheel with priority lower than the priority of the vehicle-controlling steering wheel is the non-to-be-synchro-nized steering wheel. When the priority of the default steering wheel is lower than the priority of the vehicle-controlling steering wheel, the steering wheels with priority lower than the priority of the vehicle-controlling steering wheel include the default steering wheel, the default steering wheel may be removed from the steering wheels with priority lower than the priority of the vehicle-controlling steering wheel, and after the default steering wheel is removed, the steering wheels with priority lower than the priority of the vehicle-controlling steering wheel are used as non-to-be-synchronized steering wheels. In this case, when the control module 50 controls the rotation of the wheels 100 according to the rotation information of the vehicle-control-ling steering wheel, the steering wheel (excluding the default steering wheel) with priority lower than the priority of the vehicle-controlling steering wheel may not be driven according to the rotation information of the wheels 100 to rotate, so as not to synchronize the steering wheel (excluding the default steering wheel) with priority lower than the priority of the vehicle-controlling steering wheel with the wheels 100.

For example, the steering wheel B is the vehicle-control-ling steering wheel. Because the priority of the steering wheel C is lower than the priority of the steering wheel B and the steering wheel C is the default steering wheel, the steering wheel C may be the to-be-synchronized steering wheel. Assuming that the wheel is also provided with a steering wheel D, the priority of the steering wheel D is lower than the priority of the steering wheel C, and the steering wheel D is not the default steering wheel. In this case, the steering wheel D may be used as the non-to-be-synchronized steering wheel, and the steering wheel D and the wheels 100 may be not kept synchronized.

It can be understood that when the vehicle is in the steering-wheel driving mode, if there is a non-to-be-syn-chronized steering wheel, the non-to-be-synchronized steer-ing wheel may be used for remote control.

According to an embodiment of the present disclosure, the control module 50 such as the steering controller 52 is further configured to control any non-to-be-synchronized steering wheel according to the rotation information of the wheels 100 when receiving a trigger instruction of any non-to-be-synchronized steering wheel, so that any non-to-be-synchronized steering wheel is synchronized with the wheels 100. In addition, after any non-to-be-synchronized steering wheel is synchronized with the wheels 100, the steering mechanism 40 is controlled according to the rota-tion information of any non-to-be-synchronized steering wheel, so that the steering mechanism 40 drives the wheels 100 of the vehicle according to the rotation information of any non-to-be-synchronized steering wheel to rotate.

That is, when the control module 50 controls the vehicle according to the rotation information of the vehicle-control-ling steering wheel, that is, the high-priority steering wheel, if the non-to-be-synchronized steering wheel, that is, a low-priority steering wheel, needs to control the vehicle, a trigger instruction may be inputted to trigger any low-priority steering wheel to enter a takeover state. In this case, the low-priority steering wheel is controlled according to the rotation information of the wheels 100, so that any low-priority steering wheel is synchronized with the wheels 100. In addition, after any low-priority steering wheel is synchro-nized with the wheels 100, the steering mechanism 40 is controlled according to the rotation information of the low-priority steering wheel, so that the wheels 100 respond to the low-priority steering wheel.

It should be noted that after any low-priority steering wheel is synchronized with the wheels 100, when another trigger instruction is received, the steering mechanism 40 is controlled according to the rotation information of the low-priority steering wheel, so that the wheels 100 respond to the low-priority steering wheel.

The following describes in detail with reference to a specific embodiment of the control method of a vehicle steering control system when M is greater than 1 in the embodiments of the present disclosure.

According to an embodiment of the present disclosure, when M>1, the control module 50 such as the steering controller 52 first obtains the priority order of the M steering wheels 10 after the vehicle enters the steering-wheel driving mode, and then determines whether the priority of the default steering wheel is the highest. If the priority of the default steering wheel is the highest, the rotation informa-tion of the default steering wheel is directly obtained, and the steering mechanism 40 is controlled according to the rotation information of the default steering wheel to syn-chronize the rotation of the wheels 100 of the vehicle with that of the default steering wheel.

When the priority of the default steering wheel such as the driver steering wheel is the highest, the wheels are directly controlled according to the rotation information of the default steering wheel, and steering wheels other than the default steering wheel no longer perform wheel control, for example, remote control by intelligent devices.

For example, one steering wheel may be separately installed in the driver position and the co-driver position or another position. A steering wheel may be installed in the driver position as the driver steering wheel, a steering wheel may be installed in the co-driver position as the co-driver steering wheel, and the priority of the driver steering wheel and that of the co-driver steering wheel may be set. As shown in FIG. 8, the M steering wheels 10 include a driver steering wheel 10-1 and a co-driver steering wheel 10-2. The M steering wheel steering angle sensors 20 may include a driver steering wheel steering angle sensor 20-1 and a co-driver steering wheel steering angle sensor 20-2. The M steering wheel drive units 30 may include a driver motor 31-1 and a co-driver motor 31-2, and the M steering wheel controllers 51 may include a driver steering wheel controller 51-1 and a co-driver steering wheel controller 51-2. The driver steering wheel controller 51-1 acquires a rotation angle and a rotation speed of the driver steering wheel 10-1 through the driver steering wheel steering angle sensor 20-1 to determine the steering intention of a driver, and transmits the information to the steering controller 52 in a wired or wireless manner. The driver motor 31-1 may simulate the steering torque to ensure the steering comfort of the driver steering wheel 10-1. The co-driver steering wheel controller 51-2 acquires a rotation angle and rotation speed of the co-driver steering wheel 10-2 through the co-driver steering wheel steering angle sensor 20-2 to determine the steering intention of a co-driver, and transmits the information to the steering controller 52 in a wired or wireless manner. The co-driver motor 31-2 may simulate the steering torque, to ensure the steering comfort of the co-driver steering wheel 10-2.

In addition, the steering controller 52 acquires the rotation angle and the rotation speed transmitted by the driver steering wheel controller 51-1 and the co-driver steering wheel controller 51-2, and determines the priority of the driver steering wheel 10-1 and the co-driver steering wheel 10-2. When the priority of the driver steering wheel 10-1 is higher than the priority of the co-driver steering wheel 10-2, the steering controller 52 drives the steering mechanism 40 according to the rotation information of the driver steering wheel 10-1 to implement steering. In addition, the co-driver steering wheel may control another intelligent device.

Therefore, when the priority of the default steering wheel is the highest, the default steering wheel is used to operate the vehicle direction, and other steering wheels no longer operate the vehicle direction, thereby ensuring the driving safety of the vehicle and providing entertainment. In addition, the priority of a plurality of steering wheels may be freely set, to improve the user experience.

In some embodiments of the present disclosure, the control module 50 is further configured to: determine at least one to-be-operated steering wheel among M steering wheels 10 when the priority of the default steering wheel is lower than the priority of at least one steering wheel of the M steering wheels 10, and control the steering mechanism 40 according to the rotation information of the top-priority steering wheel among the at least one to-be-operated steering wheel, so that the steering mechanism 40 drives the wheels 100 of the vehicle according to the rotation information of the top-priority steering wheel among the at least one to-be-operated steering wheel to rotate.

It can be understood that the steering wheel 10 being operated may be that the steering wheel is turned by the driver.

When M>1, the control module 50 such as the steering controller 52 first obtains the priority of the M steering wheels 10 after the vehicle enters the steering-wheel driving mode, and then determines whether the priority of the default steering wheel is the highest. If the priority of the default steering wheel is not the highest, that is, if the priority of at least one steering wheel among the M steering wheels is higher than (not including equal to) that of the default steering wheel, the steering controller 52 may acquire the states of the M steering wheels in real time. When only one steering wheel 10 of the M steering wheels is operated, the steering controller 52 may drive the steering mechanism 40 according to the rotation information of the steering wheel 10 to implement steering. When a plurality of steering wheels 10 of the M steering wheels are operated, the steering controller 52 may determine the top-priority steering wheel among the plurality of steering wheels 10, and drive the steering mechanism 40 according to the rotation information of the top-priority steering wheel among the plurality of steering wheels 10 to implement steering. At the same time, when any steering wheel 10 is operated, the steering wheel drive unit 30 corresponding to the steering wheel 10 may apply steering torque to the corresponding steering wheel 10 to ensure the handling comfort of the driver.

When the vehicle is in a steering-wheel driving mode and the priority of the default steering wheel is not the highest, the wheels 100 of the vehicle may be controlled according to the priority of the M steering wheels. When the steering wheels with different priority rotate at the same time, the steering wheel with higher priority has priority control.

For example, when a driving school student or novice sits in the driver position and an instructor sits in the co-driver position, the co-driver steering wheel 10-2 may be set to have the highest priority. When the driver steering wheel 10-1 is operated and the co-driver steering wheel 10-2 is not, the steering controller 52 may obtain the rotation angle and the rotation speed of the driver steering wheel 10-1, and drive the steering mechanism 40 to drive the wheels 100 according to the rotation angle and the rotation speed of the driver steering wheel 10-1 to steer. When there is an emergency and the person in the driver position does not know how to handle the emergency or handles the emergency incorrectly, the instructor in the co-driver position may rotate the co-driver steering wheel 10-2. In this case, regardless of whether the driver steering wheel 10-1 is rotated or not, the steering controller 52 obtains the rotation angle and the rotation speed of the co-driver steering wheel 10-2 through the co-driver steering wheel controller 51-2, and drives the steering mechanism 40 to drive the wheels 100 according to the rotation angle and the rotation speed of the co-driver steering wheel 10-2 to steer, so as to make it convenient for the instructor to take over the driving of the vehicle.

Therefore, a plurality of steering wheels may control the vehicle according to priority, to improve driving safety and facilitate driving education.

In some embodiments of the present disclosure, the control module 50 is further configured to: when the top-priority steering wheel among the at least one to-be-operated steering wheel is not the same as the top-priority steering wheel among the M steering wheels 10, control the top-priority steering wheel among the M steering wheels 10 according to the rotation information of the top-priority steering wheel of the at least one to-be-operated steering wheel, to drive the top-priority steering wheel among the M steering wheels 10 according to the rotation information of the top-priority steering wheel among the at least one to-be-operated steering wheel to rotate.

If the priority of the default steering wheel is not the highest, that is, at least one steering wheel of the M steering wheels has priority higher than (not including equal to) that of the default steering wheel, the steering controller 52 may acquire the states of the M steering wheels in real time. When only one steering wheel 10 of the M steering wheels is operated, the steering controller 52 may drive the steering mechanism 40 according to the rotation information of the steering wheel 10 to implement steering, and at the same time determine whether the steering wheel 10 is the top-priority steering wheel of the M steering wheels. If not, the steering controller 52 transmits the rotation information of the steering wheel 10 to the steering wheel controller 51, and the steering wheel controller 51 may use the corresponding steering wheel drive unit 30 and control the top-priority steering wheel in the M steering wheels according to the rotation information, so that the top-priority steering wheel among the M steering wheels 10 rotates synchronously with the operated steering wheel 10. When a plurality of steering wheels 10 of the M steering wheels are operated, the steering controller 52 may determine the top-priority steering wheel among the plurality of steering wheels 10, and drive the steering mechanism 40 according to the rotation information of the top-priority steering wheel among the plurality of steering wheels 10 to implement steering. At the same time, it is determined whether the top-priority steering wheel among the plurality of steering wheels 10 is the top-priority steering wheel among the M steering wheels. If not, the steering controller 52 transmits the rotation information of the top-priority steering wheel among the plurality of steering wheels 10 to the steering wheel controller 51. The steering wheel controller 51 may use the corresponding steering wheel drive unit 30 and control the top-priority steering wheel in the M steering wheels according to the rotation information, so that the top-priority steering wheel among the M steering wheels 10 rotates synchronously with the top-priority steering wheel among the plurality of the steering wheels 10.

For example, assuming that the priority of the driver steering wheel 10-1 is lower than the priority of the co-driver steering wheel 10-2, when the driver steering wheel 10-1 is operated and the co-driver steering wheel 10-2 is not, the steering controller 52 may obtain the rotation angle and the rotation speed of the driver steering wheel 10-1, and drive the steering mechanism 40 to drive the wheels 100 according to the rotation angle and the rotation speed of the driver steering wheel 10-1 to steer. At the same time, the steering controller 52 may also transmit the rotation angle and the rotation speed of the driver steering wheel 10-1 to the co-driver steering wheel controller 51-2, and the co-driver steering wheel controller 51-2 may drive the co-driver motor 31-2 to control the co-driver steering wheel 10-1 to rotate according to the rotation angle and the rotation speed of the driver steering wheel 10-1, so as to synchronize the rotation of the co-driver steering wheel 10-2 with that of the driver steering wheel 10-1.

In some embodiments of the present disclosure, when M>1, an in-vehicle intelligent device obtains status information and steering wheel information of the vehicle when the running of a target program is detected, determines non-to-be-synchronized steering wheels among the M steering wheels when the vehicle is in a steering-wheel driving mode or in an autonomous-driving mode, and controls the target object according to the rotation information of at least one steering wheel in the non-to-be-synchronized steering wheels.

It can be understood that the status information of the vehicle may include a driving mode of the vehicle, for example, a steering-wheel driving mode, an autonomous-driving mode or a parking state of the vehicle. The steering wheel information may include rotation information of the steering wheel, a use status of the steering wheel, mark information of the steering wheel, and the like.

It should be noted that the in-vehicle intelligent device may obtain the status information and steering wheel information of the vehicle together, or the in-vehicle intelligent device may sequentially obtain the status information and the steering wheel information of the vehicle. In addition, the target object may be a virtual object such as a virtual steering wheel or a virtual vehicle displayed on the in-vehicle intelligent device, or the target object may be a physical object such as the in-vehicle intelligent device itself or a rotating part of the in-vehicle intelligent device.

When M>1, after the vehicle enters the steering-wheel driving mode or the autonomous-driving mode, the steering controller 52 may determine whether there are non-to-be-synchronized steering wheels among the M steering wheels. If there are non-to-be-synchronized steering wheels, at least one of the non-to-be-synchronized steering wheels is used for remote control.

In addition, when there are a plurality of steering wheels 10, the in-vehicle intelligent device may control the running of the target program according to the user instructions, and the user may operate the steering wheel after the target program is run. Each steering wheel controller 51 reads the rotation angle and the rotation speed of the corresponding steering wheel 10, and transmits the rotation angle and the rotation speed of the corresponding steering wheel 10 to the communication bus. After the in-vehicle intelligent device detects the operation of the target program, information may be directly read through the communication bus of the vehicle. For example, the status information and the steering wheel information of the vehicle may be read through the communication bus, and the operating mode is determined according to the status information of the vehicle. That is, if the vehicle is in the steering-wheel driving mode or in the autonomous-driving mode, it is determined whether there is a non-to-be-synchronized steering wheel. If there is a non-to-be-synchronized steering wheel, at least one steering wheel is selected from the non-to-be-synchronized steering wheels, and the target object is controlled according to the rotation information of the at least one selected steering wheel. If there is no non-to-be-synchronized steering wheel, the target object may no longer be controlled according to the rotation information of the M steering wheels 10.

It can be understood that when the vehicle is in the steering-wheel driving mode or in the autonomous-driving mode, there is a non-to-be-synchronized steering wheel, and the running of the target program is detected, the in-vehicle intelligent device may display reminder information to prompt the user to operate the steering wheel. When the vehicle is in the steering-wheel driving mode or in the autonomous-driving mode, and there is no non-to-be-synchronized steering wheel, the in-vehicle intelligent device may display reminder information to prompt the user that the target object cannot be controlled through the steering wheel.

For example, when M>1, the steering controller 52 may determine whether the priority of the default steering wheel is the highest after the vehicle enters the steering-wheel driving mode or is in the autonomous-driving mode. If the priority of the default steering wheel is the highest, the steering mechanism 40 is controlled directly according to the rotation information of the default steering wheel. In this case, other steering wheels such as the co-driver steering wheel 10-2 may be used for remote control.

In addition, when there are a plurality of steering wheels 10, the in-vehicle intelligent device may control the running of the target program according to the user instructions, and the user may operate the steering wheel after the target program is run. Each steering wheel controller 51 reads the rotation angle and the rotation speed of the corresponding steering wheel 10, and transmits the rotation angle and the rotation speed of the corresponding steering wheel 10 to the communication bus. After the in-vehicle intelligent device detects the operation of the target program, information may be directly read through the communication bus of the vehicle. For example, the status information and the steering wheel information of the vehicle may be read through the communication bus, and the operating mode may be determined according to the status information of the vehicle. That is, if the vehicle is in the steering-wheel driving mode or in the autonomous-driving mode, it is determined whether the priority of the default steering wheel is the highest. If the priority of the default steering wheel is the highest, at least one steering wheel is selected from other steering wheels other than the default steering wheel, and the target object is controlled according to the rotation information of the at least one selected steering wheel. If the priority of the default steering wheel is not the highest, the target object may no longer be controlled according to the rotation information of the M steering wheels 10.

It can be understood that when the vehicle is in the steering-wheel driving mode or in the autonomous-driving mode, the priority of the default steering wheel is the highest, and the running of the target program is detected, the in-vehicle intelligent device may display reminder information to prompt the user to operate the steering wheel. When the vehicle is in the steering-wheel driving mode or in the autonomous-driving mode, and the priority of the default steering wheel is not the highest, the in-vehicle intelligent device may display reminder information to prompt the user that the target object cannot be controlled through the steering wheel.

It should also be noted that the user may set a to-be-selected steering wheel through the in-vehicle intelligent device, or the in-vehicle intelligent device may set the to-be-selected steering wheel according to preset information or an actual requirement. For example, according to the quantity of racing cars and the setting of the steering wheel corresponding to each racing car in a sim racing game, the in-vehicle intelligent device may determine a to-be-selected steering wheel, that is, decide steering wheels of which rotation information is to be received.

In addition, in some other embodiments, the in-vehicle intelligent device may also determine the use status of the steering wheel. If the to-be-selected steering wheel is in use, for example, is remotely controlling another device, another steering wheel may be selected or the target object is no longer controlled according to the rotation information of the steering wheel 10. If the steering wheel is not in use, the target object is controlled according to the rotation information of the steering wheel 10.

In some embodiments of the present disclosure, the target program may be a game program such as a sim racing game, and the target object may be a simulated object such as a simulated racing car in the game. For example, when the target program is a sim racing game, the user may trigger the sim racing game to run and operate the steering wheel 10. Each steering wheel controller 51 reads the rotation angle and the rotation speed of the corresponding steering wheel 10, and transmits the rotation angle and the rotation speed of the corresponding steering wheel 10 to the communication bus. After the vehicle is in the steering-wheel driving mode or in the autonomous-driving mode, the priority of the default steering wheel is the highest, and the target program is detected, the in-vehicle intelligent device may directly read the rotation information of at least one steering wheel of other steering wheels other than the default steering wheel through the communication bus, and process the rotation information of the at least one steering wheel 10 to correspondingly generate rotation information (including a rotation angle, a rotation speed or a rotation angle and a rotation speed) of at least one target object. Next, according to the rotation information of at least one target object, the steering control is performed correspondingly on the at least one target object. For example, at least one simulated racing car in a sim racing game may rotate according to the rotation angle and the rotation speed of the at least one target object separately.

Therefore, when the default steering wheel controls the vehicle, other steering wheels may be used for remote control of the in-vehicle intelligent device, to ensure normal driving and also provide a passenger with entertainment.

When M>1, the in-vehicle intelligent device obtains the status information and steering wheel information of the vehicle when the running of the target program is detected, and when the vehicle is neither in the steering-wheel driving mode nor in the autonomous-driving mode, the target object is controlled according to the rotation information of the at least one steering wheel of the M steering wheels 10.

When M>1, and the steering controller 52 does not enter the steering-wheel driving mode or is not in the autonomous-driving mode, for example, in a parking state, the wheels 100 of the vehicle may not rotate with the rotation of the steering wheel. In this case, all M steering wheels are available for remote control.

In addition, when there are a plurality of steering wheels 10, the in-vehicle intelligent device may control the running of the target program according to the user instructions, and the user may operate the steering wheel after the target program is run. Each steering wheel controller 51 reads the rotation angle and the rotation speed of the corresponding steering wheel 10, and transmits the rotation angle and the rotation speed of the corresponding steering wheel 10 to the communication bus. After the in-vehicle intelligent device detects the operation of the target program, information may be directly read through the communication bus of the vehicle. For example, the status information and the steering wheel information of the vehicle may be read through the communication bus, and the operating mode may be determined according to the status information of the vehicle. That is, if the vehicle is neither in the steering-wheel driving mode nor in the autonomous-driving mode, at least one steering wheel of the M steering wheels is selected, and the target object is controlled according to the rotation information of the at least one selected steering wheel.

It can be understood that when the vehicle is neither in the steering-wheel driving mode nor in the autonomous-driving mode, and the running of the target program is detected, the in-vehicle intelligent device may display reminder information to prompt the user to operate the steering wheel.

In some embodiments of the present disclosure, the target program may be a game program such as a sim racing game, and the target object may be a simulated object such as a simulated racing car in the game. For example, when the target program is a sim racing game, the user may trigger the sim racing game to run and operate the steering wheel 10. Each steering wheel controller 51 reads the rotation angle and the rotation speed of the corresponding steering wheel 10, and transmits the rotation angle and the rotation speed of the corresponding steering wheel 10 to the communication bus. After the vehicle is neither in the steering-wheel driving mode nor in the autonomous-driving mode, and the target program is detected, the in-vehicle intelligent device may directly read the rotation information of at least one steering wheel of the M steering wheels through the communication bus, and process the rotation information of the at least one steering wheel 10 to correspondingly generate rotation information (including a rotation angle, a rotation speed or a rotation angle and a rotation speed) of at least one target object. Next, according to the rotation information of at least one target object, the steering control is performed correspondingly on the at least one target object. For example, at least one simulated racing car in a sim racing game may rotate according to the rotation angle and the rotation speed of the at least one target object separately.

Therefore, when the vehicle is in a parking state, all the M steering wheels may be used for remote control of the in-vehicle intelligent device, to ensure normal driving and also provide a passenger with entertainment.

In other embodiments of the present disclosure, when M>1, the control module 50 such as the steering controller 52 may not control the M steering wheels 10 when the vehicle is in the autonomous-driving mode, that is, the M steering wheels 10 and the wheels 100 may not be kept synchronized. In this case, the in-vehicle intelligent device only needs to determine, before determining the non-to-be-synchronized steering wheels among the M steering wheels, whether the vehicle is in the steering-wheel driving mode, that is, determine, when the vehicle is in the steering-wheel driving mode, the non-to-be-synchronized steering wheels among the M steering wheels. The target object is controlled according to the rotation information of the at least one steering wheel in the non-to-be-synchronized steering wheels, and when the vehicle is not in the steering-wheel driving mode, for example, in the autonomous-driving mode, the target object is controlled according to the rotation information of the at least one steering wheel of the M steering wheels. It should be understood that in the autonomous-driving mode, when the M steering wheels 10 and the wheels 100 may not be kept synchronized, the control method of the in-vehicle intelligent device in the autonomous-driving mode is basically the same as that of the vehicle when the vehicle is neither in the steering-wheel driving mode nor in the autonomous-driving mode in the previous embodiment, and details are not described herein again.

According to other embodiments of the present disclosure, when M>1, the control module 50 such as the steering controller 52 may perform wireless communication with the mobile intelligent device, and the mobile intelligent device transmits a request instruction to the control module 50 when the running of the target program is detected, and receives status information and steering wheel information of the vehicle that are transmitted by the control module 50. When the vehicle is in the steering-wheel driving mode or in the autonomous-driving mode, the mobile intelligent device determines the non-to-be-synchronized steering wheels among the M steering wheels, and the target object is controlled according to the rotation information of at least one steering wheel in the non-to-be-synchronized steering wheels.

It should be noted that the mobile intelligent device may be an intelligent device that is not mounted on the vehicle. After receiving the request instruction, the steering controller 52 may transmit the status information and the steering wheel information of the vehicle to the mobile intelligent device together. Alternatively, the steering controller 52 transmits the status information of the vehicle to the mobile intelligent device in sequence. In addition, the target object may be a virtual object such as a virtual steering wheel or a virtual vehicle displayed on the mobile intelligent device, or the target object may be a physical object such as the mobile intelligent device itself or a rotating part of the mobile intelligent device.

When M>1, after the vehicle enters the steering-wheel driving mode or the autonomous-driving mode, the steering controller 52 may determine whether there are non-to-be-synchronized steering wheels among the M steering wheels. If there are non-to-be-synchronized steering wheels, at least one of the non-to-be-synchronized steering wheels is used for remote control.

In addition, when there are a plurality of steering wheels 10, the mobile intelligent device may control the running of the target program according to an instruction of a user, and the user may operate the steering wheel after the target program is run. Each steering wheel controller 51 reads the rotation angle and the rotation speed of the corresponding steering wheel 10, and transmits the rotation angle and the rotation speed of the corresponding steering wheel 10 to the steering controller 52. After the mobile intelligent device detects that the target program is running, the mobile intelligent device may transmit a request instruction to the steering controller 52, and the steering controller 52 feeds back information to the mobile intelligent device after receiving the request instruction.

For example, after receiving the request instruction, the steering controller 52 may transmit the status information of the vehicle and the rotation information of the steering wheel 10 to the mobile intelligent device, and the mobile intelligent device then determines the operating mode according to the status information of the vehicle. That is, if the vehicle is in the steering-wheel driving mode or in the autonomous-driving mode, it is determined whether there is a non-to-be-synchronized steering wheel. If there is a non-to-be-synchronized steering wheel, at least one steering wheel is selected from the non-to-be-synchronized steering wheels, and the target object is controlled according to the rotation information of the at least one selected steering wheel. If there is no non-to-be-synchronized steering wheel, the target object may no longer be controlled according to the rotation information of the M steering wheels 10.

It can be understood that when the vehicle is in the steering-wheel driving mode or in the autonomous-driving mode, there is a non-to-be-synchronized steering wheel, and the running of the target program is detected, the mobile intelligent device may display reminder information to prompt the user to operate the steering wheel. When the vehicle is in the steering-wheel driving mode or in the autonomous-driving mode, and there is no non-to-be-synchronized steering wheel, the mobile intelligent device may display reminder information to prompt the user that the target object cannot be controlled through the steering wheel.

For example, when M>1, the steering controller 52 may determine, after the vehicle enters the steering-wheel driving mode or the autonomous-driving mode, whether the priority of the default steering wheel is the highest. If the priority of the default steering wheel is the highest, the steering mechanism 40 is controlled directly according to the rotation information of the default steering wheel. In this case, other steering wheels such as the co-driver steering wheel 10-2 may be used for remote control.

In addition, when there are a plurality of steering wheels 10, the mobile intelligent device may control the running of the target program according to an instruction of a user, and the user may operate the steering wheel after the target program is run. Each steering wheel controller 51 reads the rotation angle and the rotation speed of the corresponding steering wheel 10, and transmits the rotation angle and the rotation speed of the corresponding steering wheel 10 to the steering controller 52. After the mobile intelligent device detects that the target program is running, the mobile intelligent device may transmit a request instruction to the steering controller 52, and the steering controller 52 feeds back information to the mobile intelligent device after receiving the request instruction.

For example, after receiving the request instruction, the steering controller 52 may transmit the status information of the vehicle and the rotation information of the steering wheel 10 to the mobile intelligent device, and the mobile intelligent device then determines the operating mode according to the status information of the vehicle. That is, if the vehicle is in the steering-wheel driving mode or in the autonomous-driving mode, it is determined whether the priority of the default steering wheel is the highest. If the priority of the default steering wheel is the highest, at least one steering wheel is selected from other steering wheels other than the default steering wheel, and the target object is controlled according to the rotation information of the at least one selected steering wheel. If the priority of the default steering wheel is not the highest, the target object may no longer be controlled according to the rotation information of the M steering wheels 10.

It can be understood that when the vehicle is in the steering-wheel driving mode or in the autonomous-driving mode, the priority of the default steering wheel is the highest, and the running of the target program is detected, the mobile intelligent device may display reminder information to prompt the user to operate the steering wheel. When the vehicle is in the steering-wheel driving mode or in the autonomous-driving mode, and the priority of the default steering wheel is not the highest, the mobile intelligent device may display reminder information to prompt the user that the target object cannot be controlled through the steering wheel.

It should also be noted that the user may set a to-be-selected steering wheel through the mobile intelligent device, or the mobile intelligent device may set the to-be-selected steering wheel according to preset information or an actual requirement. For example, according to the quantity of racing cars and the setting of the steering wheel corresponding to each racing car in a sim racing game, the mobile intelligent device may determine a to-be-selected steering wheel, that is, decide steering wheels of which rotation information is to be selected.

In addition, in some other embodiments, the mobile intelligent device may also determine the use status of the steering wheel. If the to-be-selected steering wheel is in use, for example, remotely controlling another device, another steering wheel may be selected or the target object is no longer controlled according to the rotation information of the steering wheel 10. If the steering wheel is not in use, the target object is controlled according to the rotation information of the steering wheel 10.

In some embodiments of the present disclosure, the target program may be a game program such as a sim racing game, and the target object may be a simulated object such as a simulated racing car in the game. Alternatively, the target program may be an unmanned-aerial-vehicle remote control program and the target object may be an unmanned aerial vehicle. The steering mechanism of the unmanned aerial vehicle may control the steering of the unmanned aerial vehicle. For example, when the target program is at least one unmanned-aerial-vehicle remote control program, the user may trigger the at least one unmanned-aerial-vehicle remote control program to run and operate at least one steering wheel. The M steering wheel controllers 51 read respectively the rotation angle and rotation speed of the corresponding M steering wheels 10 and transmit the rotation angle and the rotation speed of the M steering wheels 10 to the steering controller 52. The steering controller 52 transmits the rotation angle and the rotation speed of other steering wheels other than the default steering wheel to each unmanned aerial vehicle separately in real time. When the vehicle is in the steering-wheel driving mode or the autonomous-driving mode, the priority of the default steering wheel is the highest, and the running of the target program is detected, each unmanned aerial vehicle selects a steering wheel from other steering wheels other than the default steering wheel, and processes the rotation information of the selected steering wheel to obtain rotation information (including a rotation angle, a rotation speed or a rotation angle and a rotation speed) of the target object. Next, according to the rotation information of the target object, the steering control is performed on the unmanned aerial vehicle, so as to remotely control the unmanned aerial vehicle.

Therefore, when the default steering wheel controls the vehicle, other steering wheels may be used for remote control of the mobile intelligent device, to ensure normal driving and also provide a passenger with entertainment.

When M>1, the mobile intelligent device transmits a request instruction to the control module when the running of the target program is detected, and receives the status information and steering wheel information of the vehicle that are transmitted by the control module. When the mobile intelligent device is neither in the steering-wheel driving mode nor in the autonomous-driving mode, the target object is controlled according to the rotation information of at least one steering wheel of the M steering wheels.

When M>1, and the steering controller 52 does not enter the steering-wheel driving mode or is not in the autonomous-driving mode, for example, in a parking state, the wheels 100 of the vehicle may not rotate with the rotation of the steering wheel. In this case, all M steering wheels may be used for remote control.

In addition, when there are a plurality of steering wheels 10, the mobile intelligent device may control the running of the target program according to an instruction of a user, and the user may operate the steering wheel after the target program is run. Each steering wheel controller 51 reads the rotation angle and the rotation speed of the corresponding steering wheel 10, and transmits the rotation angle and the rotation speed of the corresponding steering wheel 10 to the steering controller 52. After the mobile intelligent device detects that the target program is running, the mobile intelligent device may transmit a request instruction to the steering controller 52, and the steering controller 52 feeds back information to the mobile intelligent device after receiving the request instruction.

For example, after receiving the request instruction, the steering controller 52 may transmit the status information of the vehicle and the rotation information of the steering wheel 10 to the mobile intelligent device, and the mobile intelligent device then determines the operating mode according to the status information of the vehicle. That is, if the vehicle is neither in the steering-wheel driving mode nor in the autonomous-driving mode, at least one steering wheel is selected from the M steering wheels, and the target object is controlled according to the rotation information of the at least one selected steering wheel.

It can be understood that when the vehicle is neither in the steering-wheel driving mode nor in the autonomous-driving mode and the running of the target program is detected, the mobile intelligent device may display reminder information to prompt the user to operate the steering wheel.

In some embodiments of the present disclosure, the target program may be a game program such as a sim racing game, and the target object may be a simulated object such as a simulated racing car in the game. For example, when the target program is a sim racing game, the user may trigger the sim racing game to run and operate the steering wheel 10. Each steering wheel controller 51 reads the rotation angle and the rotation speed of the corresponding steering wheel 10, and transmits the rotation angle and the rotation speed of the corresponding steering wheel 10 to the steering controller 52. The steering controller 52 transmits the rotation angle and the rotation speed of the M steering wheels to each unmanned aerial vehicle in real time. When the vehicle is neither in the steering-wheel driving mode nor in the autonomous-driving mode and the running of the target program is detected, each unmanned aerial vehicle selects a steering wheel from the M steering wheels, and processes the rotation information of the selected steering wheel to obtain rotation information (including a rotation angle, a rotation speed or a rotation angle and a rotation speed) of the target object. Next, according to the rotation information of the target object, the steering control is performed on the unmanned aerial vehicle, so as to remotely control the unmanned aerial vehicle.

Therefore, when the vehicle is in a parking state, all the M steering wheels may be used for remote control of the in-vehicle intelligent device, to ensure normal driving and also provide a passenger with entertainment.

In other embodiments of the present disclosure, when M>1, the control module 50 such as the steering controller 52 may not control the M steering wheels 10 when the vehicle is in the autonomous-driving mode, that is, the M steering wheels 10 and the wheels 100 may not be kept synchronized. In this case, the mobile intelligent device only needs to determine, before determining the non-to-be-synchronized steering wheels among the M steering wheels, whether the vehicle is in the steering-wheel driving mode, that is, determine, when the vehicle is in the steering-wheel driving mode, the non-to-be-synchronized steering wheels among the M steering wheels. The target object is controlled according to the rotation information of the at least one steering wheel in the non-to-be-synchronized steering wheels. When the vehicle is not in the steering-wheel driving mode, for example, in the autonomous-driving mode, the target object is controlled according to the rotation information of the at least one steering wheel of the M steering wheels. It should be understood that in the autonomous-driving mode, when the M steering wheels 10 and the wheels 100 may not be kept synchronized, the control method of the mobile intelligent device in the autonomous-driving mode is basically the same as that of the vehicle when the vehicle is neither in the steering-wheel driving mode nor in the autonomous-driving mode in the previous embodiment, and details are not described herein again.

As described above, when M>1, a control procedure of the embodiments of the present disclosure may be as follows.

For the vehicle, after the vehicle is powered on, the steering controller 52 determines whether the vehicle is in a parking state, that is, is not in the steering-wheel driving mode. If the vehicle is in a parking state, the in-vehicle intelligent device may determine whether the running of the target program is detected. If the target program is detected, the in-vehicle intelligent device reads the rotation angle and rotation speed of the co-driver steering wheel and those of the driver steering wheel, and controls at least one target object according to the rotation angle and rotation speed of at least one of the co-driver steering wheel and the driver steering wheel. Alternatively, the mobile intelligent device may determine whether the running of the target program is detected. If the target program is detected, a request instruction is transmitted to the vehicle to receive the rotation angle and the rotation speed of the co-driver steering wheel and those of the driver steering wheel, and at least one target object is controlled according to the rotation angle and rotation speed of at least one of the co-driver steering wheel and the driver steering wheel.

If the vehicle is not in a parking state, when the vehicle is in a steering-wheel driving state, the steering controller 52 reads set priority of steering wheels and determines whether the priority of the driver steering wheel is the highest. If the priority of the driver steering wheel is the highest, the steering controller 52 reads the rotation angle and rotation speed of the driver steering wheel, drives the steering mechanism 40 to rotate the wheels according to the rotation angle and rotation speed of the driver steering wheel, and provides corresponding reverse torque to the driver motor, to ensure the handling comfort of a user. In this case, an in-vehicle intelligent device may determine whether it is detected that a target program is running. If the target program is detected, the in-vehicle intelligent device reads the rotation angle and rotation speed of the co-driver steering wheel, and controls a target object according to the rotation angle and rotation speed of the co-driver steering wheel. Alternatively, the mobile intelligent device may determine whether the running of the target program is detected. If the target program is detected, a request instruction is transmitted to the vehicle to receive the rotation angle and the rotation speed of the co-driver steering wheel, and the target object is controlled according to the rotation angle and rotation speed of the co-driver steering wheel.

If the priority of the co-driver steering wheel is the highest, the steering controller 52 determines whether the co-driver steering wheel is operating. If yes, the steering controller 52 reads the rotation angle and rotation speed of the co-driver steering wheel, drives the steering mechanism 40 to rotate the vehicle according to the rotation angle and rotation speed of the co-driver steering wheel, and provides corresponding reverse torque to the co-driver motor, to ensure the handling comfort of a user. If not, the steering controller 52 reads the rotation information and rotation speed of the driver steering wheel, drives the steering mechanism 40 to rotate the wheels according to the rotation information and rotation speed of the driver steering wheel, and provides corresponding reverse torque to the driver motor, to ensure the handling comfort of a user. The co-driver steering wheel drives the co-driver motor according to the rotation information and the rotation speed of the driver steering wheel, so as to synchronize the co-driver steering wheel with the driver steering wheel.

Therefore, during the driving of the vehicle and when the vehicle is started, the wheels can be kept synchronized with at least one steering wheel, specifically, synchronized with the driver steering wheel and the co-driver steering wheel. When the driver steering wheel controls or intends to control the vehicle, the driver steering wheel is kept synchronized with the wheels. When the co-driver steering wheel controls or intends to control the vehicle, the co-driver steering wheel is kept synchronized with the wheels. When the driver steering wheel and the co-driver steering wheel control or intend to control the vehicle at the same time, both the driver steering wheel and the co-driver steering wheel are synchronized with the wheels at the same time. In addition, during the driving of the vehicle, reverse torque may be provided to the steering wheel, to ensure the handling comfort of the driver. In addition, the steering wheel may also control, in addition to the wheels, another device, for example, an in-vehicle intelligent device or a mobile intelligent device, and is used as a game controller, a remote control or the like. For example, when the driver steering wheel is controlling the vehicle, the co-driver steering wheel may control another device. When the vehicle is in the autonomous-driving state or in the parking state, both the driver steering wheel and the co-driver steering wheel may control another device.

In summary, according to the vehicle steering control system provided in the embodiments of the present disclosure, the control module is electrically connected to the steering mechanism, M steering wheel steering angle sensors, and M steering wheel drive units separately. The control module controls at least one steering wheel according to the rotation information of the M steering wheels and the rotation information of the wheels, so as to synchronize the at least one steering wheel with the wheels. The at least one steering wheel is synchronized with the wheels, to facilitate the takeover of the vehicle by a user. In addition, a wired signal or a wireless signal can be used to transmit a steering intention of the driver, so that steering control can be implemented without a mechanical mechanism, it is convenient to freely arrange the position of the steering wheel, and a plurality of steering wheels can be arranged. In addition, each steering wheel drive unit applies steering torque to the corresponding steering wheel when the corresponding steering wheel is operated by the driver, to provide the driver with handling comfort. In addition, the embodiments of the present disclosure can be used to provide vehicle driving education and also provide a driver with entertainment.

Corresponding to the vehicle steering control system of the foregoing embodiment, the present disclosure further provides an in-vehicle intelligent device. The in-vehicle intelligent device communicates with a control module of a vehicle steering control system through a communication bus of the vehicle, and the steering control system includes M steering wheels. When M=1, the in-vehicle intelligent device obtains status information and steering wheel information of the vehicle when the running of a target program is detected, and controls a target object according to the rotation information of the steering wheels when the vehicle is neither in a steering-wheel driving mode nor in an autonomous-driving mode.

According to an embodiment of the present disclosure, when M>1, the in-vehicle intelligent device obtains status information and steering wheel information of the vehicle when the running of a target program is detected, determines non-to-be-synchronized steering wheels among the M steering wheels when the vehicle is in a steering-wheel driving mode or in an autonomous-driving mode, and controls the target object according to the rotation information of at least one steering wheel in the non-to-be-synchronized steering wheels.

According to an embodiment of the present disclosure, when M>1, the in-vehicle intelligent device obtains the status information and the steering wheel information of the vehicle when the running of the target program is detected, and when the vehicle is neither in the steering-wheel driving mode nor in the autonomous-driving mode, the target object is controlled according to the rotation information of the at least one steering wheel of the M steering wheels.

In summary, according to the in-vehicle intelligent device provided in the embodiments of the present disclosure, the in-vehicle intelligent device obtains status information and steering wheel information of the vehicle when the running of a target program is detected, and controls a target object according to rotation information of the steering wheel when the vehicle is neither in a steering-wheel driving mode nor in an autonomous-driving mode, so that when the vehicle is neither in the steering-wheel driving mode nor in the autonomous-driving mode, the angle of the steering wheel may not be the same as the angle of wheels, and the steering wheel may perform another remote control operation, for example, control a game racing car, an unmanned aircraft, or the like.

Corresponding to the vehicle steering control system of the foregoing embodiment, the present disclosure further provides a mobile intelligent device. The mobile intelligent device performs wireless communication with a control module of a vehicle steering control system, and the steering control system includes M steering wheels.

When M=1, the mobile intelligent device transmits a request instruction to the control module when the running of a target program is detected, and receives status information and steering wheel information of the vehicle that are transmitted by the control module. When the mobile intelligent device is neither in a steering-wheel driving mode nor in an autonomous-driving mode, the target object is controlled according to the rotation information of the steering wheel.

According to an embodiment of the present disclosure, when M>1, the mobile intelligent device transmits a request instruction to the control module when the running of the target program is detected, and receives the status information and the steering wheel information of the vehicle that are transmitted by the control module. When the mobile intelligent device is in the steering-wheel driving mode or in the autonomous-driving mode, the non-to-be-synchronized steering wheels among the M steering wheels are determined, and the target object is controlled according to the rotation information of at least one steering wheel of the non-to-be-synchronized steering wheels.

According to an embodiment of the present disclosure, when M>1, the mobile intelligent device transmits a request instruction to the control module when the running of the target program is detected, and receives the status information and steering wheel information of the vehicle that are transmitted by the control module. When the vehicle is neither in the steering-wheel driving mode nor in the autonomous-driving mode, the mobile intelligent device controls the target object according to the rotation information of at least one steering wheel of the M steering wheels.

In summary, according to the mobile intelligent device provided in the embodiments of the present disclosure, the mobile intelligent device transmits a request instruction to a control module when the running of a target program is detected, receives status information and steering wheel information of the vehicle that are transmitted by the control module, and controls a target object according to rotation information of the steering wheel when the vehicle is neither in a steering-wheel driving mode nor in an autonomous-driving mode, so that when the vehicle is neither in the steering-wheel driving mode nor in the autonomous-driving mode, the angle of the steering wheel may not be the same as the angle of wheels, and the steering wheel may perform another remote control operation, for example, control a game racing car, an unmanned aircraft, or the like.

The embodiment of the present disclosure further provides a vehicle, including the vehicle steering control system of the foregoing embodiment.

According to the vehicle provided in the embodiments of the present disclosure, the foregoing vehicle steering control system may facilitate the takeover of the vehicle by the user, and a wired signal or a wireless signal can be used to transmit the steering intention of the driver, so that steering control can be implemented without a mechanical mechanism, it is convenient to freely arrange the steering wheel, and a plurality of steering wheels can be arranged, to provide the driver with handling comfort.

Corresponding to the vehicle control system in the foregoing embodiment, a vehicle steering control method is further provided in this embodiment of the present disclosure.

Figure 21:
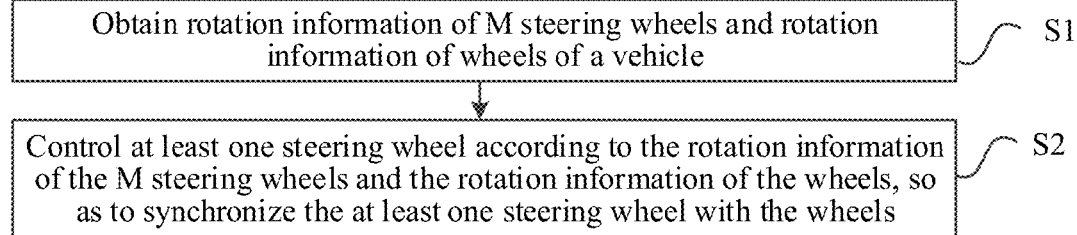
FIG. 21 is a flowchart of the vehicle steering control method according to an embodiment of the present disclosure.

FIG. 21 is a flowchart of a vehicle control method according to an embodiment of the present disclosure. The vehicle control system includes M steering wheels, M steering wheel drive units, and a steering mechanism. Each steering wheel drive unit is connected to a corresponding steering wheel. Each steering wheel drive unit is configured to: apply steering torque to the corresponding steering wheel, and drive the corresponding steering wheel to rotate. The steering mechanism is configured to drive wheels of the vehicle to rotate. M is a positive integer. As shown in FIG. 21, the method includes the following steps.

S1: Obtain rotation information of the M steering wheels of the vehicle and rotation information of the wheels;

S2: Control at least one steering wheel according to the rotation information of the M steering wheels and the rotation information of the wheels, so as to synchronize the at least one steering wheel with the wheels.

According to some embodiments of the present disclosure, M=1, and the controlling the steering mechanism according to the rotation information of the M steering wheels includes: controlling the steering wheel according to the rotation information of the steering wheel when the vehicle is in an autonomous-driving mode, so as to synchronize the steering wheel with the wheels.

According to an embodiment of the present disclosure, the controlling at least one steering wheel according to the rotation information of the M steering wheels and the rotation information of the wheels includes: determining, when controlling the steering mechanism according to the rotation information of the vehicle-controlling steering wheel, a to-be-synchronized steering wheel among steering wheels other than the vehicle-controlling steering wheel; and controlling the to-be-synchronized steering wheel according to the rotation information of the wheels, so as to synchronize the to-be-synchronized steering wheel with the wheels.

According to an embodiment of the present disclosure, the controlling at least one steering wheel according to the rotation information of the M steering wheels and the rotation information of the wheels includes: determining, when controlling the steering mechanism according to the rotation information of the vehicle-controlling steering wheel, a to-be-synchronized steering wheel among steering wheels other than the vehicle-controlling steering wheel; and controlling, when it is determined that the to-be-synchronized steering wheel takes over the vehicle, the to-be-synchronized steering wheel according to the rotation information of the wheels, so as to synchronize the to-be-synchronized steering wheel that takes over the vehicle with the wheels.

According to an embodiment of the present disclosure, a steering wheel with priority higher than the priority of the vehicle-controlling steering wheel among the M steering wheels is used as the to-be-synchronized steering wheel; or a steering wheel with priority higher than the priority of the vehicle-controlling steering wheel among the M steering wheels and a default steering wheel among the M steering wheels are used as the to-be-synchronized steering wheels together.

According to an embodiment of the present disclosure, a non-to-be-synchronized steering wheel among steering wheels other than the vehicle-controlling steering wheel is not synchronized with the wheels. A steering wheel with priority lower than the priority of the vehicle-controlling steering wheel among the M steering wheels is used as the non-to-be-synchronized steering wheel; or a steering wheel with priority lower than the priority of the vehicle-controlling steering wheel among other steering wheels other than the default steering wheel is used as the non-to-be-synchronized steering wheel. The method further includes: controlling, when a trigger instruction of any non-to-be-synchronized steering wheel is received, the any non-to-be-synchronized steering wheel according to the rotation information of the wheels, so that the any non-to-be-synchronized steering wheel is synchronized with the wheels; and controlling the steering mechanism according to rotation information of the any non-to-be-synchronized steering wheel after the any non-to-be-synchronized steering wheel is synchronized with the wheels, so that the steering mechanism drives the wheels of the vehicle according to the rotation information of the any non-to-be-synchronized steering wheel to rotate.

Figure 22:
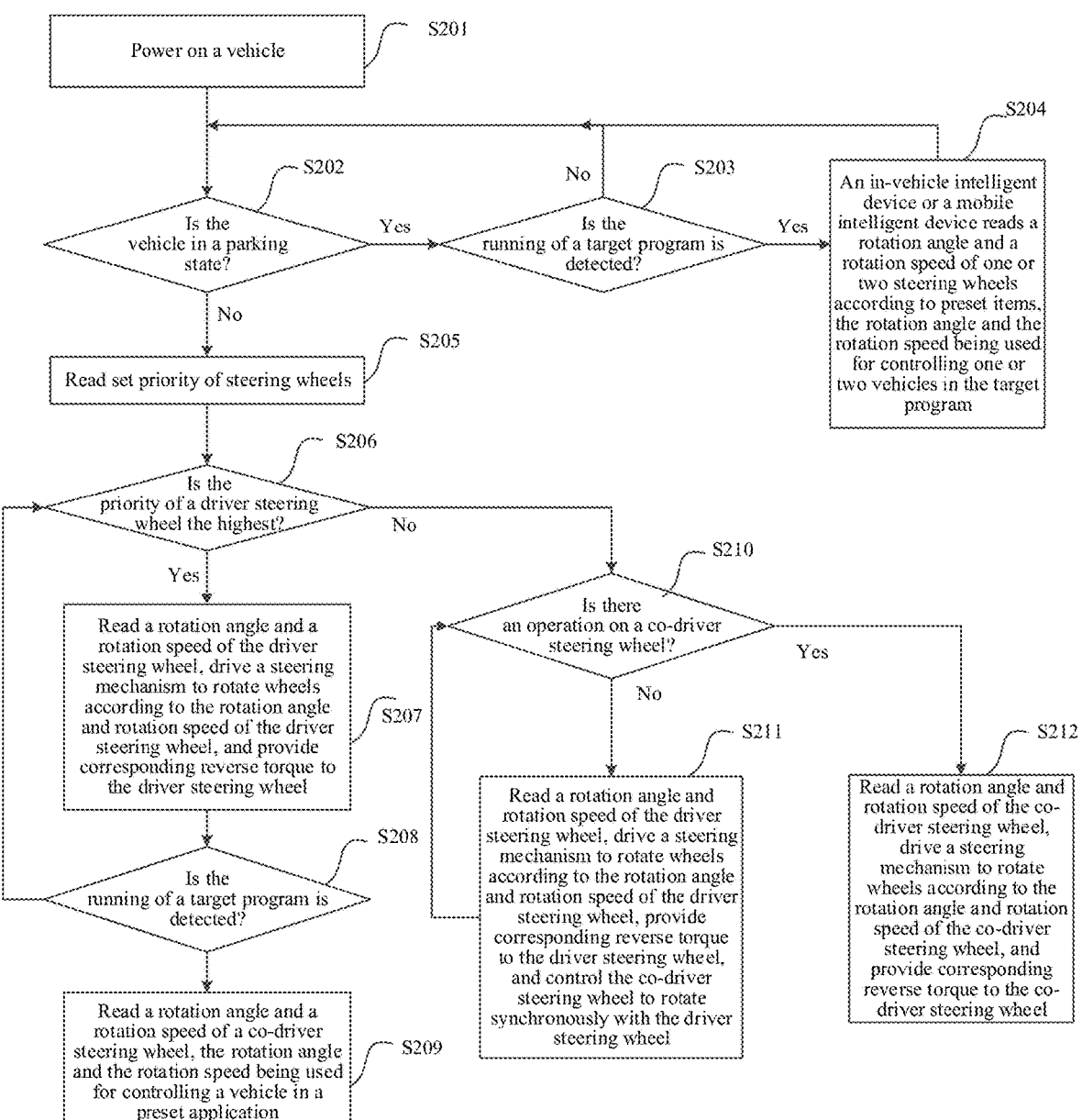
FIG. 22 is a flowchart of the vehicle steering control method according to another embodiment of the present disclosure.

Specifically, as shown in FIG. 22, the control method provided in this embodiment of the present disclosure includes the following steps.

S201: Power on a vehicle.

S202: Determine whether the vehicle is in a parking state, that is, not in a steering-wheel driving mode.

If yes, step S203 is performed, or if not, step S205 is performed.

S203: An in-vehicle intelligent device or a mobile intelligent device determines whether the running of a target program is detected, for example, whether a racing game is started.

If yes, step S204 is performed, or if not, step S202 is performed.

S204: The in-vehicle intelligent device or the mobile intelligent device reads a rotation angle and a rotation speed of one or two steering wheels according to preset items, the rotation angle and the rotation speed being used for controlling one or two vehicles in the target program, where the process returns to step S202.

S205: Read set priority of steering wheels when the vehicle is in the steering wheel control mode.

S206: Determine whether the priority of the driver steering wheel is the highest.

If yes, step S207 is performed, or if not, step S210 is performed.

S207: Read a rotation angle and a rotation speed of the driver steering wheel, drive the steering mechanism to rotate the wheels according to the rotation angle and rotation speed of the driver steering wheel, and provide corresponding reverse torque to the driver steering wheel, to ensure the handling comfort of a user.

S208: An in-vehicle intelligent device or a mobile intelligent device determines whether the running of a target program is detected, for example, whether a racing game is started.

If yes, step S209 is performed, or if not, the process returns to step S206.

S209: The in-vehicle intelligent device or the mobile intelligent device reads a rotation angle and a rotation speed of the co-driver steering wheel, the rotation angle and the rotation speed being used for controlling a vehicle in a preset application, where the process returns to step S206.

S210: Determine whether the co-driver steering wheel is operated.

If yes, step S212 is performed, or if not, step S211 is performed.

S211: Read a rotation angle and rotation speed of the driver steering wheel, drive the steering mechanism to rotate the wheels according to the rotation angle and rotation speed of the driver steering wheel, provide corresponding reverse torque to the driver steering wheel, to ensure the handling comfort of a user, and control the co-driver steering wheel to rotate synchronously with the driver steering wheel, where the process returns to step S205.

S212: Read a rotation angle and rotation speed of the co-driver steering wheel, drive the steering mechanism to rotate the wheels according to the rotation angle and rotation speed of the co-driver steering wheel, and provide corresponding reverse torque to the co-driver steering wheel, to ensure the handling comfort of a user.

In summary, according to the vehicle steering control method provided in the embodiments of the present disclosure, each steering wheel drive unit applies steering torque to the corresponding steering wheel when the corresponding steering wheel is operated by a driver, rotation information of M steering wheels of a vehicle and rotation information of wheels of the vehicle are obtained, and at least one steering wheel is controlled according to the rotation information of the M steering wheels and the rotation information of the wheels, so as to synchronize the at least one steering wheel with the wheels. The at least one steering wheel is synchronized with the wheels, to facilitate the takeover of the vehicle by a user. In addition, a wired signal or a wireless signal can be used to transmit a steering intention of the driver, and steering control can be implemented without a mechanical mechanism, so that it is convenient to freely arrange the position of the steering wheel, and a plurality of steering wheels can be arranged. In addition, each steering wheel drive unit applies steering torque to the corresponding steering wheel when the corresponding steering wheel is operated by the driver, to provide the driver with handling comfort.

Based on the foregoing embodiments, the present disclosure further provides a non-transitory computer-readable storage medium, storing a computer program thereon, the program, when being executed by a processor, implementing the vehicle control method described in the foregoing embodiments.

Based on the foregoing embodiments, a method for controlling an in-vehicle intelligent device is also provided in the present disclosure.

FIG. 23 is a flowchart of a method for controlling an in-vehicle intelligent device according to an embodiment of the present disclosure. The in-vehicle intelligent device communicates with the vehicle through a communication bus of the vehicle. The vehicle includes M steering wheels. As shown in FIG. 23, the method includes the following steps.

S11: Obtain status information and steering wheel information of the vehicle when M=1 and the running of a target program is detected.

S12: Control a target object according to rotation information of a steering wheel when the vehicle is neither in a steering-wheel driving mode nor in an autonomous-driving mode.

According to an embodiment of the present disclosure, as shown in FIG. 24, the method further includes the following steps.

S21: Obtain status information and steering wheel information of the vehicle when M>1 and the running of a target program is detected.

S22: Determine non-to-be-synchronized steering wheels among the M steering wheels when the vehicle is in a steering-wheel driving mode or in an autonomous-driving mode, and control a target object according to rotation information of at least one of the non-to-be-synchronized steering wheels.

As shown in FIG. 25, when M>1, the method further includes the following steps.

S23: Control the target object according to the rotation information of at least one steering wheel among the M steering wheels when the vehicle is neither in the steering-wheel driving mode nor in the autonomous-driving mode.

According to the method for controlling an in-vehicle intelligent device provided in this embodiment of the present disclosure, the in-vehicle intelligent device obtains status information and steering wheel information of the vehicle when the running of a target program is detected, and controls a target object according to rotation information of the steering wheel when the vehicle is neither in a steering-wheel driving mode nor in an autonomous-driving mode, so that when the vehicle is neither in the steering-wheel driving mode nor in the autonomous-driving mode, the angle of the steering wheel may not be the same as the angle of wheels, and the steering wheel may perform another remote control operation, for example, control a game racing car, an unmanned aircraft, or the like. Based on the foregoing embodiments, a method for controlling a mobile intelligent device is also provided in the present disclosure.

FIG. 26 is a flowchart of a method for controlling a mobile intelligent device according to an embodiment of the present disclosure. The mobile intelligent device performs wireless communication with the vehicle. The vehicle includes M steering wheels. As shown in FIG. 26, the method includes the following steps.

S31: Transmit a request instruction to the vehicle when M=1 and the running of a target program is detected, and receive status information and steering wheel information of the vehicle that are transmitted by the vehicle.

S32: Control a target object according to rotation information of a steering wheel when the vehicle is neither in a steering-wheel driving mode nor in an autonomous-driving mode.

According to an embodiment of the present disclosure, as shown in FIG. 27, the method further includes the following steps.

S41: Transmit a request instruction to the vehicle when M>1 and the running of a target program is detected, and receive status information and steering wheel information of the vehicle that are transmitted by the vehicle.

S42: Determine non-to-be-synchronized steering wheels among the M steering wheels when the vehicle is in a steering-wheel driving mode or in an autonomous-driving mode, and control the target object according to rotation information of at least one of the non-to-be-synchronized steering wheels.

As shown in FIG. 28, when M>1, the method further includes the following steps.

S43: Control the target object according to the rotation information of the at least one steering wheel among the M steering wheels when the vehicle is neither in the steering-wheel driving mode nor in the autonomous-driving mode.

In summary, according to the method for controlling a mobile intelligent device provided in the embodiments of the present disclosure, the mobile intelligent device transmits a request instruction to a control module when the running of a target program is detected, receives status information and steering wheel information of the vehicle that are transmitted by the control module, and controls a target object according to rotation information of the steering wheel when the vehicle is neither in a steering-wheel driving mode nor in an autonomous-driving mode, so that when the vehicle is neither in the steering-wheel driving mode nor in the autonomous-driving mode, the angle of the steering wheel may not be the same as the angle of wheels, and the steering wheel may perform another remote control operation, for example, control a game racing car, an unmanned aircraft, or the like.

In the descriptions of this specification, descriptions such as reference terms "an embodiment", "some embodiments", "example", "specific example", or "some examples" intend to indicate that specific features, structures, materials, or characteristics described with reference to embodiments or examples are included in M embodiments or examples of the present disclosure. In this specification, exemplary descriptions of the foregoing terms do not necessarily refer to a same embodiment or example. In addition, the described specific features, structures, materials, or characteristics may be combined in an appropriate manner in any one or more embodiments or examples. In addition, in a case that is not mutually contradictory, a person skilled in the art can combine or group different embodiments or examples that are described in this specification and features of the different embodiments or examples.

Although the embodiments of the present disclosure are shown and described above, it can be understood that the foregoing embodiments are exemplary, and cannot be construed as a limitation to the present disclosure. Within the scope of the disclosure, a person of ordinary skill in the art may make changes, modifications, replacements, and variations to the foregoing embodiments.

What is claimed is:

1. A vehicle steering method for a vehicle having a plurality of steering wheels operated by a plurality of users, comprising:

obtaining steering information from the plurality of steering wheels of the plurality of users;

obtaining priority information of the steering wheels of the corresponding plurality of users;

determining at least one to-be-operated steering wheel from the plurality of steering wheels;

in response to a user of a steering wheel with a highest priority among the at least one to-be-operated steering wheel operates to steer the vehicle, reading the steering information of the steering wheel with the highest priority;

steering the vehicle based on the read steering information, wherein the read steering information includes a steering speed and a steering angle; and when the steering wheel with the highest priority among the at least one to-be-operated steering wheel is not the same as a top-priority steering wheel among the plurality of steering wheels, driving the top-priority steering wheel among the plurality of steering wheels to rotate according to the steering information of the steering wheel with the highest priority among the at least one to-be-operated steering wheel, wherein the user of the steering wheel with the highest priority is different from a user of a steering wheel by default, and at least one steering wheel has a higher priority than the steering wheel by default.

2. The vehicle steering method of claim 1, further comprising:

reading the steering information of the steering wheel by default after determining that none of the at least one steering wheel having a higher priority than the steering wheel by default intends to steer the vehicle.

3. The vehicle steering method of claim 1, further comprising:

in response to detecting running of a target program, determining status information and steering wheel information of the vehicle, and reading steering information of steering wheels other than the steering wheel by default so as to control a target object in the target program.

4. The vehicle steering method of claim 1, wherein the steering information is obtained from an angle sensor of a corresponding steering wheel.

5. A vehicle steering method for a vehicle having a plurality of steering wheels operated by a plurality of users, comprising:

receiving steering information from two or more users;

receiving priority information of the steering wheels corresponding to the two or more users;

determining at least one to-be-operated steering wheel from the plurality of steering wheels;

steering the vehicle based on steering information from a user of the steering wheel with a highest priority among the at least one to-be-operated steering wheel in response to that the steering information includes both steering information of a user of a steering wheel by default and steering information of the user of the steering wheel with the highest priority; and when the steering wheel with the highest priority among the at least one to-be-operated steering wheel is not the same as a top-priority steering wheel among the plurality of steering wheels, driving the top-priority steering wheel among the plurality of steering wheels to rotate according to the steering information of the steering wheel with the highest priority among the at least one to-be-operated steering wheel.

6. The vehicle steering method of claim 5, wherein the steering the vehicle comprises driving a steering gear connected to a steering motor under a control of a control module.

7. The vehicle steering method of claim 6, wherein the steering gear is a steering rack and the steering motor is an EPS (electric power steering system) motor.

8. A vehicle steering control system of a vehicle, comprising:

a plurality of steering wheels;

steering-wheel steering-angle sensors configured to acquire rotation information of the steering wheels;

steering wheel drive units electrically connected to the steering wheels and configured to drive the steering wheels to rotate;

a steering wheel controller coupled to each steering wheel drive unit and at least one steering wheel angle sensor; and an in-vehicle intelligent device coupled to the steering wheel controller and configured to:

in response to that the vehicle is neither in a steering-wheel driving mode nor in an autonomous-driving mode, detect a target program is running;

read rotation information of at least one steering wheel of the plurality of steering wheels through a communication bus;

process the rotation information of the at least one steering wheel to correspondingly generate rotation information of at least one target object in the target program; and

according to the rotation information of the at least one
    target object, perform steering control correspondingly
    on the at least one target object,
wherein the in-vehicle intelligent device is configured to:
in response to that the vehicle is in the steering-wheel
    driving mode or the autonomous-driving mode, deter-
    mine not-to-be-synchronized steering wheels among
    the plurality of steering wheels, and control the target
    object according to the rotation information of at least
    one steering wheel in the not-to-be-synchronized steer-
    ing wheels,
wherein the plurality of steering wheels include a default
    steering wheel and, other than the default steering
    wheel, any steering wheel among the plurality of steer-
    ing wheels with priority lower than a priority of a
    vehicle-controlling steering wheel is used as the not-
    to-be-synchronized steering wheel.

9. The vehicle steering control system according to claim
8, wherein the rotation information includes a rotation angle,
a rotation speed, or a rotation angle and a rotation speed.

10. The vehicle steering control system according to claim
8, wherein the at least one target object includes at least one
simulated racing car in a sim racing game.

11. The vehicle steering control system according to claim
8, wherein the in-vehicle intelligent device is configured to
detect the running of the target program, obtain driving
mode information and steering wheel information of the
vehicle, and control the target object according to the
rotation information of the at least one steering wheel when
the vehicle is in neither the steering-wheel driving mode nor
the autonomous-driving mode.

12. A vehicle, comprising the vehicle steering control
system according to claim 8.

* * * * *